(12) United States Patent
Marchand et al.

(10) Patent No.: US 7,947,793 B2
(45) Date of Patent: May 24, 2011

(54) ETHYLENE/α-OLEFIN BLOCK COPOLYMERS

(75) Inventors: Gary R. Marchand, Lake Jackson, TX (US); Yunwa W. Cheung, Monroe, NY (US); Benjamin C. Poon, Houston, TX (US); Jeffrey D. Weinhold, Lake Jackson, TX (US); Kim L. Walton, Lake Jackson, TX (US); Pankaj Gupta, Midland, MI (US); Colin Lipishan, Pearland, TX (US); Phillip D. Hustad, Manvel, TX (US); Roger L. Kuhlman, Lake Jackson, TX (US); Edmund M. Carnahan, Pearland, TX (US); Eddy I. Garcia-Meitin, Angleton, TX (US); Patricia L. Roberts, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/864,005

(22) PCT Filed: Jan. 30, 2009

(86) PCT No.: PCT/US2009/032699
§ 371 (c)(1),
(2), (4) Date: Jul. 22, 2010

(87) PCT Pub. No.: WO2009/097560
PCT Pub. Date: Aug. 6, 2009

(65) Prior Publication Data
US 2010/0298515 A1   Nov. 25, 2010

Related U.S. Application Data

(60) Provisional application No. 61/024,674, filed on Jan. 30, 2008.

(51) Int. Cl.
C08F 236/20 (2006.01)
C08F 210/16 (2006.01)
C08F 210/18 (2006.01)
G02B 1/10 (2006.01)
C08F 4/646 (2006.01)

(52) U.S. Cl. ........ 526/281; 526/114; 526/336; 526/347; 526/348; 526/348.2; 526/348.3; 526/348.5; 526/348.6; 359/586

(58) Field of Classification Search .................. 526/281, 526/348.3, 348.5, 336, 347, 114, 348, 348.2, 526/348.6; 525/97, 98; 359/586
See application file for complete search history.

(56) References Cited

U.S. PATENT DOCUMENTS

| 6,433,931 B1 * | 8/2002 | Fink et al. ..................... 359/586 |
| 2006/0199930 A1 * | 9/2006 | Li Pi Shan et al. ........... 526/346 |

* cited by examiner

Primary Examiner — Fred M Teskin

(57) ABSTRACT

Embodiments of the invention provide a class of ethylene/α-olefin block interpolymers. The ethylene/α-olefin interpolymers are characterized by an average block index, ABI, which is greater than zero and up to about 1.0 and a molecular weight distribution, $M_w/M_n$, greater than about 1.3. Preferably, the block index is from about 0.2 to about 1. In addition or alternatively, the block ethylene/α-olefin interpolymer is characterized by having at least one fraction obtained by Temperature Rising Elution Fractionation ('TREF'), wherein the fraction has a block index greater than about 0.3 and up to about 1.0 and the ethylene/α-olefin interpolymer has a molecular weight distribution, $M_w/M_n$, greater than about 1.4.

18 Claims, 26 Drawing Sheets

◇ Blends containing Ex. 25 (Δ Octene < 18.5 mol%)
△ Blends containing Ex. 29 (Δ Octene > 18.5 mol%)

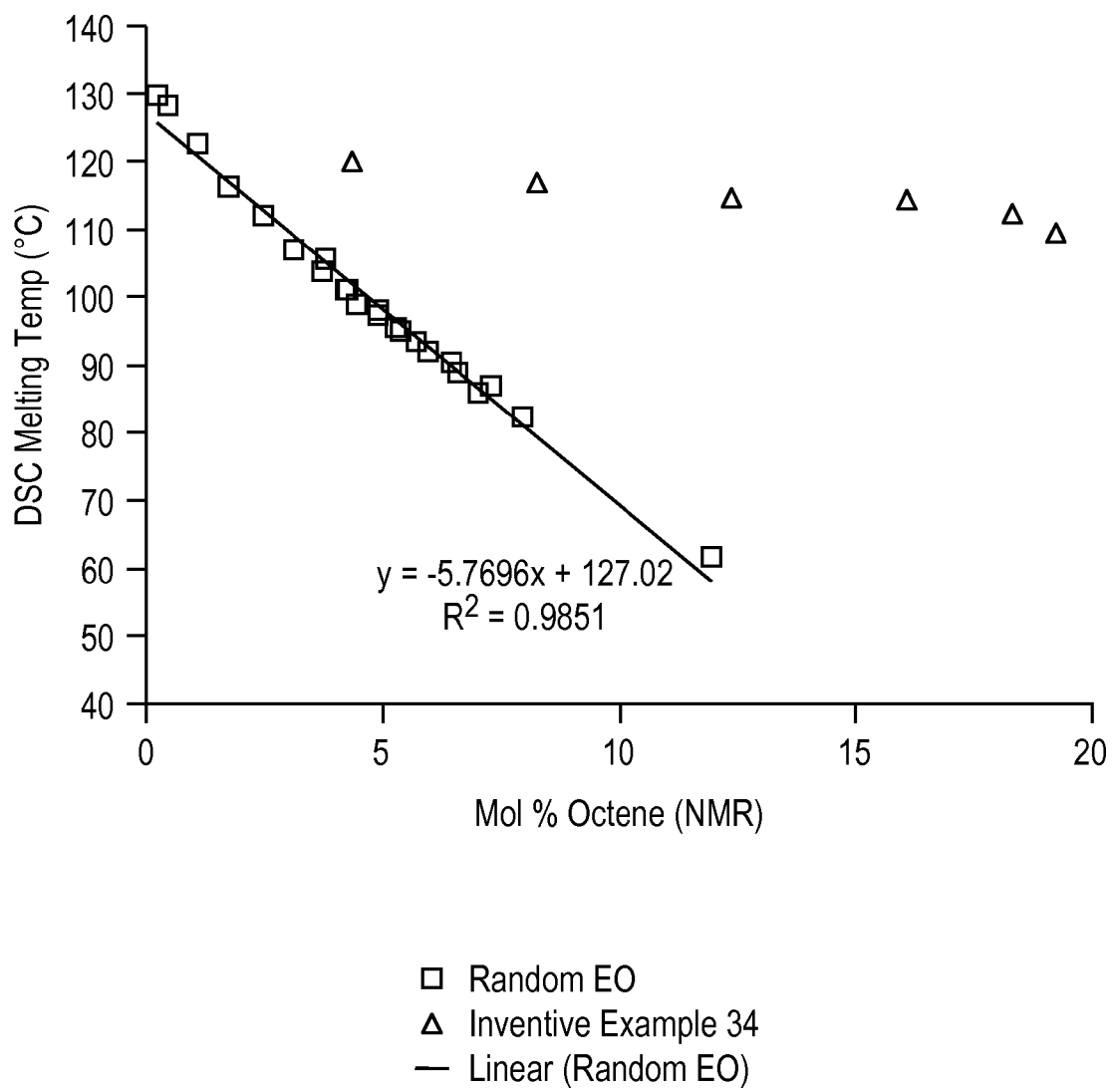

ed matrix are described in Mohajer, Y., Wilkes, G. L., Wang, I. C., McGrath, J. E., *Polymer*, 23, 1523 (1982) for hydrogenated butadiene-isoprene-butadiene (E-EP-E) triblocks and in Morton, M., McGrath, J. E., Juliano, P. C., *J. Polym. Sci., Part C*, 26, 99 (1969) for E-EP-E, E-EB-E and E-EDMB-E triblocks (EP=poly(ethylene-propylene), EB=poly(ethylene-1-butene), and EDMB=poly(ethylene-3,3-dimethyl-1-butene) from hydrogenation of 3,4-poly(isoprene), 1,2-poly(1,3-butadiene) and 1,2-poly(4,4-dimethyl-1,3-butadiene), respectively). In all cases, the ethylene blocks were found to crystallize normally to form chain folded lamellae. This morphology may be due to the fact the elastic segments are always above their T<sub>g</sub> and can readily rearrange to accommodate the growth of the ethylene lamellae.

SUMMARY OF THE INVENTION

Ethylene/α-olefin interpolymers are disclosed which comprise a plurality of blocks or segments of two or more polymerized monomer units differing in chemical or physical properties (block interpolymer), especially a multi-block copolymer, said block interpolymer having a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2,$$ and wherein the block interpolymer has a chain folded lamellar morphology characterized by either (i) at least one non-spherulitic super-structure and fringed micellar and/or bundled crystals, as determined by AFM and/or TEM, (ii) at least one non-spherulitic super-structure and crystal thicknesses as determined by small angle X-ray scattering (SAXS), ranging from 40 to 300, preferably from 50 to 250, more preferably from 60 to 200 Å, (iii) fringed micellar and/or bundled crystals, as determined by AFM and/or TEM, and crystal thicknesses, as determined by small angle X-ray scattering (SAXS), ranging from 40 to 300, preferably from 50 to 250, more preferably from 60 to 200 Å, or (iv) at least one non-spherulitic super-structure, fringed micellar and/or bundled crystals, as determined by AFM and/or TEM, and crystal thicknesses, as determined by small angle X-ray scattering (SAXS), ranging from 40 to 300, preferably from 50 to 250, more preferably from 60 to 200 Å.

Ethylene/α-olefin interpolymers are also disclosed which comprise a plurality of blocks or segments of two or more polymerized monomer units differing in chemical or physical properties (block interpolymer), especially a multi-block copolymer, said block interpolymer having a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2,$$ and wherein the block interpolymer has a chain folded lamellar morphology characterized by at least one non-spherulitic super-structure, as determined by AFM and/or TEM.

Ethylene/α-olefin interpolymers are also disclosed which comprise a plurality of blocks or segments of two or more polymerized monomer units differing in chemical or physical properties (block interpolymer), especially a multi-block copolymer, said block interpolymer having a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2,$$ and wherein the block interpolymer has a chain folded lamellar morphology characterized by fringed micellar and/or bundled crystals, as determined by AFM and/or TEM.

Ethylene/α-olefin interpolymers are also disclosed which comprise a plurality of blocks or segments of two or more polymerized monomer units differing in chemical or physical properties (block interpolymer), especially a multi-block copolymer, said block interpolymer having a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2,$$ and wherein the block interpolymer has a chain folded lamellar morphology characterized by crystal thicknesses, as determined by small angle X-ray scattering (SAXS), ranging from 40 to 300, preferably from 50 to 250, more preferably from 60 to 200 Å.

Preferred ethylene/α-olefin interpolymers are those wherein the non-spherulitic super-structure is a bundle or a sheaf-like structure. The bundle or sheaf-like structure may include thread-like lamellae. Preferred ethylene/α-olefin interpolymers are also those wherein the non-spherulitic super-structure is characterized by an absence of Maltese-cross patterns as determined by polarized optical microscopy. Preferred ethylene/α-olefin interpolymers are also those having a chain folded lamellar morphology characterized by radial lamellae. Preferred ethylene/α-olefin interpolymers are also those having a chain folded lamellar morphology characterized by an intermittent wide angle X-ray scattering (WAXS) intensity as a function of azimuthal angle along the Debye ring of the (110) reflection after a uniaxial deformation at room temperature to between 50 to 2000, preferably between 400 to 1000%. Preferred ethylene/α-olefin interpolymers are also those having a chain folded lamellar morphology characterized by an intermittent wide angle X-ray scattering (WAXS) intensity as a function of azimuthal angle along the Debye ring of the (110) reflection after a uniaxial deformation at room temperature to between 50 to 2000, preferably between 400 to 1000%.

matrix has been studied using ethylene-(3-methyl-butene) diblocks as described in Quiram, D. J., Register, R. A., Marchand, G. R., Ryan, A. J., *Macromolecules* 30, 8338 (1997) and using ethylene-(styrene-ethylene-butene) diblocks as described in Loo, Y. L., Register, R. A., Ryan, A. J., *Macromolecules* 35, 2365 (2002). When the matrix was either glassy or was elastic but with a high degree of segregation between the blocks, the solid state structure showed the classical morphology of amorphous block copolymers such as styrene-butadiene-styrene (SBS), in which the different polymer segments were constrained into microdomains of approximately 25 nm in diameter. Crystallization of the ethylene segments in these systems was primarily constrained to the resulting microdomains. Microdomains can take the form of spheres, cylinders, lamellae, or other morphologies. The narrowest dimension of a microdomain, such as perpendicular to the plane of lamellae, is constrained to <60 nm in these systems. It is more typical to find constraints on the diameter of the spheres and cylinders, and the thickness of the lamellae to <30 nm Such materials may be referred to as microphase separated. FIG. 1 shows the predicted lamellar domain thickness for monodisperse ethylene/octene diblock copolymers at different values of total molecular weight and Δ octene mole %. The figure demonstrates that, even at very large differences in octene content of the blocks, molecular weights in excess of 180,000 g/mol are necessary to achieve domain sizes of 50 nm. The high viscosity which is unavoidable at such high molecular weights greatly complicates the production and processing of these materials. The calculation applied the theoretical results of Matsen, M. W.; Bates, F. S. *Macromolecules* (1996) 29, 1091 at a temperature of 140° C., a characteristic ratio of 7.5, and a melt density of 0.78 g/cm³. The correlation between octene mole % and $\chi$ was determined using the experimental results of Reichart, G. C. et al, *Macromolecules* (1998) 31, 7886.

Block copolymers containing both crystalline and amorphous blocks can crystallize from disordered, rather than microphase separated, melts and produce a regular arrangement of crystalline lamellae as described in Rangarajan, P., Register, R. A., Fetters, L. J. *Macromolecules,* 26, 4640 (1993). The lamellar thickness of these materials is controlled by the composition and molecular weight of both blocks as described in theories by Dimarzio, E. A., Guttmann, C. M., Hoffman, J. D., *Macromolecules,* 13, 1194 and Whitmore, M. D., Noolandi, J., *Macromolecules,* 21, 1482 (1988). For an ethylene based block copolymer, the maximum thickness of the crystalline region of these morphologies is the same as the maximum thickness of a high density polyethylene crystal which is about 22 nm.

These materials based on batch anionic polymerization can be additionally characterized as having very narrow molecular weight distributions, typically with Mw/Mn <1.2, and correspondingly narrow molecular weight distributions of their individual segments. They have also only been examined in the form of diblock and triblock copolymers since these are more readily synthesized via living anionic polymerization than structures with higher numbers of blocks.

Block copolymers from olefin monomers prepared using living polymerization catalysts were recently reviewed by Domski, G. J.; Rose, J. M.; Coates, G. W.; Bolig, A. D.; Brookhart, M., in *Prog. Polym. Sci.* 32, 30-92, (2007). Some of these monodisperse block copolymers also showed the classical morphology of amorphous block copolymers such as styrene-butadiene-styrene (SBS). Several of these block copolymers contain crystallizable segments or blocks, and crystallization of the segments in these systems was primarily constrained to the resulting microdomains. Syndiotactic polypropylene-block-poly(ethylene-co-propylene) and syndiotactic polypropylene-block-polyethylene, as described in Ruokolainen, J., Mezzenga, R., Fredrickson, G. H., Kramer, E. J., Hustad, P. D., and Coates, G. W., in *Macromolecules,* 38(3); 851-86023 (2005), form microphase separated morphologies with domain sizes consistent with monodisperse block copolymers (<60 nm). Similarly, polyethylene-block-poly(ethylene-co-propylene)s, as described by Matsugi, T.; Matsui, S.; Kojoh, S.; Takagi, Y.; Inoue, Y.; Nakano, T.; Fujita, T.; Kashiwa, N. in *Macromolecules,* 35(13); 4880-4887 (2002), are described as having microphase separated morphologies. Atactic polypropylene-block-poly(ethylene-co-propylene)s with narrow molecular weight distributions (Mw/Mn=1.07-1.3), as described in Fukui Y, Murata M. *Appl. Catal.* A 237, 1-10 (2002), are claimed to form microphase separated morphologies when blended with isotactic polypropylenes, with domains of amorphous poly(ethylene-co-propylene) between 50-100 nm. No microphase separation was observed in the bulk block copolymer.

Microphase separated diblock and triblock olefin block copolymers in which both block types are amorphous have also been prepared using living olefin polymerization techniques. A triblock poly(1-hexene)-block-poly(methylene-1,3-cyclopentene)-block-poly(1-hexene) copolymer, as described by Jayaratne K. C., Keaton R. J., Henningsen D. A., Sita L. R., *J. Am. Chem. Soc.* 122, 10490-10491 (2000), with Mn=30,900 g/mol and Mw/Mn=1.10 displayed a microphase separated morphology with cylinders of poly(methylene-1,3-cyclopentane) sized about 8 nm wide. Poly(methylene-1,3-cyclopentane-co-vinyltetramethylene)-block-poly(ethylene-co-norbornene) and poly(ethylene-co-propylene)-block-poly(ethylene-co-norbornene), as described by Yoon, J.; Mathers, R. T.; Coates, G. W.; Thomas, E. L. in *Macromolecules,* 39(5), 1913-1919 (2006), also display microphase separated morphologies. The poly(methylene-1,3-cyclopentane-co-vinyltetramethylene)-block-poly(ethylene-co-norbornene), with Mn=450,000 g/mol and Mw/Mn=1.41, has alternating domains of 68 and 102 nm, while the poly(ethylene-co-propylene)-block-poly(ethylene-co-norbornene), with Mn=576,000 g/mol and Mw/Mn=1.13, has domains sized 35-56 nm. These samples demonstrate the difficulty in achieving domain sizes >60 nm, as very high molecular weights are required to achieve such large domains.

Achieving microphase separated block copolymer morphologies usually requires unfavorable dispersive interactions between the segments of the different blocks, as characterized by the Flory-Huggins $\chi$ parameter, and high molecular weights. Representing the average block molecular weight as N, a typical narrow polydispersity diblock containing equal amounts by volume of the two blocks requires a value of $\chi$ times N greater than 5.25 for the melt to display an ordered microphase morphology as shown by L. Leibler, *Macromolecules* 13, 1602 (1980). This minimum value of $\chi$N to achieve order increases to about 6 for triblock copolymers with equal volumes of the two block types. As the number of blocks per molecule increases further, the required $\chi$N also increases and asymptotically approaches 7.55 in the limit of a large number of blocks per molecule as shown by T. A. Kavassalis, M. D. Whitmore, *Macromolecules* 24, 5340 (1991). Although multiblocks such as pentablocks have been shown to provide a substantial improvement in mechanical properties as described in T. J. Hermel, S. F. Hahn, K. A. Chaffin, W. W. Gerberich, F. S. Bates, *Macromolecules* 36, 2190 (2003), the overall molecular weight of these multiblocks has to be large in order to meet the requirements for ordered melt morphologies. Since the energy requirements to process a polymer increase sharply with molecular weight, the commercial opportunities of such multiblocks may be limited.

However, theoretical studies by S. W. Sides, G. H. Fredrickson, *J. Chem. Phys.* 121, 4974 (2004) and D. M. Cooke, A. Shi, *Macromolecules* 39, 6661 (2006) have shown that the minimum $\chi N$ for ordered morphologies decreases as the polydispersity of one or both of the block types is increased. When both block types have a most probable distribution of length, i.e. the ratio of weight average to number average block molecular weight is 2, the minimum value of $\chi N$, where N is the number average block length, in order to achieve an ordered morphology is 2 for equal volumes of the two block types as shown by I. I. Potemkin, S. V. Panyukov, *Phys. Rev. E.* 57, 6902 (1998) for multiblocks in the mean-field limit. This lower value in $\chi N$ translates to a substantial reduction in overall molecular weight for a melt ordered multiblock and, therefore, a drop in processing costs.

Another prediction of interest made by Potemkin, Panyukov and also by Matsen, M. W., *Phys. Rev. Lett.* 99, 148304 (2007) is that each transition in morphology, including the transition from disorder to order, does not occur abruptly as in monodisperse block copolymers. Instead, there are regions of coexisting phases along each boundary. Along the order-order boundaries, the overall composition of a molecule may determine how it partitions between phases. For example, polydisperse diblocks along the boundary between cylindrical and lamellar phases may have the more symmetric diblocks form lamellae while the asymmetric ones will tend to form cylinders. In the vicinity of the order-disorder boundary, molecules with longer blocks may form an ordered morphology while those with shorter blocks remain disordered. In some cases, these disordered molecules may form a distinct macrophase. Alternatively, the location of these molecules could be directed to the center of the ordered domains in a similar manner to the domain swelling that occurs when a homopolymer is blended with a block copolymer (Matsen, M. W., *Macromolecules* 28, 5765 (1995)).

In addition to achieving microphase separation at lower values of $\chi N$, block length polydispersity has also been hypothesized to have a pronounced effect on the domain spacing of the ordered structures. The size of the microdomains in monodisperse block copolymers is largely a function of the average molecular weight of a block, N, and is typically on the order of ~20-50 nm. However, it has been predicted that polydispersity leads to larger domain spacings as compared with equivalent monodisperse block copolymers (Cooke, D. M.; Shi, A. C. *Macromolecules*, 39, 6661-6671 (2006); Matsen, M. W., *Eur. Phys. J. E*, 21, 199-207 (2006)). The effects of polydispersity on phase behavior have also been demonstrated experimentally. Matsushita and coworkers approximated polydispersity by blending a series of monodisperse polystyrene-b-poly(2-vinylpyridine)s (Noro, A.; Cho, D.; Takano, A.; Matsushita, Y. *Macromolecules*, 38, 4371-4376 (2005)). Register and coworkers found ordered morphologies in a series of polystyrene-b-poly(acrylic acid)s synthesized using a controlled radical polymerization technique (Bendejacq, D.; Ponsinet, V.; Joanicot, M.; Loo, Y. L.; Register, R. A. *Macromolecules*, 35, 6645-6649 (2002)). Most recently, Lynd and Hillmyer (Lynd, N. A.; Hillmyer, M. A. *Macromolecules*, 38, 8803-8810 (2005)) evaluated a series of monodisperse poly(ethylene-alt-propylene)s that were chain extended with a block of poly(DL-lactide) using synthetic techniques that introduced polydispersity in the poly(DL-lactide) block. In all of these examples polydispersity led to increased domain spacings, suggesting that the longer blocks have a greater role in determining domain size. In some instances, polydispersity also produced changes in the type of ordered morphology. The range of techniques for synthesis of polydisperse block copolymers is extremely limited, and it is especially difficult to introduce polydispersity in multiple blocks while maintaining a high fraction of block copolymer.

The tendency for longer block lengths to have a greater role in determining domain size, combined with the ability to swell domains, creates the potential for domain sizes that are much larger than what is observed in typical monodisperse block copolymers. The ability for some molecules to be ordered and others disordered contributes to the formation of swollen domains. The morphology of these systems can be termed block copolymer-directed mesophase separation.

It would be useful to provide an olefin block copolymer with an overall molecular weight distribution and segment molecular weight distribution such that Mw/Mn >1.4, that is mesophase separated. It would also be useful to provide such a material that is a multi-block copolymer with a distribution in the number of blocks.

In addition, there is an unfulfilled need for mesophase separated block copolymers which are based on ethylene and α-olefins. There is also a need for block copolymers with low molecular weights (Mw<250,000 g/mol) that form domains larger than those from monodisperse block copolymers of the prior art, namely greater than 60 nm in the smallest dimension. There is also a need for a method of making such block copolymers.

SUMMARY OF THE INVENTION

The invention provides a composition comprising at least one ethylene/α-olefin block interpolymer, comprising one or more hard blocks and one or more soft blocks having a difference in mole percent α-olefin content, wherein the ethylene/α-olefin block interpolymer is characterized by a molecular weight distribution, $M_w/M_n$ in the range of from about 1.4 to about 2.8 and by an average block index greater than zero and up to about 1.0; and, wherein the ethylene/α-olefin block interpolymer is mesophase separated.

The invention also provides an ethylene/α-olefin block interpolymer comprising one or more hard blocks and one or more soft blocks having a difference in mole percent α-olefin content wherein the copolymer is characterized by an average molecular weight of greater than 40,000 g/mol, a molecular weight distribution, Mw/Mn, in the range of from about 1.4 to about 2.8, and a difference in mole percent α-olefin content between the soft block and the hard block of greater than about 18.5 mole percent.

The invention also provides an article made from the above described ethylene/α-olefin block copolymer.

BRIEF DESCRIPTION OF THE DRAWINGS

FIG. 35 shows a plot of DSC Tm vs. mol % octene for ATREF fractions of random ethylene-octene copolymers and for fractions of inventive Example 34.

DESCRIPTION OF EMBODIMENTS OF THE INVENTION

General Definitions

Figure 1:
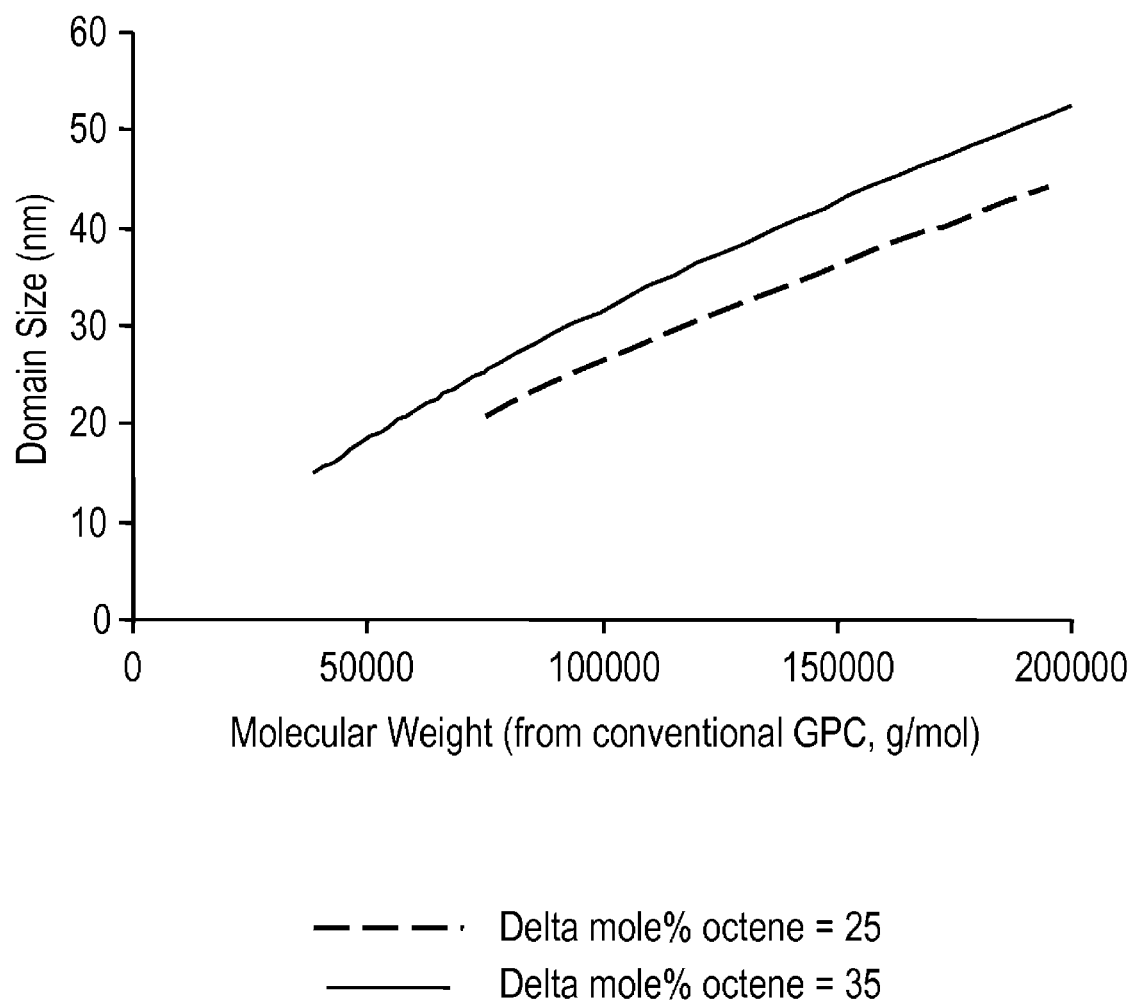
FIG. 1 is a plot of the predicted thickness of each domain for a monodisperse ethylene/octene diblock copolymer made with 50% of each block type at different values of the backbone molecular weight, as measured by conventional GPC, and different levels of Δ octene mole %.

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably, ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 75 mole percent of the whole polymer and an octene content of from about 5 to about 25, preferably from about 10 to about 20 mole percent of the whole polymer, and more preferably from about 15 to about 20 mole percent of the whole polymer. For many ethylene/butene copolymers, the preferred composition comprises an ethylene content greater than about 60 mole percent of the whole polymer and a butene content of from about 10 to about 40, preferably from about 20 to about 35 mole percent of the whole polymer, and more preferably from about 25 to about 30 mole percent of the whole polymer. For many ethylene/propylene copolymers, the preferred composition comprises an ethylene content greater than about 40 mole percent of the whole polymer and a propylene content of from about 15 to about 60, preferably from about 25 to about 50 mole percent of the whole polymer, and more preferably from about 35 to about 45 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The term "crystalline" if employed, refers to a polymer or a segment that possesses a first order transition or crystalline melting point (Tm) as determined by differential scanning calorimetry (DSC) or equivalent technique. The term may be used interchangeably with the term "semicrystalline". The crystals may exist as stacks of closely packed lamellar crystals, lamellae forming the arms of spherulites, or as isolated lamellar or fringed micellar crystals. The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (also referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or $M_w/M_n$), block length distribution, and/or block number distribution due to the unique process of making the copolymers. More specifically, when produced in a continuous process, the polymers desirably possess PDI from about 1.4 to about 8, preferably from about 1.4 to about 3.5, more preferably from about 1.5 to about 2.5, and most preferably from about 1.6 to about 2.5 or from about 1.6 to about 2.1. When produced in a batch or semi-batch process, the polymers possess PDI from about 1.4 to about 2.9, preferably from about 1.4 to about 2.5, more preferably from about 1.4 to about 2.0, and most preferably from about 1.4 to about 1.8. It is noted that "block(s)" and "segment(s)" are used herein interchangeably. In addition, the blocks of the polymer have a PDI in the range of from about 1.4 to about 2.5, preferably in the range of from about 1.4 to about 2.3, and more preferably in the range of from about 1.5 to about 2.3.

As used herein, "mesophase separation" means a process in which polymeric blocks are locally segregated to form ordered domains. Crystallization of the ethylene segments in these systems is primarily constrained to the resulting mesodomains and such systems may be referred to as "mesophase separated". These mesodomains can take the form of spheres, cylinders, lamellae, or other morphologies known for block copolymers. The narrowest dimension of a domain, such as perpendicular to the plane of lamellae, is generally greater than about 40 nm in the mesophase separated block copolymers of the instant invention.

The ethylene/α-olefin block interpolymer may have a value of $\chi N$, where N is the number average block length, in the range of from about 2 to about 20, preferably in the range of from about 2.5 to about 15, and more preferably in the range of from about 3 to about 10.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Embodiments of the invention provide a new class of ethylene/α-olefin block interpolymers (hereinafter "inventive polymer", "ethylene/α-olefin interpolymers", or variations thereof). The ethylene/α-olefin interpolymers comprise ethylene and one or more copolymerizable α-olefin comonomers in polymerized form, characterized by multiple blocks or segments of two or more polymerized monomer units differing in chemical or physical properties, wherein the polymers are mesophase separated. That is, the ethylene/α-olefin interpolymers are block interpolymers, preferably multi-block interpolymers or copolymers. The terms "interpolymer" and copolymer" are used interchangeably herein.

In some embodiments, the multi-block copolymer can be represented by the following formula:

(AB)$_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion. "Hard" segments refer to blocks of polymerized units in which ethylene is present in an amount greater than 95 weight percent, and preferably greater than 98 weight percent. In other words, the comonomer content in the hard segments is less than 5 weight percent, and preferably less than 2 weight percent. In some embodiments, the hard segments comprise all or substantially all ethylene. "Soft" segments, on the other hand, refer to blocks of polymerized units in which the comonomer content is greater than 5 weight percent, preferably greater than 8 weight percent, greater than 10 weight percent, or greater than 15 weight percent. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent.

In some embodiments, A blocks and B blocks are randomly distributed along the polymer chain. In other words, the block copolymers usually do not have a structure like:

AAA-AA-BBB-BB

In other embodiments, the block copolymers usually do not have a third type of block. In still other embodiments, each of block A and block B has monomers or comonomers randomly distributed within the block. In other words, neither block A nor block B comprises two or more segments (or sub-blocks) of distinct composition, such as a tip segment, which has a different composition than the rest of the block.

The ethylene/α-olefin interpolymers of the invention may be characterized as mesophase separated. Domain sizes are typically in the range of from about 40 nm to about 300 nm, preferably in the range of from about 50 nm to about 250 nm, and more preferably in the range of from about 60 nm to about 200 nm, as measured by the smallest dimension such as perpendicular to the plane of lamellae or the diameter of spheres or cylinders. In addition, domains may have smallest dimensions that are greater than about 60 nm, greater than about 100 nm, and greater than about 150 nm. Domains may be characterized as cylinders, spheres, lamellae, or other morphologies known for block copolymers. The mesophase separated polymers comprise olefin block copolymers wherein the amount of comonomer in the soft segments as compared to that in the hard segments is such that the block copolymer undergoes mesophase separation in the melt. The required amount of comonomer may be measured in mole percent and varies with each comonomer. A calculation may be made for any desired comonomer in order to determine the amount required to achieve mesophase separation. The minimum level of incompatibility, expressed as $\chi N$, to achieve mesophase separation in these polydisperse block copolymers is predicted to be $\chi N=2.0$ (I.I. Potemkin, S. V. Panyukov, *Phys. Rev. E.* 57, 6902 (1998)). Recognizing that fluctuations usually push the order-disorder transition to slightly higher $\chi N$, a value $\chi N=2.34$ has been used as the minimum in the calculations below. Following the approach of D. J. Lohse, W. W. Graessley, *Polymer Blends Volume 1: Formulation*, ed. D. R. Paul, C. B. Bucknall, 2000, $\chi N$ can be converted to the product of $\chi/v$ and $M/\rho$ where v is a reference volume, M is the number average block molecular weight and $\rho$ is the melt density. The melt density is taken to be 0.78 g/cm$^3$ and a typical value of block molecular weight is approximately 25,500 g/mol based on a diblock at an overall molecular weight of 51,000 g/mol. $\chi/v$ for cases in which the comonomer is butene or propylene is determined using 130° C. as the temperature and then performing an interpolation or extrapolation of the data provided in Table 8.1 in the reference by Lohse and Graessley. For each comonomer type, a linear regression in mole percent comonomer was performed. For cases in which octene is the comonomer, the same procedure was performed with the data of Reichart, G. C. et al, *Macromolecules* (1998), 31, 7886. The entanglement molecular weight at 413 K (about 140° C.) in kg/mol is taken to be 1.1. Using these parameters, the minimum difference in comonomer content is determined to be, respectively, 20.0, 30.8 or 40.7 mole percent when the comonomer is octene, butene, or propylene. When the comonomer is 1-octene, the difference in mole percent octene between the hard segment and the soft segment, Δ octene, is greater than or equal to about 20.0 mole percent, more preferably greater than or equal to about 22 mole percent and may also be greater than or equal to about 23 mole percent, greater than or equal to 24 mole percent, greater than about or equal to 25 mole percent and greater than about or equal to 26 mole percent. In addition, the Δ octene value may be in the range of from about 20.0 mole percent to about 60 mole percent and more preferably in the range of from about 22 mole percent to about 45 mole percent. When the comonomer is 1-butene, the difference in mole percent butene between the hard segment and the soft segment, Δ butene, is greater than or equal to about 30.8 mole percent, more preferably greater than or equal to about 33.9 mole percent and may also be greater than or equal to about 35.4 mole percent, greater than or equal to 36.9 mole percent, greater than or equal to about 38.5 mole percent and greater than or equal to about 40.0. In addition, the Δ butene value may be in the range of from about 30.8 mole percent to about 80 mole percent, preferably in the range of from about 33.9 mole percent to about 60 mole percent, preferably in the range of from about 36 mole percent to about 50 mole percent and more preferably in the range of from about 37 mole percent to about 40 mole percent. When the comonomer is propylene, the difference in mole percent propylene between the hard segment and the soft segment, Δ propylene, is greater than or equal to about 40.7 mole percent, greater than or equal to about 44.7 mole percent, preferably greater than or equal to about 46.8 mole percent, more preferably greater than or equal to about 48.8 mole percent and may also be greater than or equal to about 50.9 mole percent, and greater than or equal to 52.9 mole percent. In addition, the Δ propylene value may be in the range of from about 40.7 mole percent to about 95 mole percent, preferably in the range of from about 44.7 mole percent to about 65 mole percent and more preferably in the range of from about 48.8 mole percent to about 60 mole percent.

The mesophase separated ethylene/α-olefin interpolymers may have characteristics of photonic crystals, periodic optical structures designed to affect the motion of photons. Certain compositions of these mesophase separated ethylene/α-olefin interpolymers appear pearlescent by eye. In some instances, films of the mesophase separated ethylene/α-olefin interpolymers reflect light across a band of wavelengths in the range between about 200 nm to about 1200 nm. For example, certain films appear blue via reflected light but yellow via transmitted light. Other compositions reflect light in the ultraviolet (UV) range, from about 200 nm to about 400 nm, while others reflect light in the infrared (IR) range, from about 750 nm to about 1000 nm.

In some embodiments, the invention comprises a composition comprising at least one ethylene/α-olefin block interpolymer, comprising one or more hard blocks and one or more soft blocks, wherein the ethylene/α-olefin block interpolymer is characterized by a molecular weight distribution, $M_w/M_n$, in the range of from about 1.4 to about 2.8 and:

(a) has at least one melting point, $T_m$, in degrees Celsius, and a density, d, in grams/cubic centimeter, wherein the numerical values of $T_m$ and d correspond to the relationship:

$$T_m > -6553.3 + 13735(d) - 7051.7(d)^2, \text{ or}$$

(b) is characterized by a heat of fusion, ΔH in J/g, and a delta quantity, ΔT, in degrees Celsius, defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G' (25° C.), and a storage modulus at 100° C., G'(100° C.), wherein the ratio of G'(25° C.) to G' (100° C.) is in the range of about 1:1 to about 9:1; or (f) is characterized by an average block index greater than zero and up to about 1.0; and, wherein the ethylene/α-olefin block interpolymer is mesophase separated.

The ethylene/α-olefin interpolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where $BI_i$ is the block index for the $i^{th}$ fraction of the inventive ethylene/α-olefin interpolymer obtained in preparative TREF, and $w_i$ is the weight percentage of the $i^{th}$ fraction. Similarly, the square root of the second moment about the mean, hereinafter referred to as the second moment weight average block index, can be defined as follows.

Figure 2:
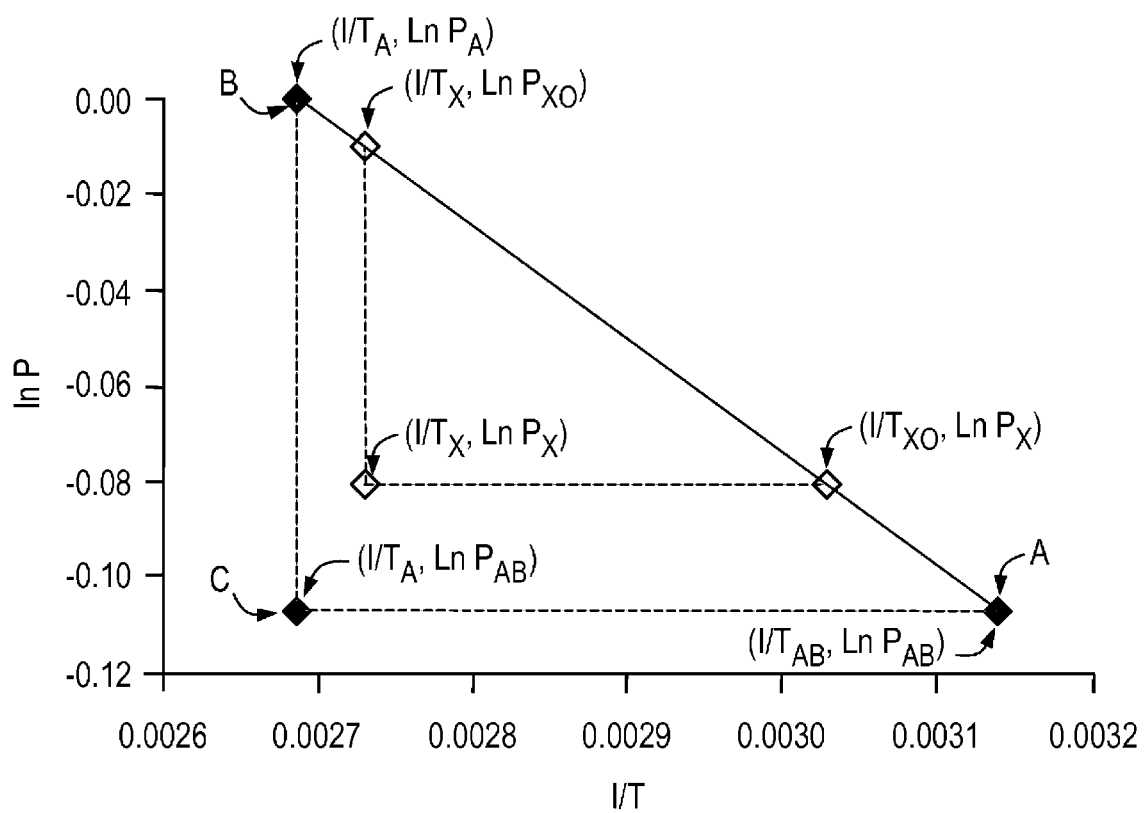
FIG. 2 is a plot constructed on the basis of the Flory equation for random ethylene/α-olefin copolymers to illustrate the definition of "block index." "A" represents the whole, perfect random copolymer; "B" represents a pure "hard segment"; and "C" represents the whole, perfect block copolymer having the same comonomer content as "A". A, B, and C define a triangular area within which most TREF fractions would fall.

$2^{nd}$ moment weight average $$BI = \sqrt{\frac{\sum (w_i (BI_i - ABI)^2)}{\frac{(N-1)\sum w_i}{N}}}$$

where N is defined as the number of fractions with $BI_i$ greater than zero. Referring to FIG. 2, for each polymer fraction, BI is defined by one of the two following equations (both of which give the same BI value):

$$BI = \frac{1/T_X - 1/T_{XO}}{1/T_A - 1/T_{AB}}$$

or $$BI = -\frac{LnP_X - LnP_{XO}}{LnP_A - LnP_{AB}}$$

where $T_X$ is the ATREF (i.e., analytical TREF) elution temperature for the $i^{th}$ fraction (preferably expressed in Kelvin), $P_X$ is the ethylene mole fraction for the $i^{th}$ fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

Figure 3:
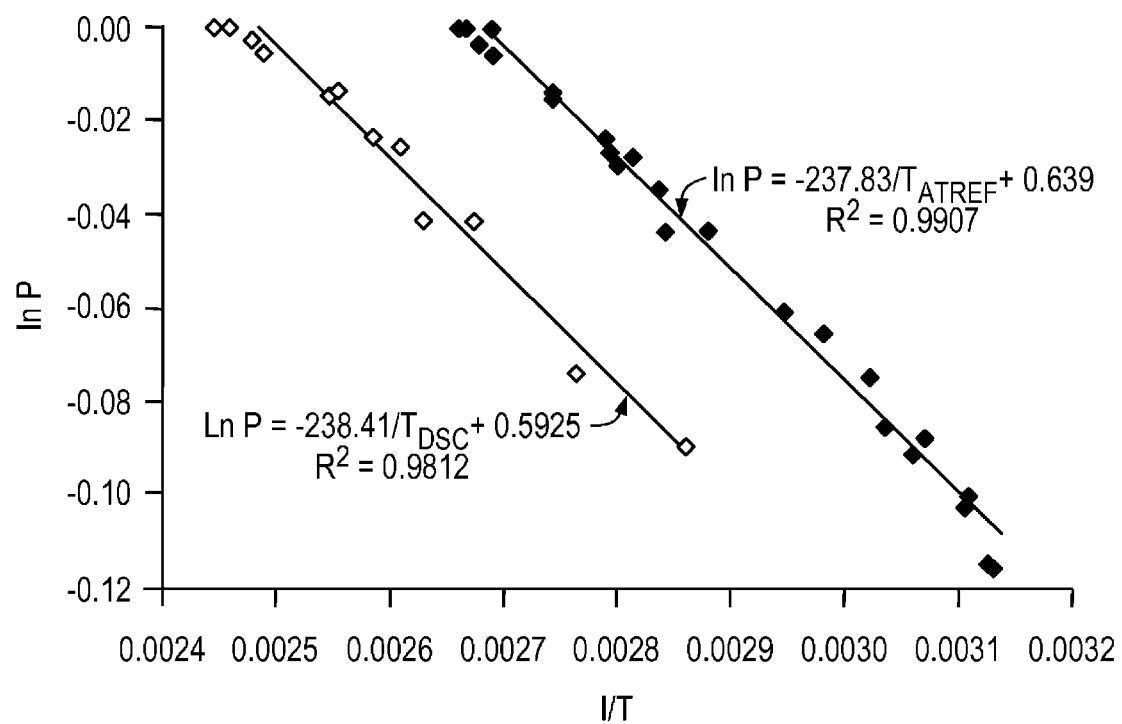
FIG. 3 is a plot of natural log ethylene mole fraction for random ethylene/α-olefin copolymers as a function of the inverse of DSC peak melting temperature or ATREF peak temperature. The filled squares represent data points obtained from random homogeneously branched ethylene/α-olefin copolymers in ATREF; and the open squares represent data points obtained from random homogeneously branched ethylene/α-olefin copolymers in DSC. "P" is the ethylene mole fraction; "T" is the temperature in Kelvin.

$T_{AB}$ is the ATREF elution temperature for a random copolymer of the same composition (having an ethylene mole fraction of $P_{AB}$) and molecular weight as the inventive copolymer. $T_{AB}$ can be calculated from the mole fraction of ethylene (measured by NMR) using the following equation:

$$LnP_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments as illustrated in FIG. 3, random ethylene copolymers and/or preparative TREF fractions of random copolymers satisfy the following relationship:

$$LnP = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $LnP_X=\alpha/T_{XO}+\beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from $Ln\ P_{XO}=\alpha/T_X+\beta$ using a measured value of $T_X$.

Further description of the block index methodology is referenced in *Macromolecular Symposia*, Vol 257, (2007), pp 80-93 which is incorporated by reference herein in its entirety.

Once the block index (BI) for each preparative TREF fraction is obtained, the weight average block index, ABI, for the whole polymer can be calculated. In some embodiments, ABI is greater than zero but less than about 0.4 or from about 0.1 to about 0.3. In other embodiments, ABI is greater than about 0.4 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and the polymer having a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

In addition to an average block index and individual fraction block indices, the ethylene/α-olefin interpolymers are characterized by one or more of the properties described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$T_m > -6553.3 + 13735(d) - 7051.7(d)^2$, and preferably $T_m \geq -6880.9 + 14422(d) - 7404.3(d)^2$, and more preferably $T_m \geq -7208.6 - 15109(d) - 7756.9(d)^2$.

Figure 4:
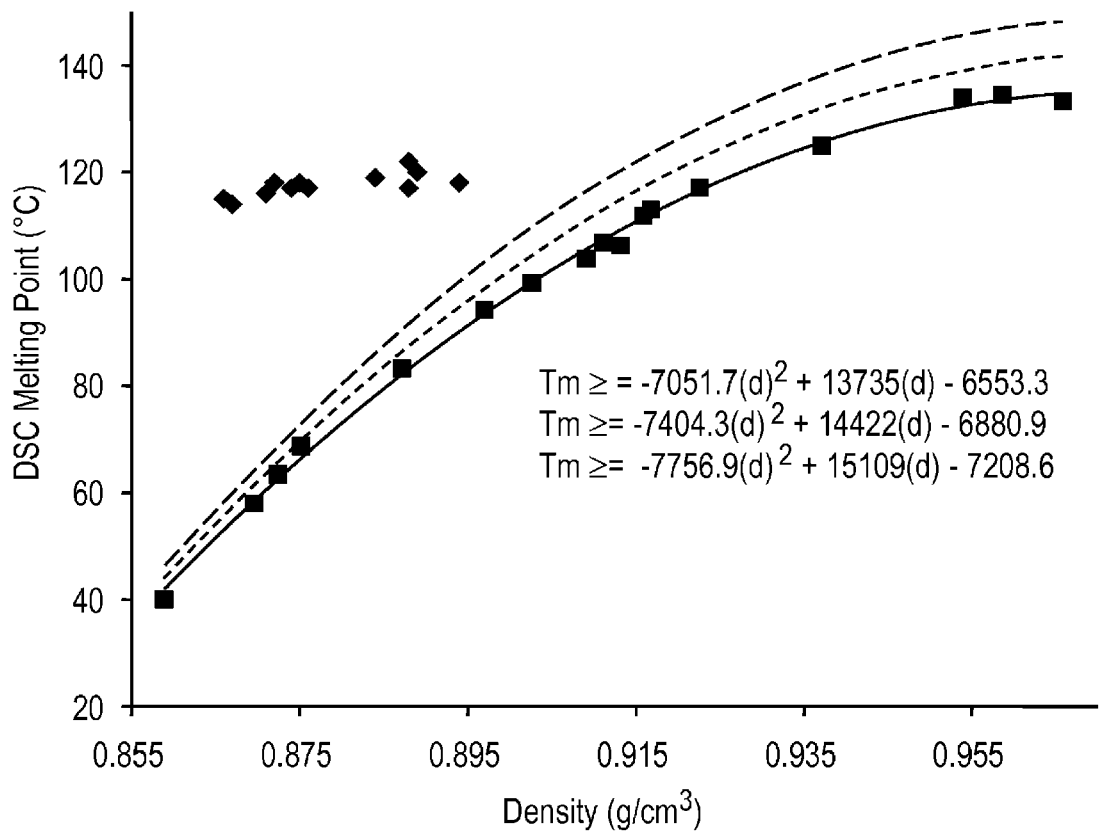
FIG. 4 shows the melting point/density relationship for mesophase separated olefin block copolymers (represented by diamonds) as compared to traditional random copolymers (represented by squares).

Such melting point/density relationship is illustrated in FIG. 4. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 125° C. when density ranges from 0.855 g/cc to about 0.895 g/cc. In some embodiments, the melting point of such polymers are in the range of about 110° C. to about 125° C. when density ranges from 0.855 g/cc to about 0.895 g/cc.

Figure 5:
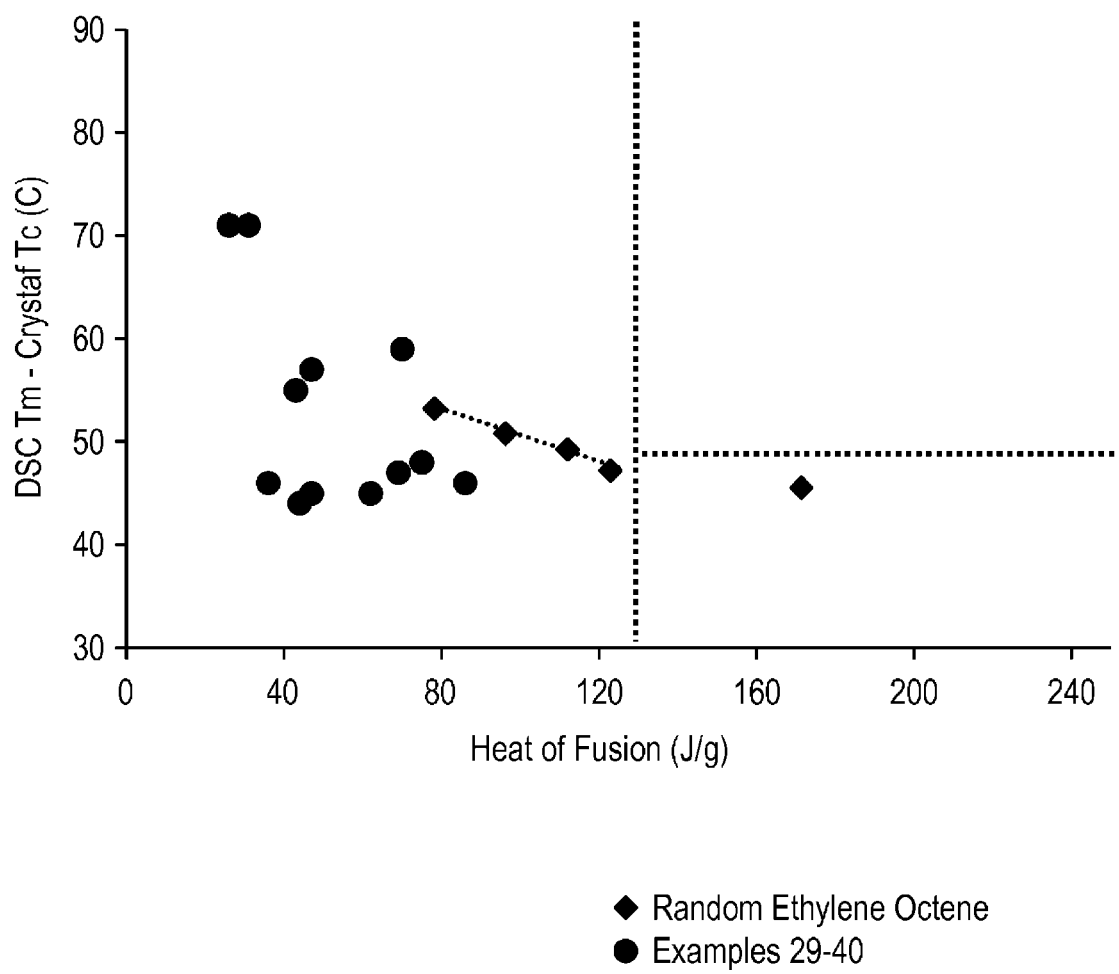
FIG. 5 shows plots of delta DSC-CRYSTAF as a function of DSC Melt Enthalpy for various polymers. The diamonds represent random ethylene/octene copolymers; and the circles represent polymer Examples 29-40.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$\Delta T > -0.1299(\Delta H) + 62.81$, and preferably $\Delta T \geq -0.1299(\Delta H) + 64.38$, and more preferably $\Delta T \geq -0.1299(\Delta H) + 65.95$, for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 5 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299 (ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481-1629(d)$; and preferably $Re \geq 1491-1629(d)$; and more preferably $Re \geq 1501-1629(d)$; and even more preferably $Re \geq 1511-1629(d)$.

Figure 6:
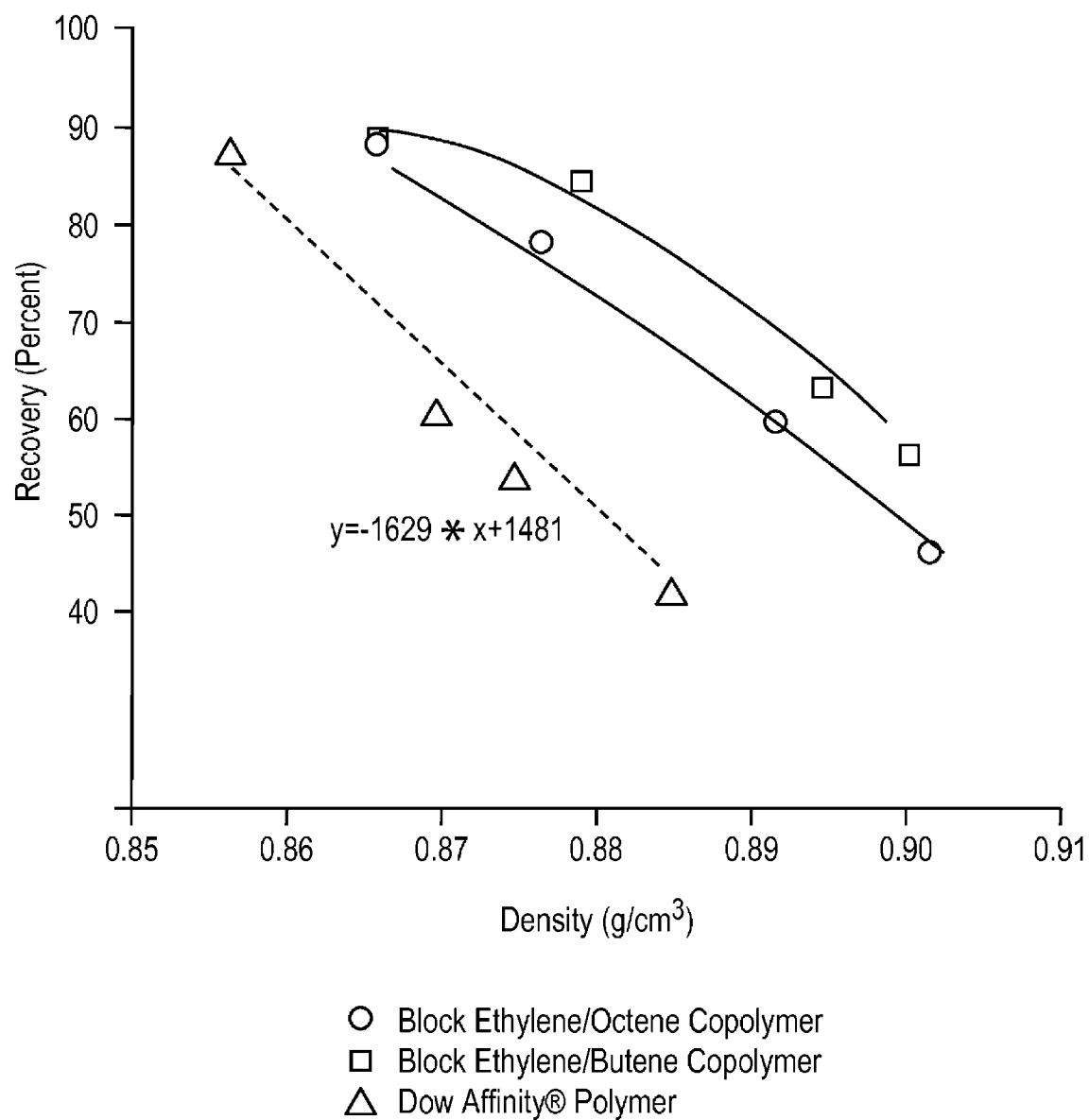
FIG. 6 shows the effect of density on elastic recovery for unoriented films made from olefin block copolymers (represented by the squares and circles) and traditional copolymers (represented by the triangles which are AFFINITY® polymers (The Dow Chemical Company)). The squares represent inventive ethylene/butene copolymers; and the circles represent inventive ethylene/octene copolymers.

FIG. 6 shows the effect of density on elastic recovery for unoriented films made from certain block interpolymers and traditional random copolymers. For the same density, the block interpolymers have substantially higher elastic recoveries.

In some embodiments, the ethylene/α-olefin interpolymers have an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 20, preferably from 1 to 10, more preferably from 1 to 5; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close to zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

In addition, the inventive block interpolymers have additional characteristics or properties. In one aspect, the interpolymers, preferably comprising ethylene and one or more copolymerizable comonomers in polymerized form, are characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C. when fractionated using TREF, characterized in that said fraction has a molar comonomer content higher, preferably at least 5 percent higher, more preferably at least 10 percent higher, than that of a comparable random ethylene interpolymer fraction eluting between the same temperatures, wherein said comparable random ethylene interpolymer comprises the same comonomer(s), and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Comonomer content may be measured using any suitable technique, with techniques based on nuclear magnetic resonance ("NMR") spectroscopy preferred. Moreover, for polymers or blends of polymers having relatively broad TREF curves, the polymer is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymer has a higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 7:
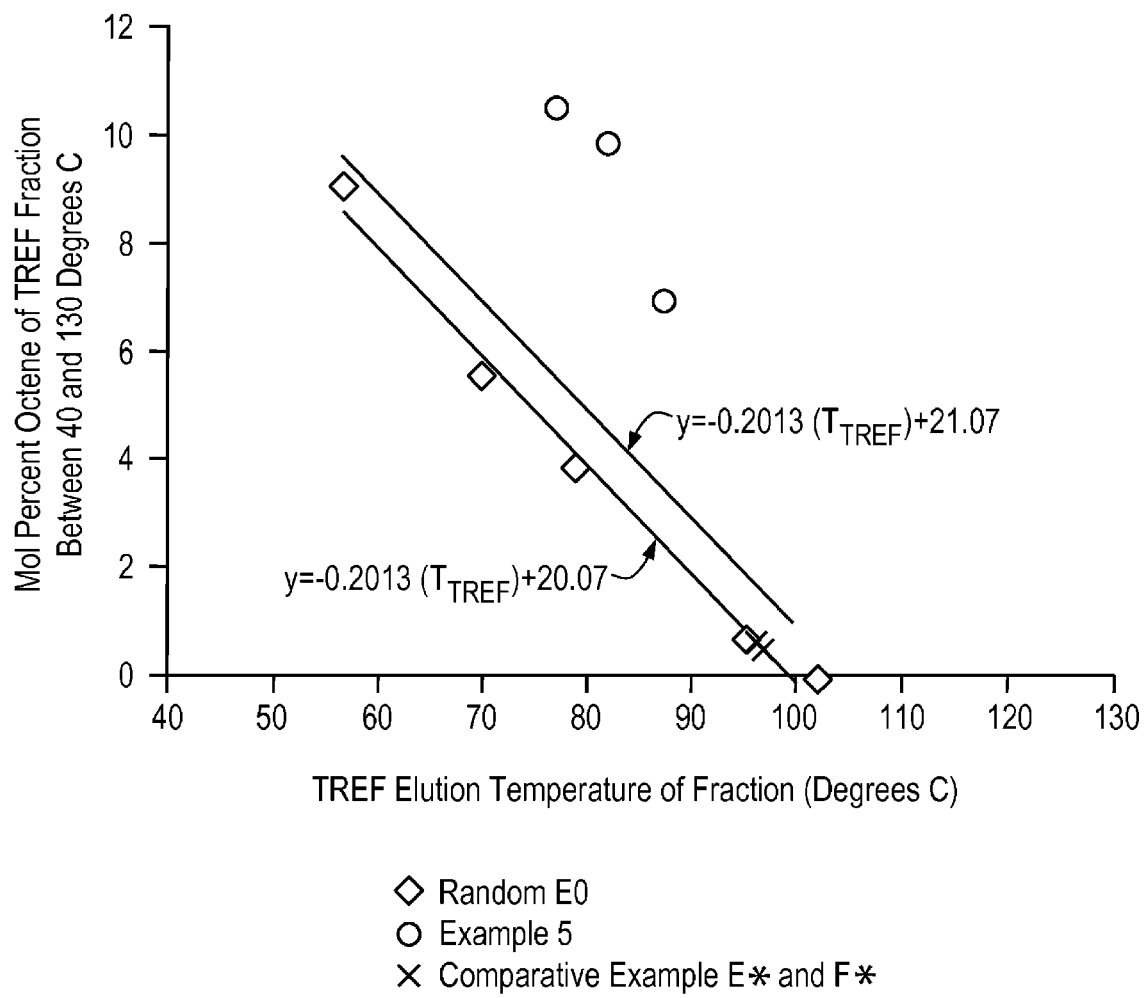
FIG. 7 is a plot of octene content of Temperature Rising Elution Fractionation ("TREF") fractionated ethylene/1-octene copolymer fractions versus TREF elution temperature of the fraction for the polymer of Example 5 (represented by the circles) and comparative polymers E and F (represented by the "X" symbols). The diamonds represent traditional random ethylene/octene copolymers.

FIG. 7 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of a block ethylene/1-octene interpolymer. All of the block interpolymer fractions have significantly higher 1-octene content than either line at equivalent elution temperatures. This result is characteristic of the olefin block copolymer and is believed to be due to the presence of differentiated blocks within the polymer chains, having both crystalline and amorphous nature.

Figure 8:
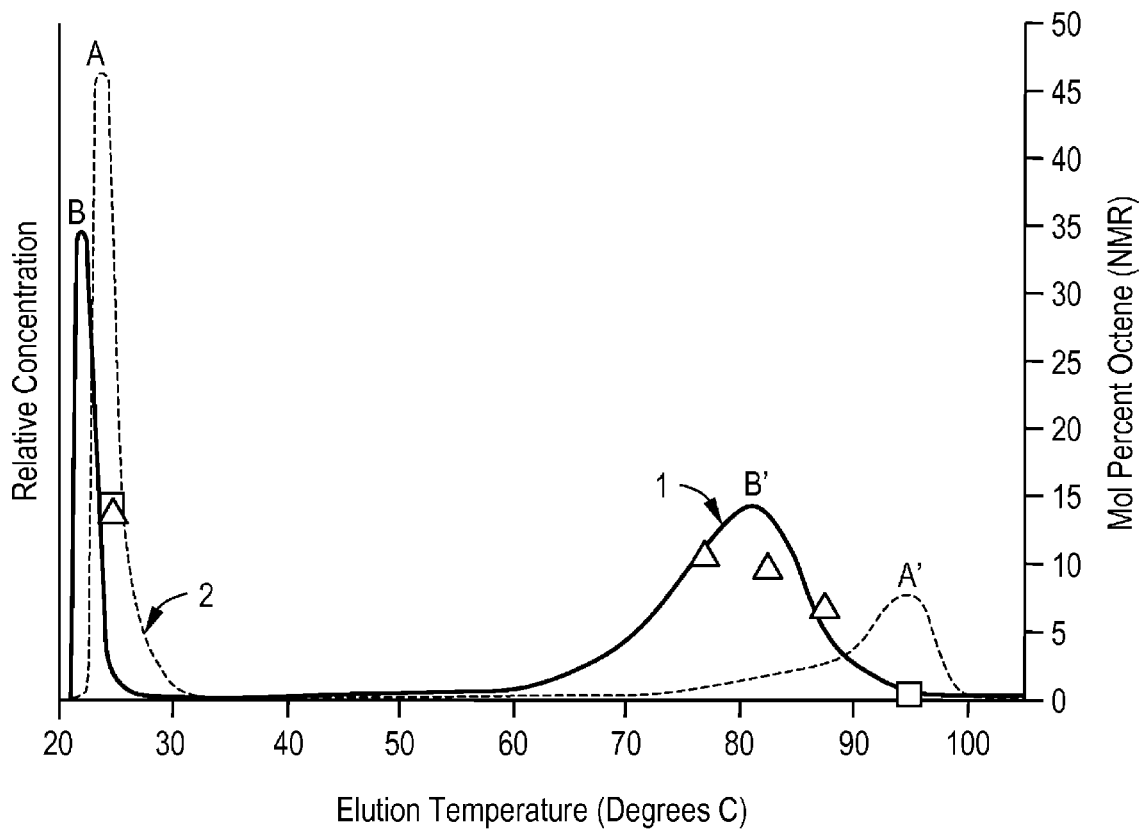
FIG. 8 is a plot of octene content of TREF fractionated ethylene/1-octene copolymer fractions versus ATREF elution temperature of the fraction for the polymer of Example 5 and for comparative F*. The squares represent Polymer Example F*; and the triangles represent Polymer Example 5. Also shown is the ATREF temperature distribution for Example 5 (curve 1) and comparative F* (curve 2).

FIG. 8 graphically displays the TREF curve and comonomer contents of polymer fractions for Example 5 and comparative F to be discussed below. The peak eluting from 40° C. to 130° C., preferably from 60° C. to 95° C. for both polymers is fractionated in 5° C. increments. Actual data for three of the fractions for Example 5 are represented by triangles. The skilled artisan can appreciate that an appropriate calibration curve may be constructed for interpolymers with differing comonomer content fitted to the ATREF temperature values. Preferably, such calibration curve is obtained using comparative interpolymers of the same monomers, preferably random copolymers made using a metallocene or other homogeneous catalyst composition. The olefin block copolymers are characterized by a molar comonomer content greater than the value determined from the calibration curve at the same ATREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1356) T+13.89, more preferably greater than or equal to the quantity (−0.1356) T+14.93, and most preferably greater than or equal to the quantity (−0.2013)T+21.07, where T is the numerical value of the peak ATREF elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion}(J/gm) \leq (3.1718)(ATREF \text{ elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion}(J/gm) \leq (1.1312)(ATREF \text{ elution temperature in Celsius}) + 22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers", *Polymeric Materials Science and Engineering* (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", *Polymer* (2002), 43, 59-170, both of which are incorporated by reference herein in their entirety.

It should be noted that while the TREF fractions in the above description are obtained in a 5° C. increment, other temperature increments are possible. For instance, a TREF fraction could be in a 4° C. increment, a 3° C. increment, a 2° C. increment, or 1° C. increment.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 90 J/g or less; (3) an ethylene content of at least 50 weight percent; (4) a glass transition temperature, $T_g$, of less than −25° C., more preferably less than −30° C., and/or (5) one and only one $T_m$.

Figure 9:
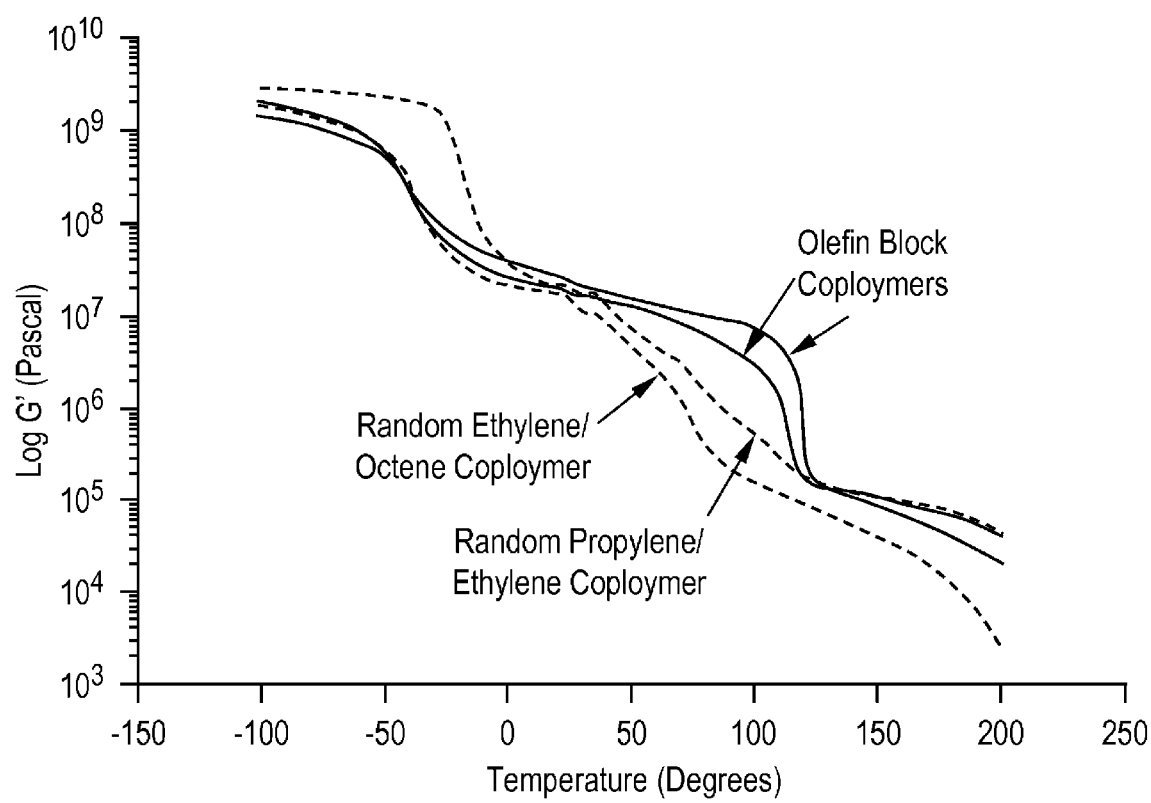
FIG. 9 is a graph of log storage modulus as a function of temperature for comparative ethylene/1-octene copolymer (curve 2) and propylene/ethylene copolymer (curve 3) and for two ethylene/1-octene block copolymers made with differing quantities of chain shuttling agent (curves 1).

Further, the inventive polymers can have, alone or in combination with any other properties disclosed herein, a storage modulus, G', such that log(G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (such as that illustrated in FIG. 9 and FIG. 32 that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The general process of making the polymers has been disclosed in the following patent applications and publications: U.S. Provisional Application No. 60/553,906, filed Mar. 17, 2004; U.S. Provisional Application No. 60/662,937, filed Mar. 17, 2005; U.S. Provisional Application No. 60/662, 939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; PCT Application No. PCT/US2005/008917, filed Mar. 17, 2005; PCT Publication No. WO 2005/090425, published Sep. 29, 2005; PCT Publication No. WO 2005/090426, published Sep. 29, 2005; and, PCT Publication No. WO 2005/090427, published Sep. 29, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agents are as follows.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, U.S. Pat. Nos. 6,953,764 and 6,960, 635, and WO 04/24740:

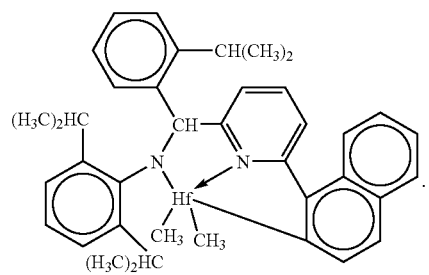

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, U.S. Pat. Nos. 6,953,764 and 6,960,635, and WO 04/24740:

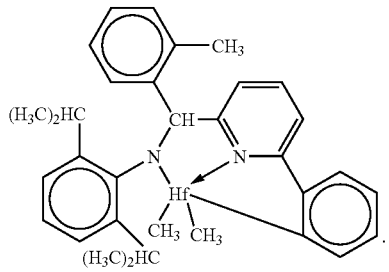

Catalyst (A3) is bis[N,N'''-(2,4,6-tri(methylphenyl)amido) ethylenediamine]hafnium dibenzyl:

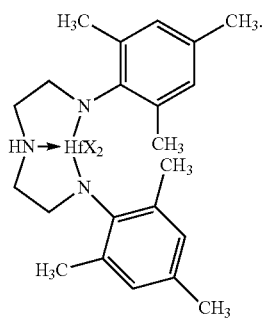

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of U.S. Pat. No. 6,897,276:

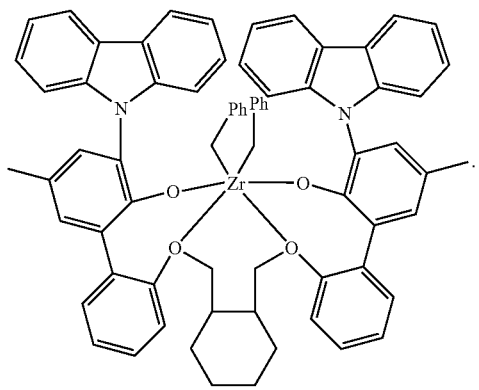

Catalyst (B1) is 1,2-bis-(3,5-di-t-butylphenylene)(1-(N-(1-methylethyl)immino)methyl)(2-oxoyl) zirconium dibenzyl:

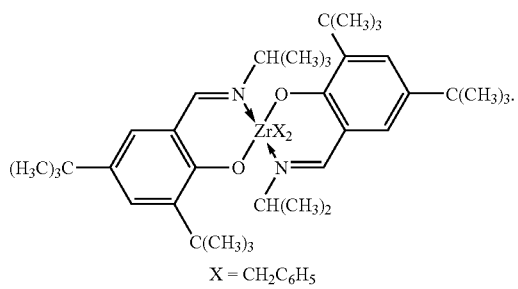

X = CH₂C₆H₅

Catalyst (B2) is 1,2-bis-(3,5-di-t-butylphenylene)(1-(N-(2-methylcyclohexyl)-immino)methyl)(2-oxoyl) zirconium dibenzyl:

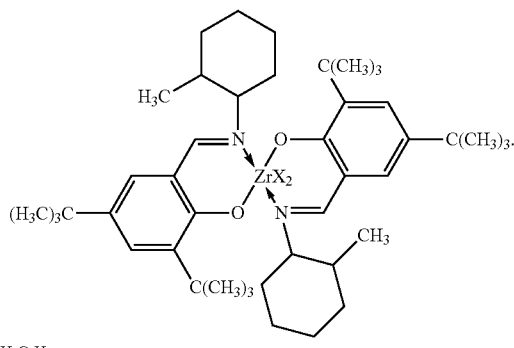

X = CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

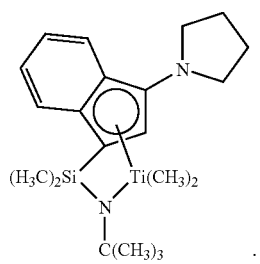

Catalyst (C2) is (t-butylamido)di(4-methylphenyl)(2-methyl-1,2,3,3a,7a-η-inden-1-yl)silanetitanium dimethyl prepared substantially according to the teachings of U.S. Pat. No. 6,825,295:

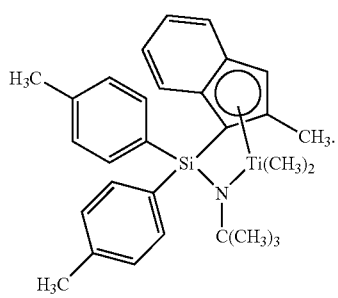

Catalyst (C3) is (t-butylamido)di(4-methylphenyl)(2-methyl-1,2,3,3a,8a-η-s-indacen-1-yl)silanetitanium dimethyl prepared substantially according to the teachings of U.S. Pat. No. 6,825,295:

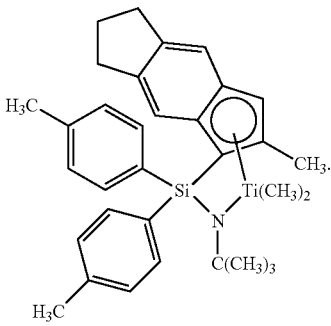

Catalyst (D1) is bis(dimethyldisiloxane)(indene-1-yl)zirconium dichloride available from Sigma-Aldrich:

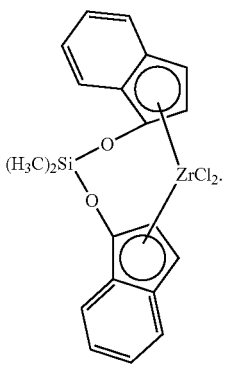

Shuttling Agents The shuttling agents employed include diethylzinc, di(1-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content, the inventive interpolymers have better (higher) heat resistance as measured by melting point, lower compression set, particularly at elevated temperatures, lower stress relaxation, higher creep resistance, faster setup due to higher crystallization (solidification) temperature, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene/α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2$=$CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is maleic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

More on Block Index

Random copolymers satisfy the following relationship. See P. J. Flory, *Trans. Faraday Soc.*, 51, 848 (1955), which is incorporated by reference herein in its entirety.

$$\frac{1}{T_m} - \frac{1}{T_m^0} = -\left(\frac{R}{\Delta H_u}\right) \ln P \quad (1)$$

In Equation 1, the mole fraction of crystallizable monomers, P, is related to the melting temperature, $T_m$, of the copolymer and the melting temperature of the pure crystallizable homopolymer, $T_m^0$. The equation is similar to the relationship for the natural logarithm of the mole fraction of ethylene as a function of the reciprocal of the ATREF elution temperature (° K) as shown in FIG. 3 for various homogeneously branched copolymers of ethylene and olefins.

As illustrated in FIG. 3, the relationship of ethylene mole fraction to ATREF peak elution temperature and DSC melting temperature for various homogeneously branched copolymers is analogous to Flory's equation. Similarly, preparative TREF fractions of nearly all random copolymers and random copolymer blends likewise fall on this line, except for small molecular weight effects.

According to Flory, if P, the mole fraction of ethylene, is equal to the conditional probability that one ethylene unit will precede or follow another ethylene unit, then the polymer is random. On the other hand if the conditional probability that any 2 ethylene units occur sequentially is greater than P, then the copolymer is a block copolymer. The remaining case where the conditional probability is less than P yields alternating copolymers.

The mole fraction of ethylene in random copolymers primarily determines a specific distribution of ethylene segments whose crystallization behavior in turn is governed by the minimum equilibrium crystal thickness at a given temperature. Therefore, the copolymer melting and TREF crystallization temperatures of the inventive block copolymers are related to the magnitude of the deviation from the random relationship in FIG. 2, and such deviation is a useful way to quantify how "blocky" a given TREF fraction is relative to its random equivalent copolymer (or random equivalent TREF fraction). The term "blocky" refers to the extent a particular polymer fraction or polymer comprises blocks of polymerized monomers or comonomers. There are two random equivalents, one corresponding to constant temperature and one corresponding to constant mole fraction of ethylene. These form the sides of a right triangle as shown in FIG. 2, which illustrates the definition of the block index.

In FIG. 2, the point $(T_X, P_X)$ represents a preparative TREF fraction, where the ATREF elution temperature, $T_X$, and the NMR ethylene mole fraction, $P_X$, are measured values. The ethylene mole fraction of the whole polymer, $P_{AB}$, is also measured by NMR. The "hard segment" elution temperature and mole fraction, $(T_A, P_A)$, can be estimated or else set to that of ethylene homopolymer for ethylene copolymers. The $T_{AB}$ value corresponds to the calculated random copolymer equivalent ATREF elution temperature based on the measured $P_{AB}$. From the measured ATREF elution temperature, $T_X$, the corresponding random ethylene mole fraction, $P_{XO}$, can also be calculated. The square of the block index is defined to be the ratio of the area of the $(P_X, T_X)$ triangle and the $(T_A, P_{AB})$ triangle. Since the right triangles are similar, the ratio of areas is also the squared ratio of the distances from $(T_A, P_{AB})$ and $(T_X, P_X)$ to the random line. In addition, the similarity of the right triangles means the ratio of the lengths of either of the corresponding sides can be used instead of the areas.

$$BI = \frac{1/T_X - 1/T_{XO}}{1/T_A - 1/T_{AB}}$$

or $$BI = -\frac{LnP_X - LnP_{XO}}{LnP_A - LnP_{AB}}$$

It should be noted that the most perfect block distribution would correspond to a whole polymer with a single eluting fraction at the point $(T_A, P_{AB})$, because such a polymer would preserve the ethylene segment distribution in the "hard segment", yet contain all the available octene (presumably in runs that are nearly identical to those produced by the soft segment catalyst). In most cases, the "soft segment" will not crystallize in the ATREF (or preparative TREF).

Applications and End Uses

The inventive mesophase separated ethylene/α-olefin block interpolymers can be used in a variety of thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or nonwoven fabrics. The polymers may also be used in oriented film made in a double bubble or tenter frame process. Thermoplastic compositions comprising the inventive polymers include blends with other natural or synthetic polymers, additives, reinforcing agents, ignition resistant additives, antioxidants, stabilizers, colorants, extenders, crosslinking agents, blowing agents, and plasticizers. Of particular utility are multi-component fibers such as core/sheath fibers, having an outer surface layer, comprising at least in part, one or more polymers according to embodiments of the invention. The polymers may also be used in articles such as toys; jewelry, such as synthetic opals; and, decorative items, such as films.

They may additionally be used to form photonic crystals, photonic band gap materials, or elastomeric optical interference films. Such materials comprise periodic, phase-separated domains alternating in refractive index, with the domains sized to provide a photonic band gap in the UV-visible spectrum, such as those disclosed in U.S. Pat. No. 6,433,931, which is herein incorporated by reference.

A photonic band gap material is one that prohibits the propagation of electromagnetic radiation within a specified frequency range (band) in certain directions. That is, band gap materials prevent light from propagating in certain directions with specified energies. This phenomenon can be thought of as the complete reflection of electromagnetic radiation of a particular frequency directed at the material in at least one direction because of the particular structural arrangement of separate domains of the material, and refractive indices of those domains. The structural arrangement and refractive indices of separate domains that make up these materials form photonic band gaps that inhibit the propagation of light centered around a particular frequency. (Joannopoulos, et al., "Photonic Crystals, Molding the Flow of Light", Princeton University Press, Princeton, N.J., 1995). One-dimensional photonic band gap materials include structural and refractive periodicity in one direction, two-dimensional photonic band gap materials include periodicity in two directions, and three-dimensional photonic band gap materials include periodicity in three directions.

The reflectance and transmittance properties of a photonic crystal or optical interference film are characterized by the optical thickness of the domains or regions. The optical thickness is defined as the product of the actual thickness times its refractive index. Films can be designed to reflect infrared, visible, or ultraviolet wavelengths of light depending on the optical thickness of the domains.

The refractive indices of separate domains of the structures, and periodicity in structural arrangement, are tailored to meet desired criteria. The periodicity in structural arrangement is met by creating separate domains of size similar to the wavelength (in the material comprising the domain as opposed to in a vacuum (freespace)) of electromagnetic radiation desirably effected or blocked by the structure, preferably domains of size no greater than the wavelength of interest. The refractive index ratios between adjacent domains should be high enough to establish a band gap in the material. Band gap can be discussed with reference to the refractive index ratio ($n_1/n_2$), where $n_1$ is the effective index of refraction of a first domain and $n_2$ is the effective index of refraction of a second domain. In general, the larger the refractive index ratio (refractive contrast) the larger the band gap and, in the present invention, band gap is tailored to be above a predetermined threshold and extends in one dimension for one-dimensional systems, two dimensions for two-dimensional systems, and three dimensions for three-dimensional systems. Suitable choices can be made so as to tailor the refractive index profile of the adjacent domains to selectively concentrate or diffuse the optical field intensity produced by the structure. This can be accomplished in the present invention by tailoring the composition of the hard and soft blocks. The refractive index contrast can be further enhanced by blending components that have a preferential affinity for one type of domain. One approach is to employ high index nanoparticle additives, such as CdSe particles, which are coated with a surfactant layer and selectively incorporated into one of the domains. Preferably, adjacent, dissimilar domains or segments having a difference in mole percent α-olefin content differ in refractive index such that the ratio of the refractive index of one to the other is greater than 1, preferably at least about 1.01, and more preferably at least about 1.02 for a continuous set of wavelengths lying within a wavelength range of from about 100 nm to about 10 μm. In some embodiments, the refractive index ratio is from 1.00 to 1.10, preferably 1.01 to 1.06 and more preferably 1.02 to 1.05 for a continuous set of wavelengths lying within a wavelength range of from about 100 nm to about 10 μm. According to another set of embodiments, these preferred refractive index ratios exist for a continuous set of wavelengths lying within a wavelength range of from about 300 nm to about 700 nm, and according to another set of embodiments, the ratio of refractive index of one to the other is at least 1.0 or is from 1.00 to 1.10, preferably 1.01 to 1.06 and more preferably 1.02 to 1.05 for a continuous set of wavelengths lying within a wavelength range of from about 400 nm to 50 μm. These dielectric structures, exhibiting a band gap in their dispersion relation, cannot support electromagnetic waves at certain frequencies thus those waves are inhibited from propagating through the material.

The polymeric structure should be made of material that, in a disarranged state (not arranged with the periodic structure necessary for photonic band gap properties) is at least partially transparent to the electromagnetic radiation of interest. When the material is at least partially transparent to the electromagnetic radiation of interest, defects in the ordered domain structure of the photonic band gap material define pathways through which the electromagnetic radiation can pass since the criteria for blocking the radiation is destroyed.

In certain compositions, one or more of the blocks or segments is crystalline or semicrystalline. This crystallinity is one distinguishing feature of the inventive interpolymers compared to materials of the prior art that have been used as photonic materials. This crystallinity provides a mechanism whereby the photonic behavior can be reversibly turned on or off, particularly when one block or segment is crystalline and the other block type is amorphous. For example, the refractive index of molten semicrystalline polyethylene is the same as that of an amorphous ethylene/1-octene interpolymer. Such materials can be heated above their melting temperature, where they lose the refractive index contrast necessary to exhibit characteristics of a photonic crystal. However, upon cooling, the semicrystalline material crystallizes and restores the refractive index contrast and resulting photonic properties.

Size of the domains is another important parameter affecting the photonic properties of the material. Domain size can be varied by selecting the relative molecular weights and compositions of the various blocks. Additionally, a diluent (compatible solvent, homopolymer, etc.) can be used to swell all the domains, or in other cases selectively swell an individual type of domain.

In some embodiments, the long range order and orientation of the domains can be affected by processing techniques. One such processing technique involves treating a homogeneously mixed spun cast film by bringing it above the highest glass transition temperature ($T_g$) or melting temperature ($T_m$) of the components for a time sufficient to produce the desired ordered mesophase separated morphology. The resulting morphology will take the form of the components separating into mesodomains with shapes that, for example, can be cylindrical or rodlike, spherical, bicontinuous cubic, lamellar or otherwise. The film may be brought above the $T_g$ or $T_m$ of the components by heating or, for example, by the use of a solvent which lowers the transition temperature of the components below the room or ambient temperature of the operating environment. Prior to treating, the copolymer will be in a thermodynamically unstable single phase which, when brought above the $T_g$ or $T_m$ of its components will separate into the mesodomains. In certain instances, the mesophase separation in AB block copolymers will yield stacked lamella consisting of alternating A and B slabs or layers with different refractive indices. In addition, if such copolymers are roll cast from solution, then well ordered, globally oriented mesodomains can be formed. Other known methods of globally orienting lamellar films are the use of surface-induced ordering, mechanical, such as shear, alignment, biaxial orientation, and electric field or magnetic field alignment.

Other embodiments of the invention do not require spin or roll casting to achieve the desired ordered structure. For example, simple compression molding of the inventive polymers can provide a film that displays photonic properties, thus providing a tremendous advantage in terms of processing costs. Other typical melt processing techniques, such as injection molding, blown or cast film processing, profile extrusion, drawn or blown fiber formation, calendaring and other conventional polymer melt processing techniques, may be used to achieve similar affects.

Some examples of the films exhibit iridescence and changing colors as the angle of incident light on the film is changed.

The inventive block interpolymers can also be fabricated to form mechanochromic films. A mechanochromic films is a material which responds to deformation by changing color. In these materials, the wavelength reflected changes reversibly with the applied strain due to the change in optical thickness. As the film is stretched, the change in the thickness of the layers causes the film to reflect different wavelengths of light. As the film is relaxed, the layers return to their original thickness and reflect their original wavelengths. In some cases the reflectivity can be tailored from the visible through nearinfrared regimes with applied stress.

The inventive block interpolymers may also be used to form polymeric reflective bodies for infrared, visible, or ultraviolet light, as described in U.S. Pat. No. 3,711,176, which is herein incorporated by reference. This patent describes materials that are formed by extrusion of multiple polymeric materials to create ordered layered structures with layers on the 50-1000 nm scale. The inventive interpolymers are advantaged over these materials because they do not require the expensive and tedious processing techniques, namely microlayer extrusion, to form the reflective bodies.

The optical interference films of the inventive block interpolymers may also be useful in a variety of optical applications such as Fresnel lenses, light pipes, diffusers, polarizers, thermal mirrors, diffraction gratings, band-pass filters, optical switches, optical filters, photonic bandgap fibers, optical waveguides, omnidirectional reflectors, brightness-enhancement filters, and the like.

The transparent elastomeric optical interference films of the present invention have a number of uses. Such materials can be used in window films, lighting applications, pressure sensors, privacy filters, eye protection, colored displays, UV-protective tapes, greenhouse films, packaging, toys and novelty items, decorative, and security applications. For example, the films may be used for packaging which display changing color patterns. The wrapping of irregular shaped items will cause the films to stretch in a variety of ways and exhibit unique color patterns. Toy or novelty items which change colors when stretched, such as balloons or embossed patterns are also possible. Pulsating signs or advertisements may be fabricated in which selective stretching of portions of the film by an inflation/deflation mechanism causes a pulsating color change effect.

The optical interference films of the present invention may also find use as solar screens which reflect infrared light. In films with varying thickness of the domains, the film can be made to reflect a broad band width of light. Because of the elasticity of the films, the infrared reflecting characteristics of the film may be changed by stretching the films. Thus, depending upon the desired characteristics, the film can be made to reflect infrared during certain times of the day, and then be stretched to appear transparent to visible light. Even when stretched, the film will continue to reflect ultraviolet wavelengths.

The elastomeric films of the present invention may also be used as adjustable light filters in photography by stretching the film to cause it to reflect different wavelengths of light. The films of the present invention may also find use in agriculture. As it is known that plant growth is influenced by the wavelength of light received by the plant, a greenhouse film may be formed that varies the transmitted wavelengths of light desired. Further, if transmission of a specific wavelength of light is desired as the angle of incidence of sunlight changes during the day, the film may be adjusted by stretching or relaxing it to maintain a constant transmitted wavelength.

The films of the present invention may also be used as pressure sensors to detect pressure changes and exhibit a color change in response thereto. For example, the film of the present invention may be fabricated into a diaphragm or affixed to another rubbery surface such as that of a tire to act as a pressure or inflation sensor. Thus, an elastomeric film sensor may be provided which, for example, reflects red when an under-inflated condition is encountered, green when there is a correct pressure, and blue when there exists an over-inflated condition.

Elastomeric films of the present invention may also find use as strain gauges or stress coatings. A film of the present invention may be laminated to the surface of a structure, and then exposed to a load. Deformation of the surface may then be measured precisely using a spectrophotometer which measures the change in wavelength of light reflected from the film. Extremely large surface areas may be covered with the film of the present invention.

Elastomeric films of the present invention are useful in colored displays, such as described in U.S. Pat. No. 7,138,173, which is incorporated herein in its entirety by reference. Such displays are frequently used as a means to display information in an eye-catching manner, or to draw attention to a specific article on display or for sale. These displays are often used in signage (e.g., outdoor billboards and street signs), in kiosks, and on a wide variety of packaging materials. It is particularly advantageous if a display can be made to change color as a function of viewing angle. Such displays, known as "color shifting displays", are noticeable even when viewed peripherally, and serve to direct the viewer's attention to the object on display.

Backlit displays having a variety of optical arrangements may be made using the films of the present invention. The actual device need not necessarily be a display, but could be a luminaire or a light source which uses the combination of film spectral-angular properties and wavelength emission from a lamp to create a desired light distribution pattern. This recycling, coupled with the high reflectivity of the films, produces a much brighter color display than is seen with conventional displays.

The films of the present invention may be used in conjunction with a distributed light source or several point sources, just as conventional backlights are now used for advertising signs or computer backlights. A flat reflective film, uniformly colored by optical interference, which covers the open face of a backlight will change color as the viewer passes by the sign. Opaque or translucent lettering of a chosen dyed or pigmented color can be applied to the reflective cover film via laser or screen printing techniques. Alternatively, interference reflective lettering composed of a different colored reflective film than the cover film can also be applied over cutouts made in the cover film, with the lettering displaying the opposite change in color from the cover film, e.g., cover film displays a green to magenta change with angle, while the lettering shows a magenta to green change over the same angles. Many other color combinations are possible as well.

The color changes in the cover film can also be used to "reveal" lettering, messages, or even objects that are not visible through the film at large angles of incidence, but become highly visible when viewed at normal incidence, or vice-versa. This "reveal" effect can be accomplished using specific color emitting lights in the backlight, or by dyed colored lettering or objects under the reflective cover film.

The brightness of the display can be enhanced by lining the inside of the backlight cavity with highly reflective interference film. In this same manner, the overall color balance of the display can be controlled by lining a low reflectance cavity with a reflective film that preferentially reflects only certain colors. The brightness of the chosen color may suffer in this case because of its transmission at certain angles through the lining. If this is undesirable, the desired color balance can be effected by coating a broadband liner film with a dye of the appropriate color and absorbance.

The reflective colored film may also be used in combination with dyed or pigment colored films with the latter on the viewer side to achieve a desired color control such as, e.g., eliminating a color shift on the lettering while producing a color shifting background.

The backlit sign need not be planar, and the colored film could be applied to more than one face of the sign, such as an illuminated cube, or a two sided advertising display.

The films of the present invention may also be used to create a variety of non-backlit displays. In these displays, at least one polarization of light from an external light source, which may be sunlight, ambient lighting, or a dedicated light source, is made to pass through the interference film twice before the transmission spectrum is seen by the viewer. In most applications, this is accomplished by using the interference film in combination with a reflective or polarizing surface. Such a surface may be, for example, a conventional mirror of the type formed through deposition of metals, a polished metal or dielectric substrate, or a polymeric mirror or polarizing film.

While the interference films of the present invention may be used advantageously in combination with either specularly reflective or diffusely reflective surfaces, a diffusely reflecting substrate is preferred. Such a substrate causes the colors transmitted by the film (and subsequently reflected by the substrate) to be directed out of the plane of incidence, or at a different angle of reflection in the plane of incidence, than the colored light that is specularly reflected by the film thereby allowing the viewer to discriminate between the transmitted and reflected colors. Diffuse white surfaces, such as card stock or surfaces treated with a diffusely reflective white paint, are especially advantageous in that they will create a display that changes color with angle.

In other embodiments, the diffuse surface, or portions thereof, may themselves be colored. For example, a diffuse surface containing ink characters may be laminated with a interference film that has at least one optical stack tuned to reflect light over the same region of the spectrum over which the ink absorbs. The characters in the resulting article will then be invisible at certain angles of viewing but clearly visible at other angles (a similar technique may be used for backlit displays by matching the reflective bandwidth of the interference film to the absorption band of the ink). In still other embodiments, the interference film itself can be printed on with a diffuse white or colored ink, which may be either opaque or translucent. Translucent is defined in this context as meaning substantially transmissive with a substantial diffusing effect. Alternatively, the interference film can be laminated to a white or colored surface, which can itself also be printed on.

In still other embodiments, the films of the invention may be used in combination with a substrate that absorbs the wavelengths transmitted by the film, thereby allowing the color of the display to be controlled solely by the reflectivity spectrum of the film. Such an effect is observed, for example, when a colored mirror film of the present invention, which transmits certain wavelengths in the visible region of the spectrum and reflects other wavelengths in the visible region, is used in combination with a black substrate.

The optical films and devices of the present invention are suitable for use in fenestrations, such as skylights or privacy windows. In such applications, the optical films of the present invention may be used in conjunction with, or as components in, conventional glazing materials such as plastic or glass. Glazing materials prepared in this manner can be made to be polarization specific, so that the fenestration is essentially transparent to a first polarization of light but substantially reflects a second polarization of light, thereby eliminating or reducing glare. The physical properties of the optical films can also be modified as taught herein so that the glazing materials will reflect light of one or both polarizations within a certain region of the spectrum (e.g., the UV region), while transmitting light of one or both polarizations in another region (e.g., the visible region). This is particularly important in greenhouse applications, where reflection and transmission of specific wavelengths can be utilized to control plant growth, flowering, and other biological processes.

The optical films of the present invention may also be used to provide decorative fenestrations which transmit light of specific wavelengths. Such fenestrations may be used, for example, to impart a specific color or colors to a room (e.g., blue or gold), or may be used to accent the decor thereof, as through the use of wavelength specific lighting panels.

The optical films of the present invention may be incorporated into glazing materials in various manners as are known to the art, as through coating or extrusion. Thus, in one embodiment, the optical films are adhered to all, or a portion, of the outside surface of a glazing material, for example, by lamination with the use of an optical adhesive. In another embodiment, the optical films of the present invention are sandwiched between two panes of glass or plastic, and the resulting composite is incorporated into a fenestration. Of course, the optical film may be given any additional layers or coatings (e.g., UV absorbing layers, antifogging layers, or antireflective layers) to render it more suitable for the specific application to which it is directed.

One particularly advantageous use of the colored films of the present invention in fenestrations is their application to sunlit windows, where reversible coloring is observed for day vs. night. During the day, the color of such a window is dictated primarily by the transmissive properties of the film toward sunlight. At night, however, very little light is seen in transmission through the films, and the color of the films is then determined by the reflectivity of the film toward the light sources used to illuminate the room. For light sources which simulate daylight, the result is the complimentary color of the film appearance during the day.

The films of the present invention may be used in various light fixture applications, including the backlit and non-backlit displays described earlier. Depending on the desired application, the film may be uniformly colored or iridescent in appearance, and the spectral selectivity can be altered to transmit or reflect over the desired wavelength range. Furthermore, the film can be made to reflect or transmit light of only one polarization for polarized lighting applications such as polarized office task lights or polarized displays incorporating light recycling to increase brightness, or the film can be made to transmit or reflect both polarizations of light when used in applications where colored mirrors or filters are desirable.

In the simplest case, the film of the present invention is used as a filter in a backlit light fixture. A typical fixture contains a housing with a light source and may include a diffuse or specular reflective element behind the light source or covering at least some of the interior surfaces of the optical cavity. The output of the light fixture typically contains a filter or diffusing element that obscures the light source from direct viewing. Depending upon the particular application to which the light fixture is directed, the light source may be a fluorescent lamp, an incandescent lamp, a solid-state or electroluminescent (EL) light source, a metal halide lamp, or even solar illumination, the latter being transmitted to the optical cavity by free space propagation, a lens system, a light pipe, a polarization preserving light guide, or by other means as are known to the art. The source may be diffuse or specular, and may include a randomizing, depolarizing surface used in combination with a point light source. The elements of the light fixture may be arranged in various configurations and may be placed within a housing as dictated by aesthetic and/or functional considerations. Such fixtures are common in architectural lighting, stage lighting, outdoor lighting, backlit displays and signs, and automotive dashboards. The film of the present invention provides the advantage that the appearance of the output of the lighting fixture changes with angle.

The color shifting films of the present invention are particularly advantageous when used in directional lighting. High efficiency lamps, such as sodium vapor lamps commonly used in street or yard lighting applications, typically have spectral emissions at only one major wavelength. When such a source which emits over a narrow band is combined with the film of the present invention, highly directional control of the emitted light can be achieved. For example, when the inventive film is made with a narrow passband which coincides with the emission peak of the lamp, then the lamp emission can pass through the film only at angles near the design angle; at other angles, the light emitted from the source is returned to the lamp, or lamp housing. Typical monochromatic and polychromatic spikey light sources include low pressure sodium lamps, mercury lamps, fluorescent lamps, compact fluorescent lamps, and cold cathode fluorescent lamps. Additionally, the reflecting film need not necessarily be of a narrow pass type since, with monochromatic sources, it may only be necessary to block or pass the single wavelength emission at a specific angle of incidence. This means that a reflective film having, for example, a square wave reflection spectrum which cuts on or off at a wavelength near that of the lamp emission can be used as well. Some specific geometries in which the light source and film of the present invention can be combined include, but are not limited to, the following:

(a) A cylindrical bulb, such as a fluorescent tube, is wrapped with film designed for normal incidence transmission of the bulb's peak emitted radiation, i.e., the film is designed with a passband centered at the wavelength of the lamp emission. In this geometry, light of the peak wavelength is emitted mainly in a radial direction from the bulb's long axis;

(b) An arbitrary bulb geometry in a reflective lamp housing can be made to radiate in a direction normal to the plane of the housing opening by covering the opening with a film selected to transmit at the bulb's peak emitted radiation. The opening can face downward or in any other direction, and the light will be viewable at angles in a direction normal to the plane of the opening but not at angles of incidence substantially away from normal;

(c) Alternately, the combination described in (b) can use a film that is designed to transmit the lamp emission at one or more angles of incidence away from the normal angle by providing one or more appropriate passbands, measured at normal incidence, at wavelengths greater than the lamp emission wavelength. In this way, the lamp emission is transmitted at angles where the blue shift of the passband is sufficient to align the emission peak with the passband;

(d) Combining the angular distribution film described in (c) with the geometry described in (a) will give a cylindrical bulb in which one can have direction control of the emitted light in a plane parallel to the long axis of the bulb; or (e) A polychromatic spikey light source, for example, one having emission spikes at three different wavelengths, can be combined with an inventive film having only one passband, and such that the film transmits only one of the three color spikes at a given angle of incidence and each emission peak is transmitted at a different angle. Such a film can be made using multiple groups of layers, each of which reflect at different wavelength regions, or it can be made using one group of layers and their higher order harmonics. The width of the first order bandwidth region and consequently the width of the harmonic bandwidths, can be controlled to give desired transmission gaps between the first order and harmonic reflection bands. The combination of this film with the polychromatic spikey light source would appear to split light from an apparently "white" light source into its separate colors.

Since the rate of spectral shift with angle is small near normal incidence, the angular control of light is less effective at normal incidence compared to high angles of incidence on the inventive film. For example, depending on the width of the lamp emission lines, and the bandwidth of the passband, the minimum angular control may be as small as +/−10 degrees about the normal, or as great as +/−20 degrees or +/−30 degrees. Of course, for single line emitting lamps, there is no maximum angle control limit. It may be desirable, for either aesthetic or energy conservation reasons, to limit the angular distribution to angles less than the free space available to the lamp, which is typically +/−90 degrees in one or both of the horizontal and vertical planes. For example, depending on customer requirements, one may wish to reduce the angular range to +/−45, +/−60 or only +/−75 degrees. At high angles of incidence, such as 45 degrees or 60 degrees to the normal of the film, angular control is much more effective. In other words, at these angles, the passband shifts to the blue at a higher rate of nm/degree than it does at normal incidence. Thus, at these angles, angular control of a narrow emission peak can be maintained to within a few degrees, such as +/−5 degrees, or for very narrow passbands and narrow emission lines, to as small as +/−2 degrees.

The films of the present invention can also be shaped in a pre-designed fashion to control the angular out put of the lamp in the desired pattern. For example, all or part of the film placed near the light source may be shaped to corrugated or triangular waveforms, such that the axis of the waveform is either parallel or perpendicular to the axis of the lamp tube. Directional control of different angles in orthogonal planes is possible with such configurations.

While the combination of a narrow band source and an inventive film works well to control the angle at which light is emitted or detected, there are only a limited number of sources with narrow emission spectra and therefore limited color options available. Alternately, a broadband source can be made to act like a narrow band source to achieve similar directional control of the emitted light. A broadband source can be covered by a color selective film that transmits in certain narrow band wavelength regions, and that modified source can then be used in combination with a second film having the same transmission spectrum so that the light emitted from the source/color selective film combination can again pass through the inventive film only at the design angle. This arrangement will work for more than one color, such as with a three color red-green-blue system. By proper selection of the films, the emitted colors will be transmitted at the desired angle. At other angles, the emitted wavelengths will not match every or any passband, and the light source will appear dark or a different color. Since the color shifting films can be adapted to transmit over a broad range of wavelengths, one can obtain virtually any color and control the angular direction over which the emitted light is observed.

Direction dependent light sources have utility in many applications. For example, the light sources of the present invention can be used for illuminating automobile instrument panels so that the driver, who is viewing the instruments at a normal angle, can view the transmitted light, but the light would not be reflected off the windshield or viewable by a passenger because they would be at off angles to the instruments. Similarly, illuminated signs or targets can be constructed using the direction dependent light sources of the present invention so that they can be perceived only at certain angles, for example, normal to the target or sign, but not at other angles. Alternately, the film can be designed so that light of one color is transmitted at one angle, but a different color is detectable at another angle. This would be useful, for example, in directing the approach and stopping point for vehicles, such as for a carwash or emission check station. The combination of inventive film and light source can be selected so that, as a vehicle approached the illuminated sign and the driver was viewing the film at non-normal angles to the sign, only green light would be visible, but the perceived transmitted light would shift to red at the angle where the vehicle was to stop, for example, normal to the sign. The combination of the inventive film and a narrow band source is also useful as a security device, wherein the film is used as a security laminate, and a light source wrapped with the same film is used as a simple verification device. Other examples of the direction dependent light source of the present invention are described in more detail in the following examples.

Spectrally selective films and other optical bodies can be made in accordance with the teachings of the present invention which are ideally suited for applications such as horticulture. A primary concern for the growth of plants in greenhouse environments and agricultural applications is that of adequate levels and wavelengths of light appropriate for plant growth. Insufficient or uneven illumination can result in uneven growth or underdeveloped plants. Light levels that are too high can excessively heat the soil and damage plants. Managing the heat generated by ambient solar light is a common problem, especially in southern climates.

The spectrally selective color films and optical bodies of the present invention can be used in many horticultural applications where it is desired to filter out or transmit specific wavelengths of light that are optimal for controlled plant growth. For example, a film can be optimized to filter out heat producing infrared and non-efficient visible solar wavelengths in order to deliver the most efficient wavelengths used in photosynthesis to speed plant growth and to manage soil and ambient temperatures.

It is known that plants respond to different wavelengths during different parts of their growth cycle. Throughout the growth cycle, the wavelengths in the 500-580 nm range are largely inefficient, while wavelengths in the 400-500 nm and 580-800 nm ranges illicit a growth response. Similarly, plants are insensitive to IR wavelengths past about 800 nm, which comprise a significant part of solar emission, so removal of these wavelengths from the solar spectrum can significantly reduce heating and allow for concentration of additional light at wavelengths useful for plant growth.

Commercial lamps used in greenhouses are effective in accelerating photosynthesis and other photoresponses of plants. Such lamps are most commonly used as supplements to natural, unfiltered solar light. Lamps that emit energy in the blue (about 400-500 nm), red (about 600-700 nm), or near IR (about 700-800 nm) are used in accelerating growth. One common commercial grow-lamp has its emission maxima at 450 and 660 nm, with little emission of wavelengths beyond 700 nm. Another common source has high emission in the blue and red, and high emission in the near IR wavelengths. Lamps which emit wavelengths in the range of 500-580 nm are referred to as "safe lights" because their emission is in a low response region and does not significantly affect plant growth, either beneficially or detrimentally.

Light sources used in general lighting are often paired to accomplish similar results to the "grow lights". The output wavelengths from some sources actually retard growth, but this can be compensated for by pairing with other sources. For example, low pressure sodium used alone can inhibit synthesis of chlorophyll but when the low pressure sodium is combined with fluorescent or incandescent lamps, normal photosynthesis occurs. Examples of common pairings of commercial lights used in greenhouses include (i) high pressure sodium and metal halide lamps; (ii) high pressure sodium and mercury lamps; (iii) low pressure sodium and fluorescent and incandescent lamps; and (iv) metal halide and incandescent lamps.

In a greenhouse environment, the color selective films and optical bodies of the present invention, when used alone as color filters or in combination with reflective backings, are useful for concentrating light of the desired wavelengths for optimal plant growth. The films and optical bodies may be used with normal unfiltered solar light, or they may be combined with artificial broadband light sources to control the wavelength of light emitted from the source. Such light sources include, but are not limited to, incandescent lamps, fluorescent lamps such as hot or cold cathode lamps, metal halide lamps, mercury vapor lamps, high and low pressure sodium lamps, solid-state or electroluminescent (EL) lights, or natural or filtered solar light that is optically coupled to the color selective film. Several filtration/concentration systems will be described in more detail that may be used to manage heat in the greenhouse environment, while delivering an increased amount of light at wavelengths optimized for photosynthesis and other plant photoresponses.

The interference films and optical bodies of the present invention can also be used with one or more direct or prefiltered artificial light sources so as to optimize the spectra afforded by these films even further. In some cases, it may be desirable to wrap or otherwise couple the interference film directly to the artificial source so that in effect the light source emits primarily the wavelengths desired for controlled plant growth. The film may also be laminated directly to the clear panels which make up the roof and/or walls of a typical greenhouse so that much of the light that enters the building is of the desired spectral composition, or else such panels may be extruded to include one or more color selective films within the panel itself. In order that all of the light entering the building would be of a precise wavelength range, it would be desirable to have the films mounted on a heliostat or other mechanism that moves to compensate for the angle of the sun's ray throughout the day. Simpler mechanisms such as south facing panels with only a weekly or monthly change in the angle from the horizontal or vertical can perform quite well also.

One or more reflectors can also be used to direct the filtered light to desired locations, and it is understood that various physical shapes of the deflector and/or interference film can be used to aim or spread light across desired portions of the room. In addition to these described modes of use, the film can be used as a filtered wrapping for individual plants, as a reflector placed between plants and soil either in film form or as slit or chopped mulch, or as reflectors and filters for use in aquarium lighting for aquatic plants.

In addition to the previously described spectrally selective films that can be tailored to transmit or reflect infrared and/or green light that is not useful for plant growth, a film designed to control the amount of red light, typically from about 660-680 nm, and the amount of far red light, typically from about 700-740 nm, is especially useful to control plant growth. It has been shown that the ratio of red to far red light should be maintained at a level of 1.1 or higher in order to reduce elongation and force plants to branch or propagate, resulting in thicker, denser plant growth. Additionally, by precisely controlling the red/far red ratio and the sequencing of wavelength exposure, many plants can be forced into a flowering state or held in the vegetative state. Some plant varieties can be controlled with as little as 1 minute of red or far red doping. Plant responses to red and far red light have been described in J. W. Braun, et al., "Distribution of Foliage and Fruit in Association with Light Microclimate in the Red Raspberry Canopy, 64(5) Journal of Horticultural Science 565-72 (1989) and in Theo J. Blow, "New Developments in Easter Lilly Height Control" (Hort. Re. Instit. Of Ontario, Vineland Station, Ont. LOR 2EO.

Previous attempts to control the red/far red ratio have utilized light blocking liquids that are pumped into the cavity between panes in greenhouse twin wall constructions. This has not been satisfactory because of the difficulty in adding and removing the liquid. Other attempts have been made to use colored film for the roof glazing, but it is difficult to control if the plant variety in the greenhouse changes frequently or if outdoor weather conditions change. The film of the present invention is ideally suited for this application. The red/far red ratio can be controlled by varying the thickness gradient or by changing the angle of the film to permit the desired wavelengths to reach the plants. To compensate for varying outdoor conditions or varying needs of different plant varieties, the film is preferably positioned within the greenhouse in such a way that it can be either used or stored, for example, by a rolling shade along the roof line which can be drawn down or rolled up, or by a shade cloth pulled horizontally above the plant height. Alternately, individual enclosures of the film can be constructed for separate plants or groups of plants.

The film of the present invention can also be used in conjunction with conventional mirrors to control the intensity of any desired portion of the sunlight spectrum that reaches the plants. Generally, it is desirable to expose plants to a constant level of the wavelengths and intensity of light useful for plant growth throughout the entire day. On a typical sunny day, however, the light level peaks at about noon, and this light level may be excessive for many plants; the leaf temperature often rises, which decreases the plant efficiency. It is preferable to reduce the level of light reaching the plant during mid-day to provide a more uniform level throughout the day. For example, roses flower most efficiently when exposed to a maximum light level of 600 $\mu$mol/sec-m$^2$, and this level is often achieved by 11:00 am during the winter months at a latitude of 45 degrees. Reducing the light level between 11:00 and 1:00 improves the plant yield. The combined usage of conventional mirrors with our wavelength selective films can be used to change the intensity of light directed to plants during different hours of the day. For example, the use of a visible mirror can be discontinued during the hours of highest solar incidence by redirecting its angle of reflection to reject that portion of light from the sun. Other combinations of baffles and curtains can also be used with our wavelength selective films to control the intensity of light.

Counterfeiting and forgery of documents and components, and the illegal diversion of controlled materials such as explosives, is a serious and pervasive problem. For example, commercial aircraft maintenance crews regularly encounter suspected counterfeit parts, but lack a reliable means to distinguish between high-grade parts and counterfeit parts that are marked as meeting specifications. Similarly, it is reported that up to ten percent of all laser printer cartridges that are sold as new are actually refurbished cartridges that have been repackaged and represented as new. Identification and tracking of bulk items such as ammonium nitrate fertilizer usable in explosives is also highly desirable, but current means of identification are prohibitively expensive.

Several means exist to verify the authenticity of an item, the integrity of packaging, or to trace the origin of parts, components, and raw materials. Some of these devices are ambient verifiable, some are verifiable with separate lights, instruments, etc., and some combine aspects of both. Examples of devices used for the verification of documents and package integrity include iridescent inks and pigments, special fibers and watermarks, magnetic inks and coatings, fine printings, holograms, and Confirm® imaged retroreflective sheeting available from 3M. Fewer options are available for authentication of components, mostly due to size, cost, and durability constraints. Proposed systems include magnetic films and integrated circuit chips.

Microtaggants have been used to trace controlled materials such as explosives. These materials are typically multilayer polymers that are ground up and dispersed into the product. The individual layers in the microtaggant can be decoded using an optical microscope to yield information pertaining to the date and location of manufacture. There has been a long unmet need for a security film product that is both ambient verifiable and machine readable, that is manufacturable but not easily duplicated, that is flexible and can be used on a variety of part sizes ranging from near microscopic to large sheets, and that may be coded with specific, machine-readable information.

The films and optical bodies of the present invention can be tailored to provide a security film or device useful as a backing, label, or overlaminate that meets all of these needs. The color shifting feature and high reflectivity and color saturation at oblique angles are properties that can be exploited to uniquely identify a document or package, and spectral detail can be designed into the films to provide unique spectral fingerprints that may be used to identify specific lots of security film to code individual applications. The security films and optical bodies can be tailored to reflect over any desired portion of the spectrum, including visible, infrared, or ultraviolet. When only covert identification is desired, a film can be made that appears transparent in the visible region of the spectrum but that has varying transmission and reflections bands in the infrared region to impart a covert spectral fingerprint.

Information can also be encoded in the security films and optical bodies of the present invention by several other methods, either alone or in combination with the above described methods of varying the intensity and position of transmission and reflection bands. For example, individual layers may be tuned to the infrared portion of the spectrum, and overtones in the visible region can be controlled to produce unique spectra.

The spectrally selective security films and optical bodies of the present invention may also include relatively thick layers either within the optical stack or adjacent to the optical stack, and these layers may also be used to impart information that can be decoded by optical inspection of a cross-section of the film. The films may also be combined with colored printing or graphics printed on a substrate below the film to provide indicia that may be hidden or viewable depending on the angle of observation. Color contrast may be achieved by thinning the optical layers locally. Within this affected region, a new color that also color shifts is evident against the unaffected region. To affect a localized thinning of layers, the preferred method is embossing at temperatures above the glass transition temperatures of all of the polymers in the film and/or with suitable pressure. Localized thinning of layers could also be achieved by bombardment with high energy particles, ultrasonics, thermoforming, laser pulsing and stretching. As with the other color selective films already described, the security film may incorporate a hardcoat, an antireflective surface, or an absorbing coating to improve durability and contrast. The security films may also incorporate a heat activated or pressure sensitive adhesive to function as a label or die-cut.

For most applications, the security films or other optical bodies of the present invention can be appropriately sized and laminated directly to a document or packaging material. The spectral features of these films are typically very narrow to reflect the minimum amount of light. While the spectral features of the film will typically be limited to the infrared so as not to occlude the document or package, the character and color of the film may also be used to enhance the appearance of the article.

For some applications, the security film may be used in a bulk material by grinding the film into a powder and dispersing the powder into the material. Paints, coatings and inks can be formulated from ground up platelets utilizing the films of this invention. In cases where the bulk material may be an explosive, it may be desirable to avoid using oriented material if substantial relaxation would occur during an explosion. Optionally, the powder may be coated with an ablative material such as an acrylate to absorb energy during an explosive event.

The security films and optical bodies of the present invention may be read by a combination of ambient verification (for example, the presence of a colored, reflective film on an article, possibly combined with identifiable performance at non-normal angles) and instrument verification. A simple machine reader may be constructed using a spectrophotometer. Several low cost spectrophotometers based on CCD detector arrays are available which meet the needs of this invention; preferably, these include a sensor head connected to the spectrophotometer with a fiber optic cable. The spectrophotometer is used to determine the spectral code of the film by measuring light incident on the article at a predetermined angle or angles, which can be normal to the film at oblique angles, or a combination of both.

In addition to exploiting the optical properties of the films of the present invention for security applications, the mechanical properties of these films can also be utilized. Thus, for example, the films of the present invention can be intentionally designed to have low resistance to interlayer delamination, thereby providing anti-tampering capabilities.

As noted elsewhere herein, the color shifting properties of the films of the present invention may be used advantageously in numerous decorative applications. Thus, for example, the films of the present invention may be used, either alone or in combination with other materials, films, substrates, coatings, or treatments, to make wrapping paper, gift paper, gift bags, ribbons, bows, flowers, and other decorative articles. In these applications, the film may be used as is or may be wrinkled, cut, embossed, converted into glitter, or otherwise treated to produce a desired optical effect or to give the film volume.

The optical interference film of the present invention may also optionally include a skin layer on one or both major surfaces of the film. The skin layer comprises a blend of a substantially transparent elastomeric polymeric material with a substantially transparent, nonelastomeric polymeric material having substantially the same index of refraction as the elastomeric polymer. Optionally, the elastomeric polymeric material in the skin layer may be one of the elastomers which makes up the alternating layer of the optical interference film. In preferred examples, the skin layer retains elastomeric characteristics and transparency while providing the film with a protective surface which is nonblocking. The skin layer also remains receptive to lamination of the film to other surfaces as well as receptive to inks or other forms of printing.

Microporous Films

The inventive copolymers can also be used to form microporous polymeric films, which have use in many applications such as clothing, shoes, filters, and battery separators, as described in US 20080269366, which is herein incorporated by reference for purposes of US patent practice.

In particular, such films may be useful in membrane filters. These filters are generally thin, polymeric films having a large number of microscopic pores. Membrane filters may be used in filtering suspended matter out of liquids or gases or for quantitative separation. Examples of different types of membrane filters include gas separation membranes, dialysis/hemodialysis membranes, reverse osmosis membranes, ultrafiltration membranes, and microporous membranes. Areas in which these types of membranes may be applicable include analytical applications, beverages, chemicals, electronics, environmental applications, and pharmaceuticals.

In addition, microporous polymeric films may be used as battery separators because of their ease of manufacture, chemical inertness and thermal properties. The principal role of a separator is to allow ions to pass between the electrodes but prevent the electrodes from contacting. Hence, the films must be strong to prevent puncture. Also, in lithium-ion batteries the films should shut-down (stop ionic conduction) at certain temperatures to prevent thermal runaway of the battery. Ideally, the resins used for the separator should have high strength over a large temperature window to allow for either thinner separators or more porous separators. Also, for lithium ion batteries lower shut-down temperatures are desired however the film must maintain mechanical integrity after shut-down. Additionally, it is desirable that the film maintain dimensional stability at elevated temperatures The microporous films of the present invention may be used in any of the processes or applications as described in, but not limited to, the following patents and patent publications, all of which are herein incorporated by reference for purposes of US patent practice: WO2005/001956A2; WO2003/100954A2; U.S. Pat. Nos. 6,586,138; 6,524,742; US 2006/0188786; US 2006/0177643; U.S. Pat. Nos. 6,749, k961; 6,372,379 and WO 2000/34384A1.

The mesophase separated structure provided by the inventive copolymers provide several improvements over the prior art for forming microporous polymeric films. The ordered morphologies result in a greater degree of control over the pore size and channel structure. The phase separated melt morphology also limits film shrinkage in the melt and therefore imparts a greater dimensional melt stability than in non-phase separated materials.

Photonic Paper, Organic Sensors, Polymerized Composites, Etc.

Interactions of the inventive materials with certain small molecules results in swelling of one or both of the domains. This swelling produces visible color changes that can be useful in applications such as chemical sensors.

With molecules having low vapor pressures, the swelling is reversible upon evaporation. This feature can be used to create films that act as photonic paper, enabling a reusable paper or recording media requiring no pigment for color display as described for a colloidal photonic system in *Advanced Materials* 2003, 15, 892-896

In other cases, the swelling can be accomplished with a material that can be fixed after swelling to make a stable composite material. Suitable swelling agents can include polymerizable monomers to create polymer composites (for an example of colloidal composite systems, see: *Advanced Materials* 2005, 17, 179-184) or metal precursors to create hybrid organic/inorganic materials In some embodiments of the invention, the amorphous nature of the soft domains makes them generally more amenable to swelling than the semicrystalline hard domains. This selective swelling provides a means for selective chemical modification of the soft domains, which can impart differentiated properties.

Distributed Feedback Lasers

The inventive polymers can also be used as a component in a distributed feedback laser. A distributed feedback laser is a type of laser diode, quantum cascade laser or optical fiber laser where the active region of the device is structured as a diffraction grating. The grating, known as a distributed Bragg reflector, provides optical feedback for the laser during distributed Bragg scattering from the structure. The inventive polymers could serve as the distributed Bragg reflector. The inventive materials can also be incorporated into a dynamically tunable thin film laser as described in WO2008054363, which is herein incorporated by reference for purposes of US patent practice.

The inventive block interpolymers can also be used to form films with improved barrier properties. Such materials can be used to form, for example, bladders in athletic shoes. These materials have particular advantages for barrier films, in which the barrier is improved because the layers physically increase the time to equilibrium saturation of penetrants. Some embodiments including semi-crystalline domains or layers with long range order may show decreases in the permeability of small molecules such as oxygen and water relative to similar polymeric materials. Such properties may make these inventive copolymers valuable in protective packaging of food and other moisture and air sensitive materials. The inventive block interpolymers can also display increased flex crack resistance compared to multilayer films.

The preceding description of the present invention is not intended to be limited to films and may also be present in other articles or objects.

Fibers that may be prepared from the inventive polymers or blends include, but are not limited to, staple fibers, tow, multicomponent, sheath/core, twisted, and monofilament. Suitable fiber forming processes include spinbonded, melt blown techniques, as disclosed in U.S. Pat. Nos. 4,430,563, 4,663, 220, 4,668,566, and 4,322,027, gel spun fibers as disclosed in U.S. Pat. No. 4,413,110, woven and nonwoven fabrics, as disclosed in U.S. Pat. No. 3,485,706, or structures made from such fibers, including blends with other fibers, such as polyester, nylon or cotton, thermoformed articles, extruded shapes, including profile extrusions and co-extrusions, calendared articles, and drawn, twisted, or crimped yarns or fibers. The new polymers described herein are also useful for wire and cable coating operations, as well as in sheet extrusion for vacuum forming operations, and forming molded articles, including the use of injection molding, blow molding process, or rotomolding processes. Compositions comprising the olefin polymers can also be formed into fabricated articles such as those previously mentioned using conventional polyolefin processing techniques which are well known to those skilled in the art of polyolefin processing. Fibers made from the copolymers may also exhibit optical properties attractive in fabrics and textiles, such as reflective or color-changing characteristics.

Dispersions, both aqueous and non-aqueous, can also be formed using the inventive polymers or formulations comprising the same. Frothed foams comprising the invented polymers can also be formed, as disclosed in PCT application No. PCT/US2004/027593, filed Aug. 25, 2004, and published as WO2005/021622. The polymers may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Additives and adjuvants may be included in any formulation comprising the inventive polymers. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to embodiments of the invention.

Suitable polymers for blending with the polymers according to embodiments of the invention include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler Natta LLDPE, metallocene PE, including multiple reactor PE ("in reactor" blends of Ziegler-Natta PE and metallocene PE, such as products disclosed in U.S. Pat. Nos. 6,545,088, 6,538,070, 6,566,446, 5,844,045, 5,869,575, and 6,448,341), ethylene-vinyl acetate (EVA), ethylene/vinyl alcohol copolymers, polystyrene, impact modified polystyrene, acrylonitrile butadiene styrene (ABS), styrene/butadiene block copolymers and hydrogenated derivatives thereof (SBS and SEBS), polyisobutylene (PIB) homopolymer, PIB-isoprene copolymer, EPDM and thermoplastic polyurethanes. Homogeneous polymers such as olefin plastomers and elastomers, ethylene and propylene-based copolymers (for example polymers available under the trade designation VERSIFY™ available from The Dow Chemical Company and VISTAMAXX™ available from ExxonMobil Chemical Company) can also be useful as components in blends comprising the inventive polymers.

Additional end uses include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

In some embodiments, thermoplastic compositions comprising a thermoplastic matrix polymer, especially isotactic polypropylene, and an elastomeric multi-block copolymer of ethylene and a copolymerizable comonomer according to embodiments of the invention, are uniquely capable of forming core-shell type particles having hard crystalline or semi-crystalline blocks in the form of a core surrounded by soft or elastomeric blocks forming a "shell" around the occluded domains of hard polymer. These particles are formed and dispersed within the matrix polymer by the forces incurred during melt compounding or blending. This highly desirable morphology is believed to result due to the unique physical properties of the multi-block copolymers which enable compatible polymer regions such as the matrix and higher comonomer content elastomeric regions of the multi-block copolymer to self-assemble in the melt due to thermodynamic forces. Shearing forces during compounding are believed to produce separated regions of matrix polymer encircled by elastomer. Upon solidifying, these regions become occluded elastomer particles encased in the polymer matrix.

Particularly desirable blends are thermoplastic polyolefin blends (TPO), thermoplastic elastomer blends (TPE), thermoplastic vulcanizates (TPV) and styrenic polymer blends. TPE and TPV blends may be prepared by combining the invented multi-block polymers, including functionalized or unsaturated derivatives thereof with an optional rubber, including conventional block copolymers, especially an SBS block copolymer, and optionally a crosslinking or vulcanizing agent. TPO blends are generally prepared by blending the invented multi-block copolymers with a polyolefin, and optionally a crosslinking or vulcanizing agent. The foregoing blends may be used in forming a molded object, and optionally crosslinking the resulting molded article. A similar procedure using different components has been previously disclosed in U.S. Pat. No. 6,797,779.

Suitable conventional block copolymers for this application desirably possess a Mooney viscosity (ML 1+4 @ 100° C.) in the range from 10 to 135, more preferably from 25 to 100, and most preferably from 30 to 80. Suitable polyolefins especially include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

The blends may be prepared by mixing or kneading the respective components at a temperature around or above the melt point temperature of one or both of the components. For most multiblock copolymers, this temperature may be above 130° C., most generally above 145° C., and most preferably above 150° C. Typical polymer mixing or kneading equipment that is capable of reaching the desired temperatures and melt plastifying the mixture may be employed. These include mills, kneaders, extruders (both single screw and twin-screw), Banbury mixers, calenders, and the like. The sequence of mixing and method may depend on the desired final composition. A combination of Banbury batch mixers and continuous mixers may also be employed, such as a Banbury mixer followed by a mill mixer followed by an extruder. Typically, a TPE or TPV composition will have a higher loading of cross-linkable polymer (typically the conventional block copolymer containing unsaturation) compared to TPO compositions. Generally, for TPE and TPV compositions, the weight ratio of conventional block copolymer to multi-block copolymer may be from about 90:10 to 10:90, more preferably from 80:20 to 20:80, and most preferably from 75:25 to 25:75. For TPO applications, the weight ratio of multi-block copolymer to polyolefin may be from about 49:51 to about 5:95, more preferably from 35:65 to about 10:90. For modified styrenic polymer applications, the weight ratio of multi-block copolymer to polyolefin may also be from about 49:51 to about 5:95, more preferably from 35:65 to about 10:90. The ratios may be changed by changing the viscosity ratios of the various components. There is considerable literature illustrating techniques for changing the phase continuity by changing the viscosity ratios of the constituents of a blend that a person skilled in this art may consult if necessary.

Certain compositions of the inventive block copolymers also act as plasticizers. A plasticizer is generally an organic compound incorporated into a high molecular weight polymer, such as for example a thermoplastic, to facilitate processing, increase its workability, flexibility, and/or distensibility of the polymer. Polypropylene, for example, is an engineering thermoplastic that is generally stiff and even brittle below room temperature especially for highly stereoregular polypropylene.

Some embodiments of the invention provide miscible blends with polypropylene. By blending such interpolymer plasticizers with polypropylene (isotactic polypropylene, syndiotactic polypropylene and atactic polypropylene), the glass transition temperature, storage modulus and viscosity of the blended polypropylene are lowered. By decreasing the transition temperature, storage modulus and viscosity, the workability, flexibility, and distensibility of polypropylene improves. As such, broadened commercial application for these new polypropylene blends in film, fibers and molded products is apparent. Furthermore, the flexibility of a product design utilizing these novel blends can be further extended by taking advantage of the enhanced comonomer incorporation and tacticity control possible with metallocene and other homogeneous catalysts, both of which can reduce isotactic polypropylene crystallinity prior to blending with the inventive block interpolymer.

These plasticized polypropylene thermoplastics may be used in known applications for polypropylene compositions. These uses include, but are not limited to: hot melt adhesives; pressure sensitive adhesives (as an adhesive component, particularly when the polypropylene has low levels of crystallinity, e.g., amorphous polypropylene); films (whether extrusion coatings, cast or blown; such will exhibit improved heat sealing characteristics); sheets (such as by extrusion in single or multilayer sheets where at least one layer is a plasticized polypropylene thermoplastic composition of the invention); meltblown or spunbond fibers; and, as thermoplastic components in thermoformable thermoplastic olefin ("TPO") and thermoplastic elastomer ("TPE") blends where polypropylene has traditionally been demonstrated to be effective. In view of these many uses, with improved low temperature properties and increased workability, the plasticized polypropylene thermoplastics offer a suitable replacement in selected applications for plasticized polyvinyl chloride (PVC).

The blend compositions may contain processing oils, plasticizers, and processing aids. Rubber processing oils and paraffinic, napthenic or aromatic process oils are all suitable for use. Generally from about 0 to about 150 parts, more preferably about 0 to about 100 parts, and most preferably from about 0 to about 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly)glycol esters, and metal salt-, especially Group 1 or 2 metal or zinc-, salt derivatives thereof.

It is known that non-hydrogenated rubbers such as those comprising polymerized forms of butadiene or isoprene, including block copolymers (here-in-after diene rubbers), have lower resistance to UV radiation, ozone, and oxidation, compared to mostly or highly saturated rubbers. In applications such as tires made from compositions containing higher concentrations of diene based rubbers, it is known to incorporate carbon black to improve rubber stability, along with anti-ozone additives and anti-oxidants. Multi-block copolymers according to the present invention possessing extremely low levels of unsaturation, find particular application as a protective surface layer (coated, coextruded or laminated) or weather resistant film adhered to articles formed from conventional diene elastomer modified polymeric compositions.

For conventional TPO, TPV, and TPE applications, carbon black is the additive of choice for UV absorption and stabilizing properties. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and average pore volumes ranging from 10 to 150 $cm^3/100$ g. Generally, smaller particle sized carbon blacks are employed, to the extent cost considerations permit. For many such applications the present multi-block copolymers and blends thereof require little or no carbon black, thereby allowing considerable design freedom to include alternative pigments or no pigments at all. Multi-hued tires or tires matching the color of the vehicle are one possibility.

Compositions, including thermoplastic blends according to embodiments of the invention may also contain anti-ozonants or anti-oxidants that are known to a rubber chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl)phenol, p-phenylenediamines, butylated reaction products of p-cresol and dicyclopentadiene (DCPD), polyphenolic antioxidants, hydroquinone derivatives, quinoline, diphenylene antioxidants, thioester antioxidants, and blends thereof. Some representative trade names of such products are Wingstay™ S antioxidant, Polystay™ 100 antioxidant, Polystay™ 100 AZ antioxidant, Polystay™ 200 antioxidant, Wingstay™ L antioxidant, Wingstay™ LHLS antioxidant, Wingstay™ K antioxidant, Wingstay™ 29 antioxidant, Wingstay™ SN-1 antioxidant, and Irganox™ antioxidants. In some applications, the anti-oxidants and anti-ozonants used will preferably be non-staining and non-migratory.

For providing additional stability against UV radiation, hindered amine light stabilizers (HALS) and UV absorbers may be also used. Suitable examples include Tinuvin™ 123, Tinuvin™ 144, Tinuvin™ 622, Tinuvin™ 765, Tinuvin™ 770, and Tinuvin™ 780, available from Ciba Specialty Chemicals, and Chemisorb™ T944, available from Cytex Plastics, Houston Tex., USA. A Lewis acid may be additionally included with a HALS compound in order to achieve superior surface quality, as disclosed in U.S. Pat. No. 6,051,681.

For some compositions, additional mixing processes may be employed to pre-disperse the anti-oxidants, anti-ozonants, carbon black, UV absorbers, and/or light stabilizers to form a masterbatch, and subsequently to form polymer blends there from.

Suitable crosslinking agents (also referred to as curing or vulcanizing agents) for use herein include sulfur based, peroxide based, or phenolic based compounds. Examples of the foregoing materials are found in the art, including in U.S. Pat. Nos. 3,758,643; 3,806,558; 5,051,478; 4,104,210; 4,130,535; 4,202,801; 4,271,049; 4,340,684; 4,250,273; 4,927,882; 4,311,628 and 5,248,729.

When sulfur based curing agents are employed, accelerators and cure activators may be used as well. Accelerators are used to control the time and/or temperature required for dynamic vulcanization and to improve the properties of the resulting cross-linked article. In one embodiment, a single accelerator or primary accelerator is used. The primary accelerator(s) may be used in total amounts ranging from about 0.5 to about 4, preferably about 0.8 to about 1.5, phr, based on total composition weight. In another embodiment, combinations of a primary and a secondary accelerator might be used with the secondary accelerator being used in smaller amounts, such as from about 0.05 to about 3 phr, in order to activate and to improve the properties of the cured article. Combinations of accelerators generally produce articles having properties that are somewhat better than those produced by use of a single accelerator. In addition, delayed action accelerators may be used which are not affected by normal processing temperatures yet produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIC), among others. Use of peroxide crosslinkers and optional coagents used for partial or complete dynamic vulcanization are known in the art and disclosed for example in the publication, "Peroxide Vulcanization of Elastomer", Vol. 74, No 3, July-August 2001.

When the multi-block copolymer containing composition is at least partially crosslinked, the degree of crosslinking may be measured by dissolving the composition in a solvent for specified duration, and calculating the percent gel or unextractable component. The percent gel normally increases with increasing crosslinking levels. For cured articles according to embodiments of the invention, the percent gel content is desirably in the range from 5 to 100 percent.

The multi-block copolymers according to embodiments of the invention as well as blends thereof possess improved processability compared to prior art compositions, due, it is believed, to lower melt viscosity. Thus, the composition or blend demonstrates an improved surface appearance, especially when formed into a molded or extruded article. At the same time, the present compositions and blends thereof uniquely possess improved melt strength properties, thereby allowing the present multi-block copolymers and blends thereof, especially TPO blends, to be usefully employed in foam and thermoforming applications where melt strength is currently inadequate.

Thermoplastic compositions according to embodiments of the invention may also contain organic or inorganic fillers or other additives such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titania. Silane based or other coupling agents may also be employed for better filler bonding.

The thermoplastic compositions according to embodiments of the invention, including the foregoing blends, may be processed by conventional molding techniques such as injection molding, extrusion molding, thermoforming, slush molding, over molding, insert molding, blow molding, and other techniques. Films, including multi-layer films, may be produced by cast or tentering processes, including blown film processes.

In addition to the above, the block ethylene/α-olefin interpolymers also can be used in a manner that is described in the following U.S. provisional applications, the disclosures of which and their continuations, divisional applications and continuation-in-part applications are incorporated by reference herein in their entirety:

1) "Impact-Modification of Thermoplastics with Ethylene/α-Olefins", U.S. Ser. No. 60/717,928, filed on Sep. 16, 2005;
2) "Three Dimensional Random Looped Structures Made from Interpolymers of Ethylene/α-Olefins and Uses Thereof", U.S. Ser. No. 60/718,130, filed on Sep. 16, 2005;
3) "Polymer Blends from Interpolymer of Ethylene/α-Olefin", U.S. Ser. No. 60/717,825, filed on Sep. 16, 2005;
4) "Viscosity Index Improver for Lubricant Compositions", U.S. Ser. No. 60/718,129, filed on Sep. 16, 2005;
5) "Fibers Made from Copolymers of Ethylene/α-Olefins", U.S. Ser. No. 60/718,197, filed on Sep. 16, 2005;
6) "Fibers Made from Copolymers of Propylene/α-Olefins", U.S. Ser. No. 60/717,863, filed on Sep. 16, 2005;
7) "Adhesive and Marking Compositions Made from Interpolymers of Ethylene/α-Olefins", U.S. Ser. No. 60/718,000, filed on Sep. 16, 2005;
8) "Compositions of Ethylene/α-Olefin Multi-Block Interpolymers Suitable For Films", U.S. Ser. No. 60/718,198, filed on Sep. 16, 2005;
9) "Rheology Modification of Interpolymers of Ethylene/α-Olefins and Articles Made Therefrom", U.S. Ser. No. 60/718,036, filed on Sep. 16, 2005;
10) "Soft Foams Made From Interpolymers of Ethylene/α-Olefins", U.S. Ser. No. 60/717,893, filed on Sep. 16, 2005;
11) "Low Molecular Weight Ethylene/α-Olefin Interpolymer as Base Lubricant Oil", U.S. Ser. No. 60/717,875, filed on Sep. 16, 2005;
12) "Foams Made From Interpolymers of Ethylene/α-Olefins", U.S. Ser. No. 60/717,860, filed on Sep. 16, 2005;
13) "Compositions of Ethylene/α-Olefin Multi-Block Interpolymer For Blown Films with High Hot Tack", U.S. Ser. No. 60/717,982, filed on Sep. 16, 2005;
14) "Cap Liners, Closures and Gaskets From Multi-Block Polymers", U.S. Ser. No. 60/717,824, filed on Sep. 16, 2005;
15) "Polymer Blends From Interpolymers of Ethylene/α-Olefins", U.S. Ser. No. 60/718,245, filed on Sep. 16, 2005;
16) "Anti-Blocking Compositions Comprising Interpolymers of Ethylene/α-Olefins", U.S. Ser. No. 60/717,588, filed on Sep. 16, 2005;
17) "Interpolymers of Ethylene/α-Olefins Blends and Profiles and Gaskets Made Therefrom", U.S. Ser. No. 60/718,165, filed on Sep. 16, 2005;
18) "Filled Polymer Compositions Made from Interpolymers of Ethylene/α-Olefins and Uses Thereof", U.S. Ser. No. 60/717,587, filed on Sep. 16, 2005;
19) "Compositions Of Ethylene/α-Olefin Multi-Block Interpolymer For Elastic Films and Laminates", U.S. Ser. No. 60/718,081, filed on Sep. 16, 2005;
20) "Thermoplastic Vulcanizate Comprising Interpolymers of Ethylene/α-Olefins", U.S. Ser. No. 60/718,186, filed on Sep. 16, 2005;
21) "Multi-Layer, Elastic Articles", U.S. Ser. No. 60/754,087, filed on Dec. 27, 2005; and
22) "Functionalized Olefin Interpolymers, Compositions and Articles Prepared Therefrom, and Methods for Making the Same", U.S. Ser. No. 60/718,184, filed on Sep. 16, 2005.

EXAMPLES

The following examples are provided to illustrate the synthesis of the inventive polymers. Certain comparisons are made with some existing polymers. The examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400–600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% $min^{-1}$ at 21° C. Tensile strength and elongation at break are reported from an average of 5 specimens.

10 0% and 300% Hysteresis is determined from cyclic loading to 100% and 300% strains using ASTM D 1708 microtensile specimens with an Instron™ instrument. The sample is loaded and unloaded at 267% $min^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from –100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Pellet Blocking Strength

Pellet blocking strength can be measured as follows: pellets (150 g) are loaded into a 2" (5 cm) diameter hollow cylinder that is made of two halves held together by a hose clamp. A 2.75 lb (1.25 kg) load is applied to the pellets in the cylinder at 45° C. for 3 days. After 3 days, the pellets loosely consolidate into a cylindrical shaped plug. The plug is removed from the form and the pellet blocking force measured by loading the cylinder of blocked pellets in compression using an Instron™ instrument to measure the compressive force needed to break the cylinder into pellets.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF (also Known as Preparative TREF)

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63

Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat#Z50WP04750). The filtrated fractions are dried overnight in a vacuum oven at 60° C. and weighed on an analytical balance before further testing. Additional information about hits method is taught in Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), Melt Strength Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl) zirconium dibenzyl A solution of (1-methylethyl)(2-hydroxy-3,5-di(t-butyl) phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxoyl-3,5-di(t-butyl)phenyl) immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH$_2$Ph)$_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B(C$_6$F$_5$)$_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl) zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethyl-silyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis (t-butyldimethylsiloxide) (SA14), ethylaluminum di(bis (trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide (SA18), ethylzinc (2,6-diphenylphenoxide) (SA19), and ethylzinc (t-butoxide) (SA20).

Examples 1-4, Comparative A-C

General High Throughput Parallel Polymerization Conditions

Polymerizations are conducted using a high throughput, parallel polymerization reactor (PPR) available from Symyx Technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 µL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers according to embodiments of the invention are distinguishable based on branching or density.

peak at 34.5° C. with a peak area of 52.9 percent. The difference between the DSC Tm and the Tcrystaf is 81.2° C.

The DSC curve for the polymer of Example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of Example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of Example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for comparative A shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

TABLE 1

| Ex. | Cat. (A1) (µmol) | Cat (B1) (µmol) | Cocat (µmol) | MMAO (µmol) | shuttling agent (µmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to embodiments of the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of Example 1 shows a 115.7° C. melting point (Tm) with a heat of fusion of 158.1 J/g. The corresponding CRYSTAF curve shows the tallest Examples 5-19, Comparatives D-F, Continuous Solution Polymerization, Catalyst A1/B2+DEZ Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of ethylene/α-olefin block copolymers

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]/[DEZ]$[4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1]standard cm³/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 3

Properties of ethylene/α-olefin block copolymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (°C.) | $T_c$ (°C.) | $T_{CRYSTAF}$ (°C.) | $T_m - T_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |

TABLE 3-continued

Properties of ethylene/α-olefin block copolymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (° C.) | $T_c$ (° C.) | $T_{CRYSTAF}$ (° C.) | $T_m - T_{CRYSTAF}$ (° C.) | CRYSTAF Peak Area (percent) |
|---|---|---|---|---|---|---|---|---|---|---|---|---|---|
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY® EG8100, available from The Dow Chemical Company), Comparative I is a substantially linear ethylene/1-octene copolymer (AFFINITY® PL1840, available from The Dow Chemical Company), Comparative J is a hydrogenated styrene/butadiene/styrene triblock copolymer (KRATON™ G1652, available from KRATON Polymers), Comparative K is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, Examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers according to embodiments of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm³) | Tensile Notched Tear Strength (mJ) |
|---|---|---|---|---|---|---|---|---|
| D* | 12 | 5 | — | — | 10 | 1074 | — | — |
| E* | 895 | 589 | — | — | 31 | 1029 | — | — |
| F* | 57 | 46 | — | — | 12 | 824 | 93 | 339 |
| 5 | 30 | 24 | 14 | 951 | 16 | 1116 | 48 | — |
| 6 | 33 | 29 | — | — | 14 | 938 | — | — |
| 7 | 44 | 37 | 15 | 846 | 14 | 854 | 39 | — |
| 8 | 41 | 35 | 13 | 785 | 14 | 810 | 45 | 461 |
| 9 | 43 | 38 | — | — | 12 | 823 | — | — |
| 10 | 23 | 23 | — | — | 14 | 902 | — | — |
| 11 | 30 | 26 | — | — | 16 | 1090 | — | 976 |
| 12 | 20 | 17 | 12 | 961 | 13 | 931 | — | 1247 |
| 13 | 16 | 14 | — | — | 13 | 814 | — | 691 |
| 14 | 212 | 160 | — | — | 29 | 857 | — | — |
| 15 | 18 | 14 | 12 | 1127 | 10 | 1573 | — | 2074 |
| 16 | 23 | 20 | — | — | 12 | 968 | — | — |
| 17 | 20 | 18 | — | — | 13 | 1252 | — | 1274 |
| 18 | 323 | 239 | — | — | 30 | 808 | — | — |
| 19 | 706 | 483 | — | — | 36 | 871 | — | — |
| G* | 15 | 15 | — | — | 17 | 1000 | — | 746 |
| H* | 16 | 15 | — | — | 15 | 829 | — | 569 |
| I* | 210 | 147 | — | — | 29 | 697 | — | — |
| J* | — | — | — | — | 32 | 609 | — | — |
| K* | — | — | — | — | — | — | — | — |

| Ex. | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|
| D* | 91 | 83 | 760 | — | — |
| E* | — | — | — | — | — |
| F* | 78 | 65 | 400 | 42 | — |
| 5 | 87 | 74 | 790 | 14 | 33 |
| 6 | — | 75 | 861 | 13 | — |
| 7 | 82 | 73 | 810 | 20 | — |
| 8 | 82 | 74 | 760 | 22 | — |
| 9 | — | — | — | 25 | — |
| 10 | 86 | 75 | 860 | 12 | — |
| 11 | 89 | 66 | 510 | 14 | 30 |
| 12 | 91 | 75 | 700 | 17 | — |
| 13 | 91 | — | — | 21 | — |
| 14 | — | — | — | — | — |
| 15 | 89 | 83 | 770 | 14 | — |
| 16 | 88 | 83 | 1040 | 13 | — |
| 17 | 13 | 83 | 920 | 4 | — |
| 18 | — | — | — | — | — |
| 19 | — | — | — | — | — |
| G* | 86 | 53 | 110 | 27 | 50 |
| H* | 87 | 60 | 380 | 23 | — |
| I* | — | — | — | — | — |
| J* | 93 | 96 | 1900 | 25 | — |
| K* | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm³, preferably less than about 80 mm³, and especially less than about 50 mm³. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers according to embodiments of the invention have better retractive stress at 150 percent strain (demonstrated by higher retractive stress values) than some of the comparative samples. Comparative Examples F, G and H have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative G. Lower stress relaxation means that the polymer retains its force better in applications such as diapers and other garments where retention of elastic properties over long time periods at body temperatures is desired.

Optical Testing

TABLE 6

Polymer Haze, Clarity, and Gloss

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |

TABLE 6-continued

Polymer Haze, Clarity, and Gloss

| Ex. | Internal Haze (percent) | Clarity (percent) | 45° Gloss (percent) |
|---|---|---|---|
| G* | 5 | 73 | 56 |
| H* | 12 | 76 | 59 |
| I* | 20 | 75 | 59 |

The haze, clarity, and gloss values reported in Table 6 are based on compression molded films substantially lacking in orientation. Optical properties of the polymers may be varied over wide ranges, due to variation in crystallite size, resulting from variation in the quantity of chain shuttling agent employed in the polymerization. In addition, the crystallite size may also be controlled through various processing methods and quenching conditions as well as through manipulation of the level of comonomer and hard segment content.

Extractions of Multi-Block Copolymers

Extraction studies of the polymers of Examples 5, 7 and Comparative E are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

Determined by $^{13}C$ NMR

Additional Polymer Examples 19A-I, Continuous Solution Polymerization, Catalyst A1/B2+DEZ Examples 19A-I: Continuous solution polymerizations are carried out in a computer controlled well-mixed reactor. Purified mixed alkanes solvent (Isopar™ E available from Exxon Mobil Chemical Company), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

Polymer Examples 20-23 were made using similar procedures as described in the above. Process details and results are contained in Tables 8A-C. Selected polymer properties are provided in Tables 9A-B. Table 9C shows the block indices for various polymers measured and calculated according the methodology described above. For calculations performed herein, $T_A$ is 372° K, $P_A$ is 1.

TABLE 8A

Polymerization Conditions for Polymers 19A-J

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr | Cocat 1 Conc. ppm | Cocat 1 Flow lb/hr | Cocat 2 Conc. ppm | Cocat 2 Flow lb/hr | $[Zn]^{4}$ in polymer ppm |
|---|---|---|---|---|---|---|---|---|---|---|---|---|---|---|---|---|
| 19A | 55.29 | 32.03 | 323.03 | 101 | 120 | 600 | 0.25 | 200 | 0.42 | 3.0 | 0.70 | 4500 | 0.65 | 525 | 0.33 | 248 |
| 19B | 53.95 | 28.96 | 325.3 | 577 | " | " | 0.25 | " | 0.55 | 3.0 | 0.24 | " | 0.63 | " | 0.11 | 90 |
| 19C | 55.53 | 30.97 | 324.37 | 550 | " | " | 0.216 | " | 0.609 | 3.0 | 0.69 | " | 0.61 | " | 0.33 | 246 |
| 19D | 54.83 | 30.58 | 326.33 | 60 | " | " | 0.22 | " | 0.63 | 3.0 | 1.39 | " | 0.66 | " | 0.66 | 491 |
| 19E | 54.95 | 31.73 | 326.75 | 251 | " | " | 0.21 | " | 0.61 | 3.0 | 1.04 | " | 0.64 | " | 0.49 | 368 |
| 19F | 50.43 | 34.80 | 330.33 | 124 | " | " | 0.20 | " | 0.60 | 3.0 | 0.74 | " | 0.52 | " | 0.35 | 257 |
| 19G | 50.25 | 33.08 | 325.61 | 188 | " | " | 0.19 | " | 0.59 | 3.0 | 0.54 | " | 0.51 | " | 0.16 | 194 |
| 19H | 50.15 | 34.87 | 318.17 | 58 | " | " | 0.21 | " | 0.66 | 3.0 | 0.70 | " | 0.52 | " | 0.70 | 259 |
| 19I | 55.02 | 34.02 | 323.59 | 53 | " | " | 0.44 | " | 0.74 | 3.0 | 1.72 | " | 0.70 | " | 1.65 | 600 |

[1] standard cm3/min
[2] [N-2,6-di(1-methylethyl)phenyl]amido)(2-isopropylphenyl)(α-naphthalen-2-diyl)(6-pyridin-2-diyl)methane)]hafnium dimethyl
[3] bis-(1-(2-methylcyclohexyl)ethyl)(2-oxoyl-3,5-di(t-butyl)phenyl)immino) zirconium dimethyl
[4] ppm in final product calculated by mass balance

TABLE 8B

Additional Polymerization Conditions for Polymers 19A-J

| Ex. | Poly Rate[5] lb/hr | Conv[6] wt % | Polymer wt % | $[C_2H_4]/[Zn]^{7}$ | $[Zn]/[C_2H_4]$ * $1000^{8}$ | Eff.[9] |
|---|---|---|---|---|---|---|
| 19A | 83.94 | 88.0 | 17.28 | 775 | 1.29 | 297 |
| 19B | 80.72 | 88.1 | 17.2 | 2222 | 0.45 | 295 |
| 19C | 84.13 | 88.9 | 17.16 | 775 | 1.29 | 293 |
| 19D | 82.56 | 88.1 | 17.07 | 395 | 2.53 | 280 |
| 19E | 84.11 | 88.4 | 17.43 | 513 | 1.95 | 288 |
| 19F | 85.31 | 87.5 | 17.09 | 725 | 1.38 | 319 |
| 19G | 83.72 | 87.5 | 17.34 | 1000 | 1.0 | 333 |
| 19H | 83.21 | 88.0 | 17.46 | 752 | 1.33 | 312 |
| 19I | 86.63 | 88.0 | 17.6 | 317 | 3.15 | 275 |

[5] polymer production rate
[6] weight percent ethylene conversion in reactor
[7] molar ratio in reactor; Zn/C2 * 1000 = (Zn feed flow * Zn concentration/1000000/Mw of Zn)/(Total Ethylene feed flow * (1 − fractional ethylene conversion rate)/Mw of Ethylene) * 1000. Please note that "Zn" in "Zn/C2 * 1000" refers to the amount of zinc in diethyl zinc ("DEZ") used in the polymerization process, and "C2" refers to the amount of ethylene used in the polymerization process.
[8] molar ratio in reactor
[9] efficiency, lb polymer/lb M where lb M = lb Hf + lb Z

TABLE 8C

Polymerization Conditions for Polymers 20-23.

| Ex. | Co.* Type | Co.* kg/hr | Solv. kg/hr | $H_2$ sccm[1] | T °C. | Cat A1[2] ppm | Cat A1 Flow kg/hr | Cat B2[3] ppm | Cat B2 Flow Kg/hr | DEZ Conc. ppm Zn | DEZ Flow kg/hr |
|---|---|---|---|---|---|---|---|---|---|---|---|
| 20 | Octene | 1.6 | 11.4 | 104.8 | 119 | 71.7 | 0.059 | 46.4 | 0.055 | 1688 | 0.018 |
| 21 | Butene | " | 10.5 | 9.9 | 120 | 94.2 | 0.065 | 10.5 | 0.100 | 9222 | 0.068 |
| 22 | Butene | " | 10.5 | 37.5 | " | " | 0.064 | " | 0.088 | " | 0.018 |
| 23 | Propylene | 1.4 | 9.8 | 4.9 | " | 53.1 | 0.024 | 58.1 | 0.098 | 3030 | 0.151 |

| Ex. | Cocat Conc. ppm | Cocat Flow kg/hr | $[C_2H_4]/[Zn]^{4}$ | $[Zn]/[C_2H_4]$ * $1000^{5}$ | Poly Rate[6] kg/hr | Conv[7] % | Solids % | Eff.[8] |
|---|---|---|---|---|---|---|---|---|
| 20 | 1743 | 0.118 | 9166 | 0.11 | 1.6 | 90 | 11.4 | 239 |
| 21 | 1168 | 0.057 | 442 | 2.26 | 1.7 | 90.5 | 12.2 | 235 |
| 22 | " | 0.054 | 1851 | 0.54 | 1.6 | 90 | 11.9 | 228 |
| 23 | 429.4 | 0.139 | 1030 | 0.97 | 1.1 | 82.5 | 9.4 | 184 |

*"Co." stands for "comonomer".
[1] standard cm3/min
[2] [N-(2,6-di(1-methylethyl)phenyl)amido)(2-isopropylphenyl)(α-naphthalen-2-diyl)(6-pyridin-2-diyl)methane)]hafnium dimethyl
[3] bis-(1-(2-methylcyclohexyl)ethyl)(2-oxoyl-3,5-di(t-butyl)phenyl)immino) zirconium dibenzyl
[4] molar ratio in reactor; Zn/C2 * 1000 = (Zn feed flow * Zn concentration/1000000/Mw of Zn)/(Total Ethylene feed flow * (1 − fractional ethylene conversion rate)/Mw of Ethylene) * 1000. Please note that "Zn" in "Zn/C2 * 1000" refers to the amount of zinc in diethylzinc ("DEZ") used in the polymerization process, and "C2" refers to the amount of ethylene used in the polymerization process.
[5] molar ratio in reactor
[6] polymer production rate
[7] percent ethylene conversion in reactor
[8] efficiency, kg polymer/g M where g M = g Hf + g Zr

TABLE 9A

Polymer Physical Properties

| Ex. | Density (g/cc) | $I_2$ | $I_{10}$ | $I_{10}/I_2$ | Mw (g/mol) | Mn (g/mol) | Mw/Mn | Heat of Fusion (J/g) | $T_m$ (°C.) | $T_c$ (°C.) | $T_{CRYSTAF}$ (°C.) | $T_m - T_{CRYSTAF}$ (°C.) | CRYSTAF Peak Area (wt %) |
|---|---|---|---|---|---|---|---|---|---|---|---|---|---|
| 19A | 0.8781 | 0.9 | 6.4 | 6.9 | 123700 | 61000 | 2.0 | 56 | 119 | 97 | 46 | 73 | 40 |
| 19B | 0.8749 | 0.9 | 7.3 | 7.8 | 133000 | 44300 | 3.0 | 52 | 122 | 100 | 30 | 92 | 76 |
| 19C | 0.8753 | 5.6 | 38.5 | 6.9 | 81700 | 37300 | 2.2 | 46 | 122 | 100 | 30 | 92 | 8 |
| 19D | 0.8770 | 4.7 | 31.5 | 6.7 | 80700 | 39700 | 2.0 | 52 | 119 | 97 | 48 | 72 | 5 |
| 19E | 0.8750 | 4.9 | 33.5 | 6.8 | 81800 | 41700 | 2.0 | 49 | 121 | 97 | 36 | 84 | 12 |
| 19F | 0.8652 | 1.1 | 7.5 | 6.8 | 124900 | 60700 | 2.1 | 27 | 119 | 88 | 30 | 89 | 89 |
| 19G | 0.8649 | 0.9 | 6.4 | 7.1 | 135000 | 64800 | 2.1 | 26 | 120 | 92 | 30 | 90 | 90 |
| 19H | 0.8654 | 1.0 | 7.0 | 7.1 | 131600 | 66900 | 2.0 | 26 | 118 | 88 | — | — | — |
| 19I | 0.8774 | 11.2 | 75.2 | 6.7 | 66400 | 33700 | 2.0 | 49 | 119 | 99 | 40 | 79 | 13 |

TABLE 9B

Polymer Physical Properties of Compression Molded Films

| Example | Density (g/cm³) | Melt Index (g/10 min) | Immediate Set after 100% Strain (%) | Immediate Set after 300% Strain (%) | Immediate Set after 500% Strain (%) | Recovery after 100% (%) | Recovery after 300% (%) | Recovery after 500% (%) |
|---|---|---|---|---|---|---|---|---|
| 19A | 0.878 | 0.9 | 15 | 63 | 131 | 85 | 79 | 74 |
| 19B | 0.877 | 0.88 | 14 | 49 | 97 | 86 | 84 | 81 |
| 19F | 0.865 | 1 | — | — | 70 | — | 87 | 86 |
| 19G | 0.865 | 0.9 | — | — | 66 | — | — | 87 |
| 19H | 0.865 | 0.92 | — | 39 | — | — | 87 | — |

TABLE 9C

Block Index for Selected Polymers

| Example | Comonomer | Density (g/cc) | $I_2$ g/10 min. | $Zn/C_2H_4$ * 1000 | Weight Average BI | Second Moment About the Mean Weight Average BI |
|---|---|---|---|---|---|---|
| F* | Octene | 0.8895 | 0.9 | 0 | 0 | 0 |
| L* | Octene | 0.905 | 0.8 | — | 0 | 0.01 |
| M* | Octene | 0.902 | 1.0 | — | 0 | 0 |
| 20 | Octene | 0.8841 | 1.0 | 0.11 | 0.2 | 0.45 |
| 8 | Octene | 0.8828 | 0.9 | 0.56 | 0.59 | 0.32 |
| 19A | Octene | 0.8781 | 0.9 | 1.3 | 0.62 | 0.17 |
| 5 | Octene | 0.8786 | 1.5 | 2.4 | 0.53 | 0.136 |
| 19B | Octene | 0.8749 | 0.9 | 0.45 | 0.54 | 0.35 |
| 19I | Octene | 0.8774 | 11.2 | 3.15 | 0.59 | 0.22 |
| 21 | Butene | 0.8795 | 0.9 | 1.89 | 0.65 | 0.22 |
| 22 | Butene | 0.8802 | 1.1 | 1.71 | 0.66 | 0.33 |
| 23 | Propylene | 0.883 | 1.2 | 0.97 | 0.61 | 0.24 |

1) L* is a ultra low density polyethylene made by Ziegler-Natta catalysis and available from The Dow Chemical Company under the trademark of ATTANE ™ 4203.
2) M* is a polyethylene copolymer made by constrained geometry catalysis (i.e., single-site catalyst) and available from The Dow Chemical Company under the trademark of AFFINITY ® PL1880G.

As shown in Table 9C, all the inventive polymers have a weight average block index of greater than zero, whereas the random copolymers (Polymers F*, L*, and M*) all have a block index of zero.

Figure 10:
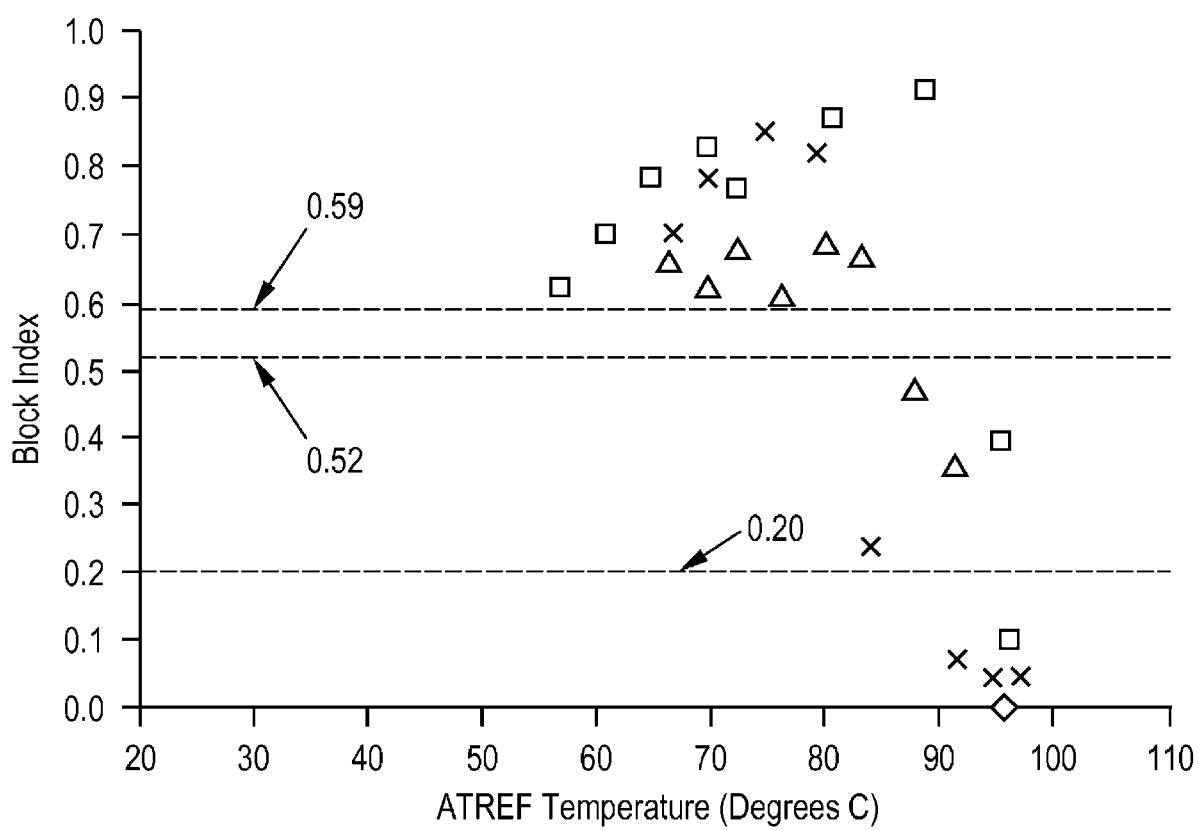
FIG. 10 is a plot of the block index calculated for each TREF fraction for four polymers. The diamond represent Polymer F* with an average block index of 0; the triangles represent Polymer 5 with an average block index of 0.53; the squares represent Polymer 8 with an average block index of 0.59; and the "X" represents Polymer 20 with an average block index of 0.20.
Figure 11:
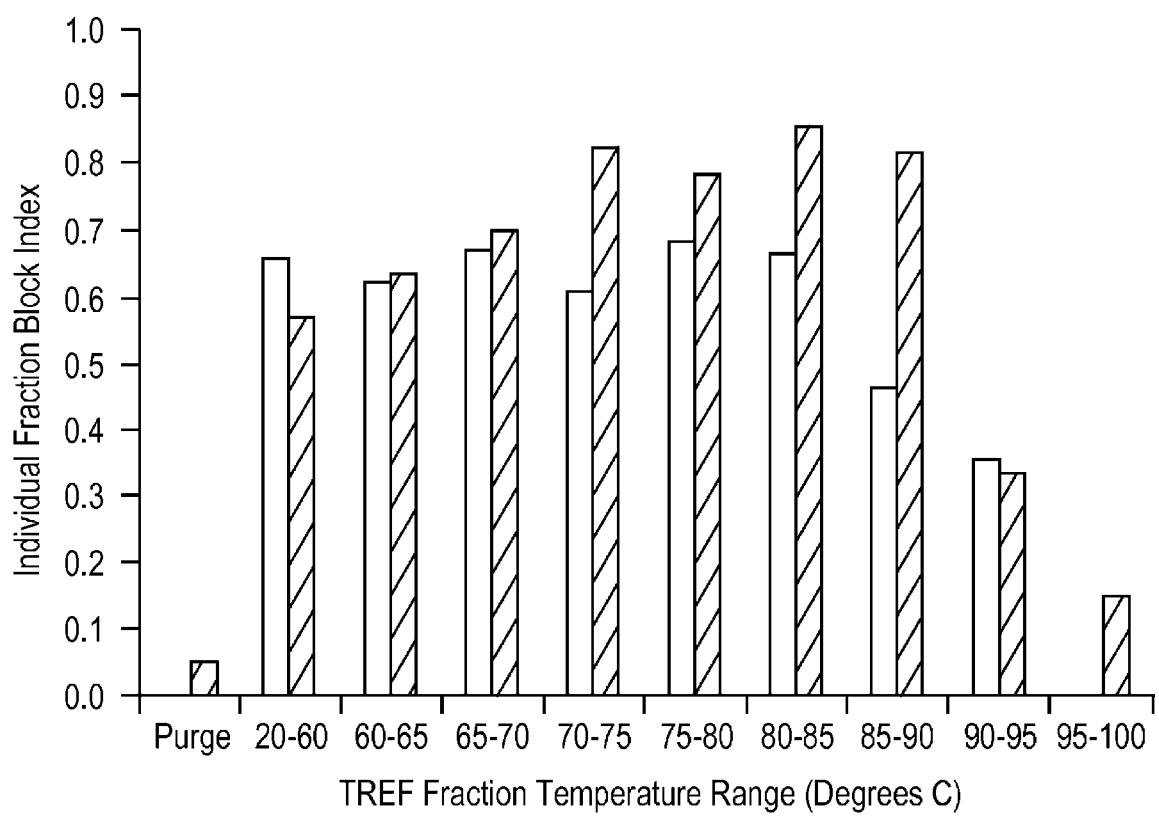
FIG. 11 is a plot of the block index calculated for each TREF fraction for two block copolymers: the filled bars represent Polymer 18B; and the open bars represent Polymer 5.

FIG. 10 shows the block index distribution for Polymer F*, Polymer 20, Polymer 8, and Polymer 5 as a function of the ATREF temperature. For Polymer F*, the block index for all the ATREF fraction is zero or substantially zero (i.e., ≦0.01). Polymer 20 was made with a relatively low level of the shuttling agent, diethyl zinc ("DEZ"). While the weight average block index for the whole polymer is about 0.2, the polymer includes four fractions with a block index from about 0.7 to about 0.9. For Polymers 5 and 8, their weight average block indices are not drastically different (0.52 vs. 0.59), considering the DEZ level is about a four-fold difference. Moreover, most of their fractions have a block index of about 0.6 or higher. Similar results are seen between Polymer 5 and Polymer 19B, which is illustrated in FIG. 11. However, there are some notable differences in the block index for the fractions which elute from about 70° C. to about 90° C. Polymer 19B was made with a higher level (about four fold higher) of DEZ than Polymer 5. However, Polymer 5 has more fractions that have higher block indices. This seems to suggest that there might be an optimal DEZ level for making fractions with higher block indices (i.e., greater than about 0.6).

Figure 12:
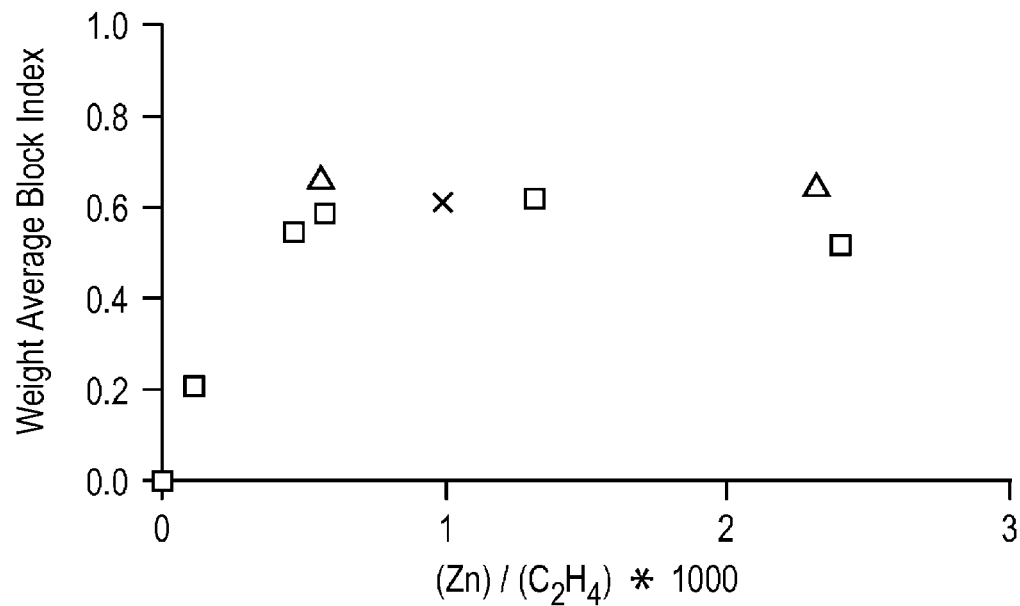
FIG. 12 is a plot of the average block index calculated for nine different polymers as a function of the diethyl zinc concentration during polymerization in terms of "$[Zn/C_2H_4]*1000$." "x" represents an ethylene/propylene block copolymer (Polymer 23); the two triangles represent two ethylene/butene block copolymers (Polymer 21 and Polymer 22); and the squares represent ethylene/octene copolymers made at different levels of diethyl zinc (including one made without any diethyl zinc).

The effect of the DEZ concentration level on the average block index for some of the polymers in Table 9C is illustrated in FIG. 12. The plots seem to suggest that the average block index increases with increasing DEZ initially. Once $Zn/C_2H_4*1000$ exceeds about 0.5, the average block index appears to level off and may even drop off if too much DEZ is used.

Figure 13:
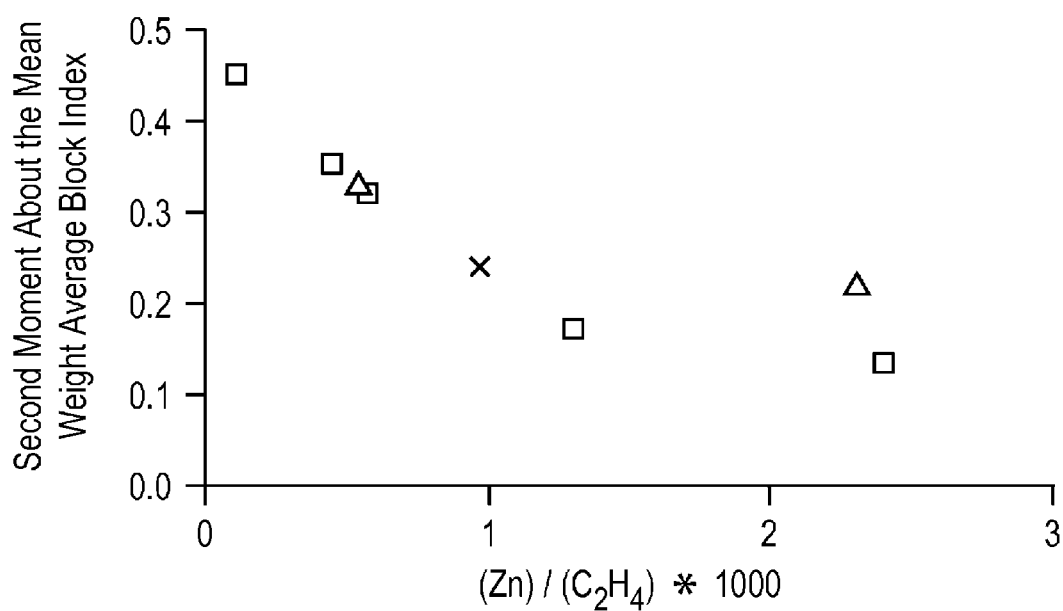
FIG. 13 is a plot of the square root of the second moment about the mean weight average block index as a function of $[Zn/C_2H_4]*1000$.

FIG. 13 is a plot of the square root of the second moment about the mean weight average block index as a function of $[Zn/C_2H_4]*1000$. It appears to decrease as DEZ increases. This would indicated that the distribution of the block indices of the fractions are becoming narrower (i.e., more homogeneous).

TREF and NMR Data

Tables 10-14 list TREF, DSC, IR, and NMR data for Polymers 5, 8, 14, and 19 and various comparative polymers.

TABLE 10

TREF Fractions from Ziegler-Natta LLDPE

| Fractionation Temperature | ATREF T (° C.) | Mol % Octene (NMR) | Tm (° C.) | DeltaH melt (J/g) |
|---|---|---|---|---|
| 35-40 | 49 | 8.0 | 82 | 84 |
| 40-45 | 56.5 | 7.0 | 86 | 97 |
| 45-50 | 57.5 | 6.6 | 89 | 101 |
| 50-55 | 61 | 6.0 | 92 | 96 |
| 55-60 | 63.5 | 5.4 | 95 | 99 |
| 60-65 | 67.5 | 4.9 | 98 | 104 |
| 65-70 | 72 | 4.3 | 101 | 112 |
| 70-75 | 75.5 | 3.7 | 104 | 112 |
| 75-80 | 79 | 3.1 | 107 | 122 |
| 80-85 | 83.5 | 2.5 | 112 | 131 |
| 85-90 | 90 | 1.7 | 116 | 154 |
| 90-95 | 95.5 | 1.1 | 123 | 160 |
| 95-100 | 100 | 0.5 | 128 | 185 |
| 100-105 | 101 | 0.2 | 130 | 195 |

Ex. L* - Ziegler-Natta Example (Attane ™ 4203, 0.90 g/cm³, 0.8 I₂)

TABLE 11

TREF Fractions from Random Copolymer

| Fractionation Temperature | ATREF T (° C.) | Mol % Octene (NMR) | Tm (° C.) | DeltaH melt (J/g) |
|---|---|---|---|---|
| 35-40 | 51.5 | NM | 83 | 102 |
| 40-45 | 56 | 7.3 | 87 | 96 |
| 45-50 | 61.5 | 6.5 | 90 | 101 |
| 50-55 | 63.5 | 5.7 | 93 | 100 |
| 55-60 | 66.5 | 5.3 | 95 | 104 |
| 60-65 | 69.5 | 4.9 | 97 | 105 |
| 65-70 | 72 | 4.4 | 99 | 111 |
| 70-75 | 74 | 4.2 | 101 | 111 |
| 75-80 | 76.5 | 3.8 | 106 | 112 |

Ex. M* - Random Copolymer Example (AFFINITY ® PL1880, 0.90 g/cm³, 1 I₂)

TABLE 12

TREF Fractions from Inventive Example 5
Inventive Example 5

| Fractionation Temperature | ATREF T (° C.) | Mol % Octene (NMR) | Tm (° C.) | DeltaH melt (J/g) |
|---|---|---|---|---|
| 60-65 | 70.5 | 12.6 | 106 | 45 |
| 65-70 | 73 | 12.2 | 108 | 48 |
| 70-75 | 77 | 11.7 | 111 | 51 |
| 75-80 | 81 | 10.5 | 113 | 57 |
| 80-85 | 84 | 9.8 | 115 | 68 |
| 85-90 | 88.5 | 7.0 | 119 | 83 |
| 90-95 | 92 | 5.2 | 123 | 110 |

TABLE 13

TREF Fractions from Inventive Example 8
Inventive Example 8

| Fractionation Temperature | ATREF T (° C.) | Mol % Octene (NMR) | Tm (° C.) | DeltaH melt (J/g) |
|---|---|---|---|---|
| 50-55 | 20 | 16.5 | 98 | 28 |
| 55-60 | 57.5 | 16.2 | 104 | 29 |
| 60-65 | 61.5 | 16.5 | 106 | 28 |
| 65-70 | 65.5 | 16.2 | 109 | 29 |
| 70-75 | 70.5 | 15.7 | 112 | 31 |
| 75-80 | 73 | 15.5 | 114 | 32 |
| 80-85 | 81.5 | 11.6 | 117 | 37 |
| 85-90 | 89.5 | 10.7 | 120 | 58 |
| 90-95 | 96 | 4.6 | 126 | 125 |
| 95-100 | 96.5 | 1.5 | 129 | 180 |

TABLE 14

ATREF Peak comonomer composition for random copolymers and Examples 5, 8, 14, 19

| Example | Density (g/cc) | I2 | Mol % Octene (NMR) | $T_{ATREF}$ (° C.) | Mol % Octene TREF Peak (Infra-red) | Infra-red FWHM CH₂ Area | Infra-red FWHM CH₃ Area | Infra-red FWHM CH₃/CH₂ Area Ratio |
|---|---|---|---|---|---|---|---|---|
| N* | 0.96 | 1.0 | 0 | 102 | 0.0 | 37.5 | 28.2 | 0.753 |
| O* | 0.9371 | 2.0 | 0.69 | 95 | 1.2 | 29.0 | 22.2 | 0.765 |
| M* | 0.9112 | 1.0 | 3.88 | 79 | 4.0 | 77.5 | 61.0 | 0.786 |
| P* | 0.9026 | 1.1 | 5.57 | 70 | 5.1 | 74.3 | 59.0 | 0.794 |
| Q* | 0.8872 | 0.9 | 9.06 | 57 | 9.2 | 30.9 | 25.5 | 0.824 |
| Ex. 5 | 0.8786 | 1.5 | NA | 82 | 11.4 | 77.5 | 61.0 | 0.841 |

TABLE 14-continued

ATREF Peak comonomer composition for random copolymers and Examples 5, 8, 14, 19

| Example | Density (g/cc) | I2 | Mol % Octene (NMR) | $T_{ATREF}$ (° C.) | Mol % Octene TREF Peak (Infra-red) | Infra-red FWHM $CH_2$ Area | Infra-red FWHM $CH_3$ Area | Infra-red FWHM $CH_3/CH_2$ Area Ratio |
|---|---|---|---|---|---|---|---|---|
| Ex. 8 | 0.8828 | 0.9 | NA | 90 | 12.2 | 34.0 | 28.8 | 0.846 |
| Ex. 14 | 0.9116 | 2.6 | NA | 92 | 6.5 | 23.4 | 18.8 | 0.805 |
| Ex. 19 | 0.9344 | 3.4 | NA | 97 | 2.8 | 25.3 | 19.7 | 0.777 |

Infra-red detector calibration:
Mol % Octene = 133.38 (FWHM $CH_3/CH_2$ Area) − 100.8
N* is an ethylene homopolymer.
O* is an ethylene/octene copolymer available from The Dow Chemical Company under AFFINITY® HF1030.
P* is an ethylene/octene copolymer available from The Dow Chemical Company under AFFINITY® PL1880.
Q* is an ethylene/octene copolymer available from The Dow Chemical Company under AFFINITY® VP8770.

Calculation of Block Index

With reference to FIGS. 2-3, the calculation of block indices is exemplified for Polymer 5. In the calculations, the following calibration equation is used:

$$LnP = -237.8341/T_{ATREF} + 0.6390$$

where P is the ethylene mole fraction, and $T_{ATREF}$ is the ATREF elution temperature. In addition, the following parameters are used:

| Parameter | Value | Explanation |
|---|---|---|
| $T_A$ | 372.15 | Analytical TREF elution temperature (° K) of hard segment |
| $P_A$ | 1.000 | Mole fraction of ethylene of hard segment |
| $P_{AB}$ | 0.892 | Mole fraction of ethylene of whole polymer |
| $T_{AB}$ | 315.722 | Calculated equivalent analytical TREF elution temperature (° K) of whole polymer from whole polymer ethylene content |

Table 15 gives details of the calculations for Polymer 5. The weighted average block index, ABI, for Polymer 5, is 0.531, and the square root of sum of weighted squared deviations about the weighted mean is 0.136. The partial sum of weights with fraction BI greater than zero (see note 2 below) is 0.835.

Measurement of Weight Percent of Hard and Soft Segments

As discussed above, the block interpolymers comprise hard segments and soft segments. The soft segments can be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent. Conversely, the hard segments can be present in a similar range as above. The soft segment weight percentage (and thus the hard segment weight percentage) can be measured by DSC or NMR.

TABLE 15

Fractional Block Index (BI) Calculations

| Fraction # | Weight Recovered (g) | ATREF Elution Temperature (° K) $T_x$ | Mole Fraction Ethylene (NMR) $P_x$ | Weight Fraction Recovered $w_i$ | Random Equivalent ATREF Temperature from NMR Ethylene Weight Fraction (° K) $T_{X0}$ | Random Equivalent mole fraction ethylene from ATREF Temperature $P_{X0}$ | Fractional Block Index based on Temperature formula $BI_i$ | Fractional Block Index based on $Log_e$ of mole fraction formula $BI_i$ | Weighted Fractional Block Indices $w_i * BI_i$ | Weighted Squared Deviations about the Weighted Mean (Note 2) $w_i * (BI_i - ABI)$ |
|---|---|---|---|---|---|---|---|---|---|---|
| 1 | 3.0402 | (Note 1) | 0.859 | 0.165 | (Note 1) | (Note 1) | 0 | 0 | 0 | (Note 1) |
| 2 | 1.9435 | 340 | 0.873 | 0.106 | 307 | 0.941 | 0.659 | 0.659 | 0.070 | 0.0017 |
| 3 | 0.7455 | 343.5 | 0.883 | 0.041 | 312 | 0.948 | 0.622 | 0.622 | 0.025 | 0.0003 |
| 4 | 1.0018 | 346 | 0.882 | 0.054 | 311 | 0.953 | 0.676 | 0.676 | 0.037 | 0.0011 |
| 5 | 2.3641 | 350 | 0.896 | 0.128 | 318 | 0.960 | 0.607 | 0.607 | 0.078 | 0.0007 |
| 6 | 4.1382 | 354 | 0.895 | 0.225 | 317 | 0.968 | 0.684 | 0.684 | 0.154 | 0.0052 |
| 7 | 3.5981 | 357 | 0.902 | 0.195 | 320 | 0.973 | 0.665 | 0.665 | 0.130 | 0.0035 |

TABLE 15-continued

Fractional Block Index (BI) Calculations

| Fraction # | Weight Recovered (g) | ATREF Elution Temperature (° K) $T_x$ | Mole Fraction Ethylene (NMR) $P_x$ | Weight Fraction Recovered $w_i$ | Random Equivalent ATREF Temperature from NMR Ethylene Weight Fraction (° K) $T_{X0}$ | Random Equivalent mole fraction ethylene from ATREF Temperature Array Variable Name $P_{X0}$ | Fractional Block Index based on Temperature formula $BI_i$ | Fractional Block Index based on $Log_e$ of mole fraction formula $BI_i$ | Weighted Fractional Block Indices $w_i * BI_i$ | Weighted Squared Deviations about the Weighted Mean (Note 2) $w_i * (BI_i - ABI)$ |
|---|---|---|---|---|---|---|---|---|---|---|
| 8 | 1.2280 | 361.5 | 0.930 | 0.067 | 334 | 0.981 | 0.470 | 0.470 | 0.031 | 0.0003 |
| 9 | 0.3639 | 365 | 0.948 | 0.020 | 343 | 0.987 | 0.357 | 0.357 | 0.007 | 0.0006 |
| | | | | | | | | | ABI | |
| | 18.4233 Total Weight | | | 1.000 Normalization check | | | | Weighted Sums | 0.531 | 0.0135 |

(Note 1): Fraction #1 does not crystallize in the analytical ATREF and is assigned $BI_i = 0$
(Note 2): The weighted squared deviations about the weighted mean use only $BI_i > 0$ Hard Segment Weight Fraction Measured by DSC For a block polymer having hard segments and soft segments, the density of the overall block polymer, $\rho_{overall}$, satisfies the following relationship:

$$\frac{1}{\rho_{overall}} = \frac{x_{hard}}{\rho_{hard}} + \frac{x_{soft}}{\rho_{soft}}$$

where $\rho_{hard}$ and $\rho_{soft}$, are the theoretical density of the hard segments and soft segments, respectively. $\chi_{hard}$ and $\chi_{soft}$, are the weight fraction of the hard segments and soft segments, respectively and they add up to one. Assuming $\rho_{hard}$ is equal to the density of ethylene homopolymer, i.e., 0.96 g/cc, and transposing the above equation, one obtains the following equation for the weight fraction of hard segments:

$$x_h = \frac{\frac{1}{\rho_{overall}} - \frac{1}{\rho_{soft}}}{-\frac{1}{\rho_{overall}} + \frac{1}{0.96 \text{ g/cc}}}$$

In the above equation, $\rho_{overall}$ can be measured from the block polymer. Therefore, if $\rho_{soft}$ is known, the hard segment weight fraction can be calculated accordingly. Generally, the soft segment density has a linear relationship with the soft segment melting temperature, which can be measured by DSC over a certain range:

$$\rho_{soft} = A*T_m + B$$

where A and B are constants, and $T_m$ is the soft segment melting temperature in degrees Celsius. A and B can be determined by running DSC on various copolymers with a known density to obtain a calibration curve. It is preferable to create a soft segment calibration curve that span the range of composition (both comonomer type and content) present in the block copolymer. In some embodiments, the calibration curve satisfies the following relationship:

$$\rho_{soft} = 0.00049*T_m + 0.84990$$

Therefore, the above equation can be used to calculate the soft segment density if $T_m$ in degrees Celsius is known.

For some block copolymers, there is an identifiable peak in DSC that is associated with the melting of the soft segments. In this case, it is relatively straightforward to determine $T_m$ for the soft segments. Once $T_m$ in degrees Celsius is determined from DSC, the soft segment density can be calculated and thus the hard segment weight fraction.

Figure 14:
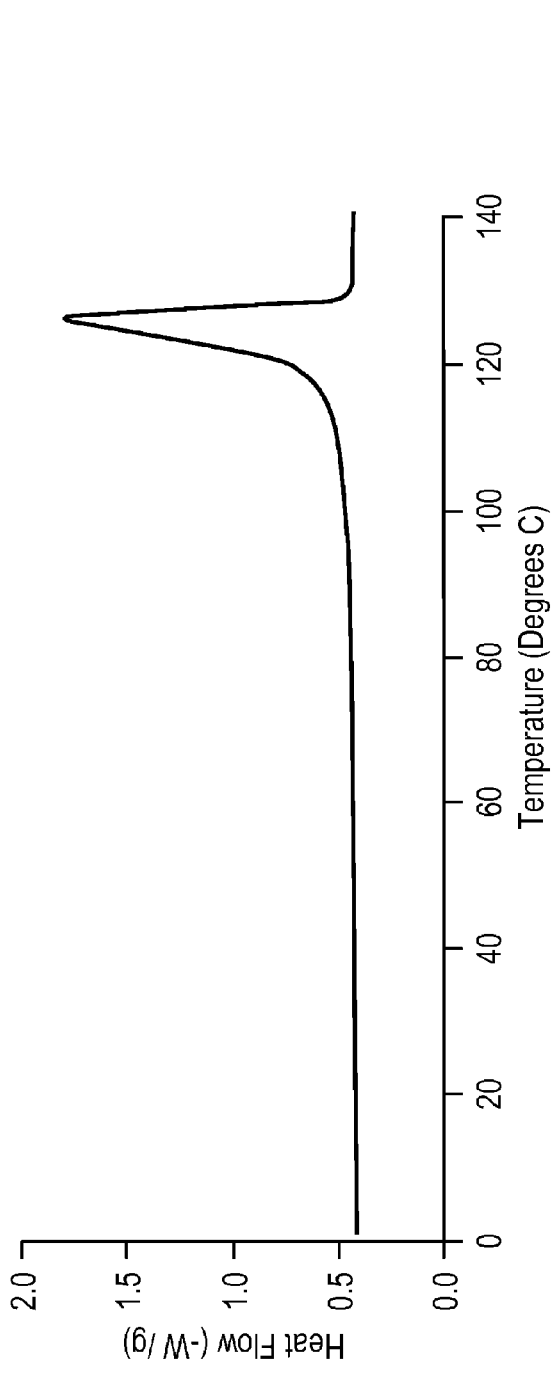
FIG. 14 is a representation of a normal DSC profile for an olefin block copolymer.
Figure 15:
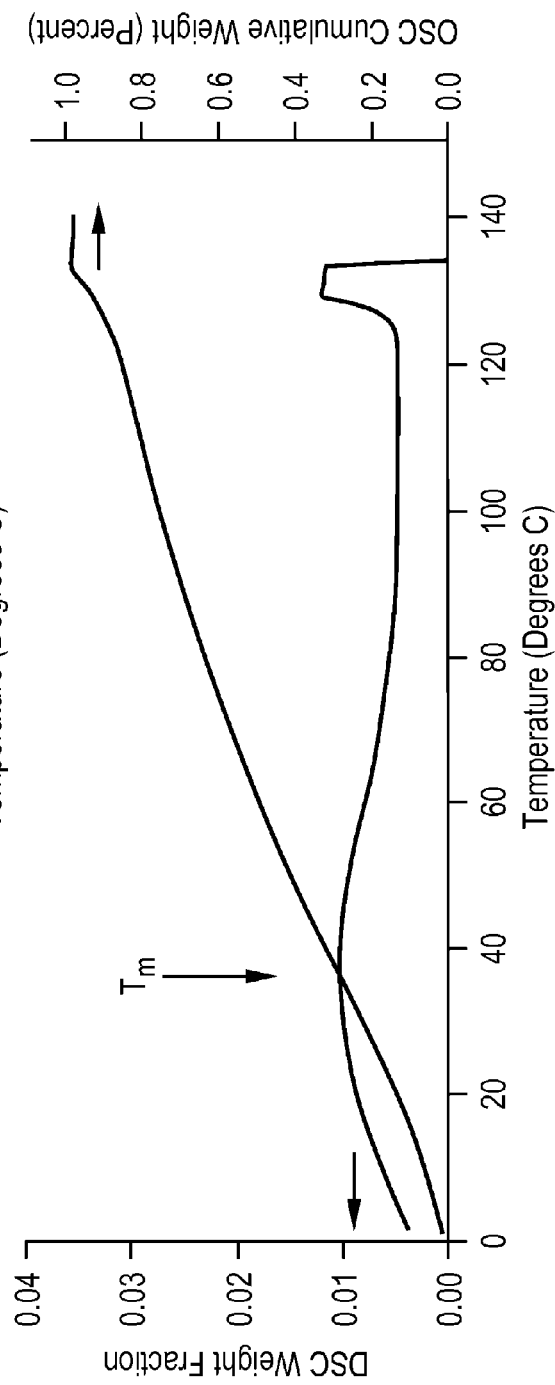
FIG. 15 is a weighted DSC profile obtained by converting FIG. 14.

For other block copolymers, the peak associated with the melting of the soft segments is either a small hump (or bump) over the baseline or sometimes not visible as illustrated in FIG. 14. This difficulty can be overcome by converting a normal DSC profile into a weighted DSC profile as shown in FIG. 15. The following method is used to convert a normal DSC profile to a weighted DSC profile.

In DSC, the heat flow depends on the amount of the material melting at a certain temperature as well as on the temperature-dependent specific heat capacity. The temperature-dependence of the specific heat capacity in the melting regime of linear low density polyethylene leads to an increase in the heat of fusion with decreasing comonomer content. That is, the heat of fusion values get progressively lower as the crystallinity is reduced with increasing comonomer content. See Wild, L. Chang, S.; Shankernarayanan, M J. Improved method for compositional analysis of polyolefins by DSC. Polym. Prep 1990; 31: 270-1, which is incorporated by reference herein in its entirety.

For a given point in the DSC curve (defined by its heat flow in watts per gram and temperature in degrees Celsius), by taking the ratio of the heat of fusion expected for a linear copolymer to the temperature-dependent heat of fusion ($\Delta H$ (T)), the DSC curve can be converted into a weight-dependent distribution curve.

The temperature-dependent heat of fusion curve can be calculated from the summation of the integrated heat flow between two consecutive data points and then represented overall by the cumulative enthalpy curve.

The expected relationship between the heat of fusion for linear ethylene/octene copolymers at a given temperature is shown by the heat of fusion versus melting temperature curve. Using random ethylene/octene copolymers, one can obtain the following relationship:

$$\text{Melt Enthalpy(J/g)} = 0.0072*T_m^2 (° \text{C.}) + 0.3138*T_m (° \text{C.}) + 8.9767$$

For each integrated data point, at a given temperature, by taking a ratio of the enthalpy from the cumulative enthalpy curve to the expected heat of fusion for linear copolymers at that temperature, fractional weights can be assigned to each point of the DSC curve.

It should be noted that, in the above method, the weighted DSC is calculated in the range from 0° C. until the end of melting. The method is applicable to ethylene/octene copolymers but can be adapted to other polymers.

Applying the above methodology to various polymers, the weight percentage of the hard segments and soft segments were calculated, which are listed in Table 16. It should be noted that sometimes it is desirable to assign 0.94 g/cc to the theoretical hard segment density, instead of using the density for homopolyethylene, due to the fact that the hard segments may include a small amount of comonomers.

TABLE 16

Calculated Weight Percentage of Hard and Soft Segments for Various Polymers

| Polymer Example No. | Overall Density | Soft Segment $T_m$ (° C.) from weighted DSC | Calculated Soft Segment Density | Calculated wt % Hard Segment | Calculated wt % Soft Segment |
|---|---|---|---|---|---|
| F* | 0.8895 | 20.3 | 0.860 | 32% | 68% |
| 5 | 0.8786 | 13.8 | 0.857 | 23% | 77% |
| 6 | 0.8785 | 13.5 | 0.857 | 23% | 77% |
| 7 | 0.8825 | 16.5 | 0.858 | 26% | 74% |
| 8 | 0.8828 | 17.3 | 0.858 | 26% | 74% |
| 9 | 0.8836 | 17.0 | 0.858 | 27% | 73% |
| 10 | 0.878 | 15.0 | 0.857 | 22% | 78% |
| 11 | 0.882 | 16.5 | 0.858 | 25% | 75% |
| 12 | 0.870 | 19.5 | 0.859 | 12% | 88% |
| 13 | 0.872 | 23.0 | 0.861 | 12% | 88% |
| 14 | 0.912 | 21.8 | 0.861 | 54% | 46% |
| 15 | 0.8719 | 0.5 | 0.850 | 22% | 78% |
| 16 | 0.8758 | 0.3 | 0.850 | 26% | 74% |
| 18 | 0.9192 | — | — | — | — |
| 19 | 0.9344 | 38.0 | 0.869 | 74% | 26% |
| 17 | 0.8757 | 2.8 | 0.851 | 25% | 75% |
| 19A | 0.8777 | 11.5 | 0.856 | 23% | 77% |
| 19B | 0.8772 | 14.3 | 0.857 | 22% | 78% |

Hard Segment Weight Percentage Measured by NMR $^{13}$C NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)), which is incorporated by reference herein in its entirety. The basic procedure for determining the comonomer content of an ethylene/olefin interpolymer involves obtaining a $^{13}$C NMR spectrum under conditions where the intensity of the peaks corresponding to the different carbons in a sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomers. The mole % comonomer can be determined by the ratio of the integrals corresponding to the number of moles of comonomer to the integrals corresponding to the number of moles of all of the monomers in the interpolymer, as described in the aforementioned Randall reference.

Since the hard segment generally has less than about 2.0 wt % comonomer, its major contribution to the spectrum is only for the integral at about 30 ppm. The hard segment contribution to the peaks not at 30 ppm is assumed negligible at the start of the analysis. So for the starting point, the integrals of the peaks not at 30 ppm are assumed to come from the soft segment only. These integrals are fit to a first order Markovian statistical model for copolymers using a linear least squares minimization, thus generating fitting parameters (i.e., probability of octene insertion after octene, $P_{oo}$, and probability of octene insertion after ethylene, $P_{eo}$) that are used to compute the soft segment contribution to the 30 ppm peak. The difference between the total measured 30 ppm peak integral and the computed soft segment integral contribution to the 30 ppm peak is the contribution from the hard segment. Therefore, the experimental spectrum has now been deconvoluted into two integral lists describing the soft segment and hard segment, respectively. The calculation of weight percentage of the hard segment is straight forward and calculated by the ratio of the sum of integrals for the hard segment spectrum to the sum of integrals for the overall spectrum.

From the deconvoluted soft segment integral list, the comonomer composition can be calculated according to the method of Randall, for example. From the comonomer composition of the overall spectrum and the comonomer composition of the soft segment, one can use mass balance to compute the comonomer composition of the hard segment. From the comonomer composition of the hard segment, Bernoullian statistics is used to calculate the contribution of the hard segment to the integrals of non 30 ppm peaks. There is usually so little octene, typically from about 0 to about 1 mol %, in the hard segment that Bernoullian statistics is a valid and robust approximation. These contributions are then subtracted out from the experimental integrals of the non 30 ppm peaks. The resulting non 30 ppm peak integrals are then fitted to a first order Markovian statistics model for copolymers as described in the above paragraph. The iterative process is performed in the following manner: fit total non 30 ppm peaks then compute soft segment contribution to 30 ppm peak; then compute soft/hard segment split and then compute hard segment contribution to non 30 ppm peaks; then correct for hard segment contribution to non 30 ppm peaks and fit resulting non 30 ppm peaks. This is repeated until the values for soft/hard segment split converge to a minimum error function. The final comonomer compositions for each segment are reported.

Validation of the measurement is accomplished through the analysis of several in situ polymer blends. By design of the polymerization and catalyst concentrations the expected split is compared to the measured NMR split values. The soft/hard catalyst concentration is prescribed to be 74%/26%. The measured value of the soft/hard segment split is 78%/22%. Table 17 shows the chemical shift assignments for ethylene octene polymers.

TABLE 17

Chemical Shift Assignments for Ethylene/Octene Copolymers.

| | |
|---|---|
| 41-40.6 ppm | OOOE/EOOO αα CH2 |
| 40.5-40.0 ppm | EOOE αα CH2 |
| 38.9-37.9 ppm | EOE CH |
| 36.2-35.7 ppm | OOE center CH |
| 35.6-34.7 ppm | OEO αγ, OOO center 6B, OOEE αδ+, OOE center 6B CH2 |
| 34.7-34.1 ppm | EOE αδ+, EOE 6B CH2 |

TABLE 17-continued

Chemical Shift Assignments for Ethylene/Octene Copolymers.

| | |
|---|---|
| 33.9-33.5 ppm | OOO center CH |
| 32.5-32.1 ppm | 3B CH2 |
| 31.5-30.8 ppm | OEEO γγ CH2 |
| 30.8-30.3 ppm | OE γδ+ CH2 |
| 30.3-29.0 ppm | 4B, EEE δ+δ+ CH2 |
| 28.0-26.5 ppm | OE βδ+ 5B |
| 25.1-23.9 ppm | OEO ββ |
| 23.0-22.6 ppm | 2B |
| 14.5-14.0 ppm | 1B |

The following experimental procedures are used. A sample is prepared by adding 0.25 g in a 10 mm NMR tube with 2.5 mL of stock solvent. The stock solvent is made by dissolving 1 g perdeuterated 1,4-dichlorobenzene in 30 mL ortho-dichlorobenzene with 0.025 M chromium acetylacetonate (relaxation agent). The headspace of the tube is purged of oxygen by displacement with pure nitrogen. The sample tube is then heated in a heating block set at 150° C. The sample tube is repeatedly vortexed and heated until the solution flows consistently from top of the solution column to the bottom. The sample tube is then left in the heat block for at least 24 hours to achieve optimum sample homogeneity.

The $^{13}$C NMR data is collected using a Varian Inova Unity 400 MHz system with probe temperature set at 125° C. The center of the excitation bandwidth is set at 32.5 ppm with spectrum width set at 250 ppm. Acquisition parameters are optimized for quantitation including 90° pulse, inverse gated $^1$H decoupling, 1.3 second acquisition time, 6 seconds delay time, and 8192 scans for data averaging. The magnetic field is carefully shimmed to generate a line shape of less than 1 Hz at full width half maximum for the solvent peaks prior to data acquisition. The raw data file is processed using NUTS processing software (available from Acorn NMR, Inc. in Livermore, Calif.) and a list of integrals is generated.

Figure 16:
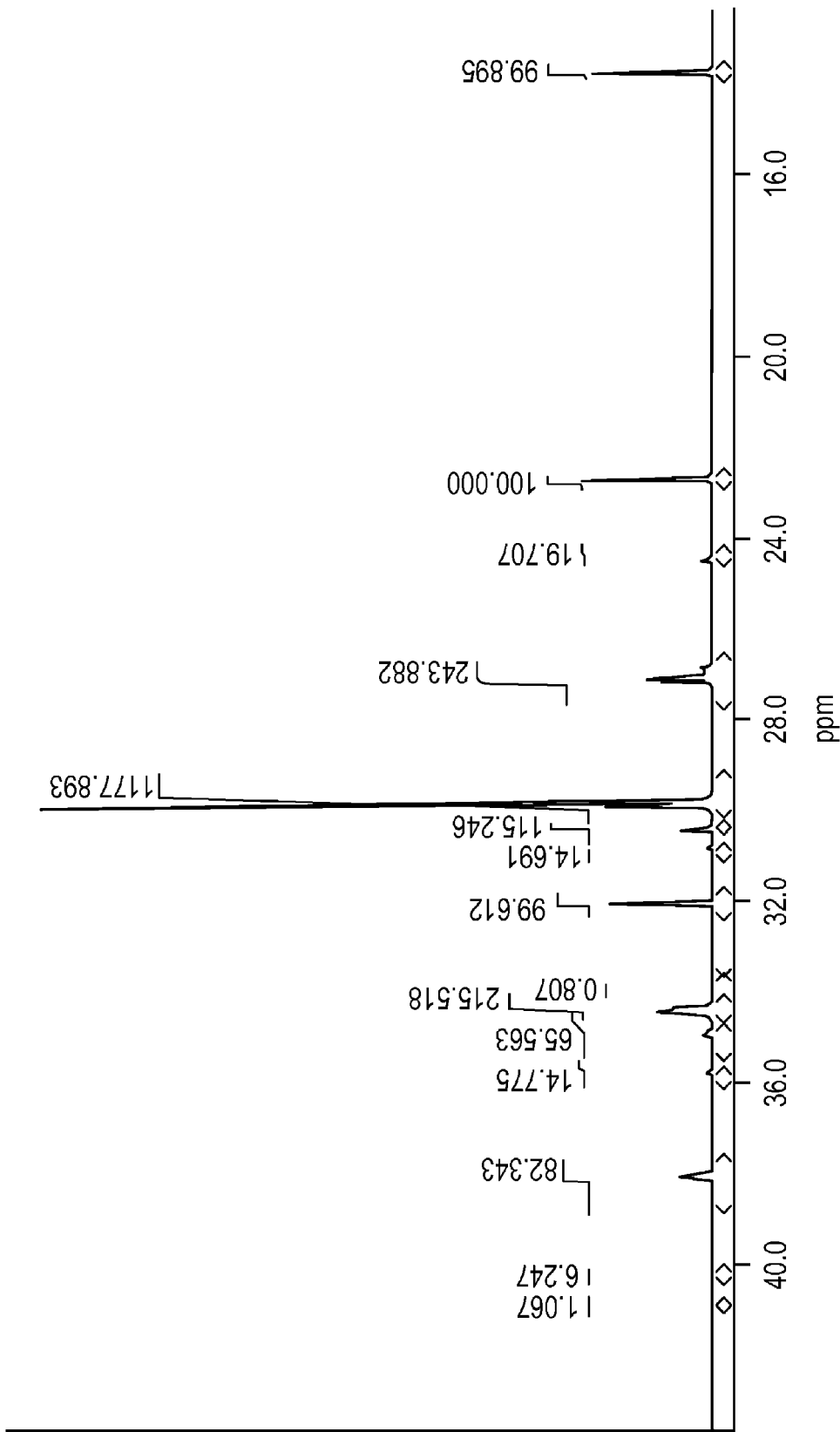
FIG. 16 is a $^{13}C$ NMR spectrum of Polymer 19A.

Inventive Polymer 19A is analyzed for the soft/hard segment split and soft/hard comonomer composition. The following is the list of integrals for this polymer. The NMR spectrum for Polymer 19A is shown in FIG. 16.

| Integral limit | Integral value |
|---|---|
| 41.0-40.6 ppm | 1.067 |
| 40.5-40.0 ppm | 6.247 |
| 38.9-37.9 ppm | 82.343 |
| 36.2-35.7 ppm | 14.775 |
| 35.6-34.7 ppm | 65.563 |
| 34.7-34.1 ppm | 215.518 |
| 33.9-33.5 ppm | 0.807 |
| 32.5-32.1 ppm | 99.612 |
| 31.5-30.8 ppm | 14.691 |
| 30.8-30.3 ppm | 115.246 |
| 30.3-29.0 ppm | 1177.893 |
| 28.0-26.5 ppm | 258.294 |
| 25.1-23.9 ppm | 19.707 |
| 23.0-22.6 ppm | 100 |
| 14.5-14.0 ppm | 99.895 |

Using Randall's triad method, the total octene weight percentage in this sample is determined to be 34.6%. Using all the above integrals excluding the 30.3-29.0 ppm integral to fit a first order Markovian statistical model, the values for $P_{oo}$ and $P_{eo}$ are determined to be 0.08389 and 0.2051, respectively. Using these two parameters, the calculated integral contribution from the soft segment to the 30 ppm peak is 602.586. Subtraction of 602.586 from the observed total integral for the 30 ppm peak, 1177.893, yields the contribution of the hard segment to the 30 ppm peak of 576.307. Using 576.307 as the integral for the hard segment, the weight percentage of hard segment is determined to be 26%. Therefore the soft segment weight percentage is 100−26=74%. Using the above values for $P_{oo}$ and $P_{eo}$, the octene weight percentage of the soft segment is determined to be 47%. Using the overall octene weight percentage and the octene weight percentage of the soft segment as well as the soft segment weight percentage, the octene weight percentage in the hard segment is calculated to be negative 2 wt %. This value is within the error of the measurement. Thus there is no need to iterate back to account for hard segment contribution to non 30 ppm peaks. Table 18 summarizes the calculation results for Polymers 19A, B, F and G.

TABLE 18

Hard and Soft Segments Data for Polymers 19A, B, F and G

| Example | wt % Soft Segment | wt % Hard Segment | wt % octene in Soft Segment |
|---|---|---|---|
| 19A | 74 | 26 | 47 |
| 19B | 74 | 26 | 48 |
| 19F | 86 | 14 | 49 |
| 19G | 84 | 16 | 49 |

Additional Examples Set 1

Examples 24-28 were prepared in a similar fashion as Examples 5-19. Table 19 shows the polymerization conditions for these examples and Table 20 shows the physical properties of these polymers.

TABLE 19

Polymerization Conditions for Examples 24-28

| Ex. | $C_8H_{16}$ kg/hr | Solv. kg/hr | $H_2$ sccm[1] | T °C. | Cat Al[2] ppm | Cat Al Flow kg/hr | Cat B2[3] ppm | B2 Flow kg/hr | DEZ Conc ppm Zn | DEZ Flow kg/hr | Cocat Conc. ppm | Cocat Flow kg/hr | $[C_2H_4]$/ $[DEZ]$[4] | Poly Rate[5] kg/hr | Conv %[6] | Solids % | Eff.[7] |
|---|---|---|---|---|---|---|---|---|---|---|---|---|---|---|---|---|---|
| 24 | 15.82 | 150.2 | 150 | 120 | 600 | 0.089 | 200 | 0.271 | 30000 | 0.335 | 4500 | 0.235 | 769 | 38.8 | 87.5 | 17.1 | 319 |
| 25 | 35.82 | 362.0 | 263 | " | 568 | 0.586 | 100 | 0.377 | 50000 | 0.259 | 5500 | 0.582 | 1377 | 92.7 | 88.1 | 17.7 | 117 |
| 26 | 47.77 | 414.4 | 195 | " | " | 0.864 | " | 1.111 | " | 0.370 | " | 0.968 | 1047 | 106 | 87.8 | 17.8 | 104 |

TABLE 19-continued

Polymerization Conditions for Examples 24-28

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc ppm Zn | DEZ Flow kg/hr | Cocat Conc. ppm | Cocat Flow kg/hr | $[C_2H_4]$/ $[DEZ]$[4] | Poly Rate[5] kg/hr | Conv %[6] | Solids % | Eff.[7] |
|---|---|---|---|---|---|---|---|---|---|---|---|---|---|---|---|---|---|
| 27 | 38.36 | 357.7 | 323 | " | " | 0.636 | " | 0.682 | 15000 | 0.891 | " | 0.886 | 1282 | 93 | 89.3 | 17.8 | 112 |
| 28 | 14.52 | 146.52 | 101 | " | 600 | 0.113 | 200 | 0.191 | 30000 | 0.318 | 4500 | 0.295 | 775 | 38.0 | 88.0 | 17.3 | 297 |

[1]standard cm3/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 20

Polymer Properties for Examples 24-28

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (° C.) | $T_c$ (° C.) | $T_{CRYSTAF}$ (° C.) | $T_m - T_{CRYSTAF}$ (° C.) | CRYSTAF Peak Area (percent) |
|---|---|---|---|---|---|---|---|---|---|---|---|---|---|
| 24 | 0.865 | 1.1 | 7.5 | 6.8 | 124900 | 60700 | 2.1 | 27 | 119 | 88 | 30 | 89 | 90 |
| 25 | 0.875 | 0.5 | 3.7 | 7.3 | 146900 | 66600 | 2.2 | 51 | 120 | 101 | 52 | 68 | 39 |
| 26 | 0.866 | 1.0 | 7.3 | 7.3 | 134900 | 63300 | 2.1 | 22 | 119 | 98 | 36 | 83 | 6 |
| 27 | 0.877 | 0.5 | 3.9 | 7.2 | 144500 | 69400 | 2.1 | 48 | 120 | 99 | 49 | 71 | 72 |
| 28 | 0.878 | 0.9 | 6.4 | 6.9 | 123700 | 61000 | 2.0 | 56 | 119 | 97 | 51 | 67 | 31 |

Figure 17:
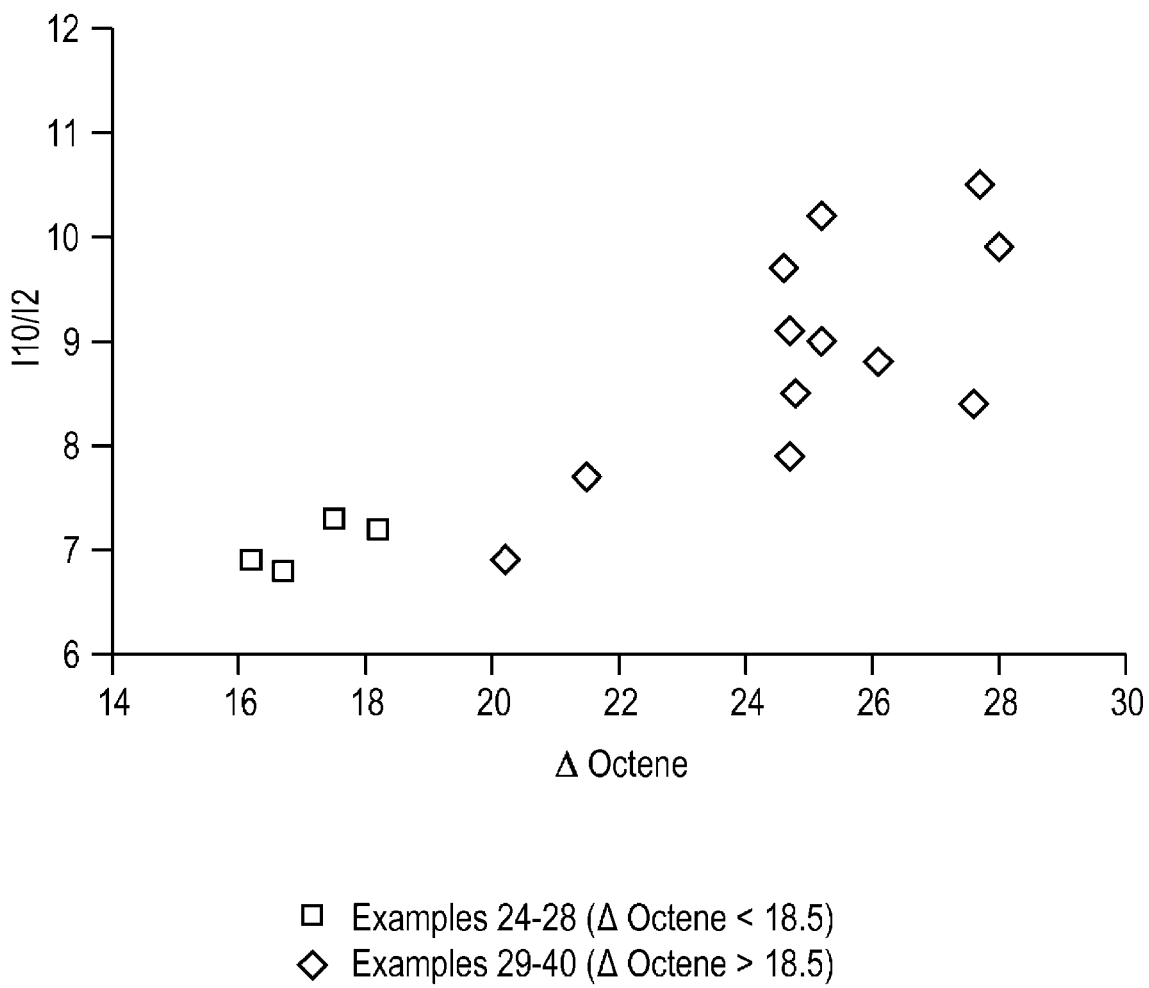
FIG. 17 is a plot of $I_{10}/I_2$ as a function of the difference in octene content (mol %) of the hard and soft segments, referred to as Δ octene for Examples 24-40.

Table 20 shows polymer properties for Examples 24-28, while Table 21 shows comonomer levels in the polymers as measured by $^{13}$C NMR. Example 24 has a difference in octene content in the hard and soft segments, or Δ Octene, of 16.7 mol %. Examples 25 and 26 have Δ Octene=17.5 mol %, Example 27 has Δ Octene=18.2 mol %, and Example 28 has Δ Octene=16.2 mol %. These samples all have $I_{10}/I_2$ values <7.3. The relationship between $I_{10}/I_2$ and Δ Octene is shown graphically in FIG. 17.

TABLE 21

Comonomer content

| Example | Overall Octene (mol %) | Octene in Soft Segment (mol %) | Octene in Hard Segment (mol %) | Δ Octene |
|---|---|---|---|---|
| 24 | 15.2 | 17.1 | 0.4 | 16.7 |
| 25 | 12.3 | 18.0 | 0.5 | 17.5 |
| 26 | 15.7 | 18.4 | 0.5 | 17.5 |
| 27 | 12.83 | 19.1 | 0.9 | 18.2 |
| 28 | 11.9 | 16.6 | 0.4 | 16.2 |

Additional Examples Set 2

Mesophase Separated Polymers

Examples 29-40 were prepared in a similar fashion as Examples 5-19. Table 22 shows the polymerization conditions for these examples and Table 23 shows the physical properties of these polymers. Some of these polymers exhibit a blueish tint via reflected light and appear yellow when viewed via transmitted light.

TABLE 22

Polymerization Conditions for Examples 29-40

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc (ppm Zn) | DEZ Flow kg/hr | Cocat Conc. ppm | Cocat Flow kg/hr | $[C_2H_4]$/ $[DEZ]$[4] | Poly Rate[5] kg/hr | Conv %[6] | Solids % | Eff.[7] |
|---|---|---|---|---|---|---|---|---|---|---|---|---|---|---|---|---|---|
| 29 | 5.21 | 9.53 | 3 | 120 | 93.2 | 0.111 | 15.9 | 0.119 | 2690 | 0.086 | 952 | 0.111 | 2113 | 1.6 | 79.6 | 9.6 | 128 |
| 30 | 5.24 | 9.89 | 0 | " | " | 0.144 | " | 0.152 | " | 0.145 | " | 0.150 | 1147 | 1.9 | 84.4 | 11.3 | 120 |
| 31 | 5.19 | 9.53 | 0 | " | 56.20 | 0.193 | " | 0.126 | " | 0.122 | 525.5 | 0.213 | 1725 | 1.6 | 79.9 | 9.9 | 127 |
| 32 | 5.19 | 9.52 | 8 | " | 93.20 | 0.092 | " | 0.097 | " | 0.060 | 951.5 | 0.093 | 2976 | 1.6 | 80.1 | 9.8 | 156 |
| 33 | 5.21 | 9.89 | 5 | " | " | 0.128 | " | 0.135 | " | 0.112 | " | 0.126 | 1385 | 2.0 | 85.3 | 11.7 | 139 |
| 34 | 4.62 | 9.89 | 3 | " | 92.90 | 0.183 | " | 0.338 | " | 0.101 | " | 0.214 | 1382 | 1.5 | 86.3 | 9.3 | 68 |
| 35 | 34.55 | 341.5 | 161 | " | 568 | 0.441 | 100 | 0.682 | 50000 | 0.518 | 5500 | 0.314 | 693 | 92 | 88.9 | 17.6 | 131 |
| 36 | 33.55 | 340.3 | 290 | " | " | 0.359 | " | 0.759 | " | 0.186 | " | 0.505 | 1518 | 92 | 89.3 | 17.4 | 148 |
| 37 | 37.55 | 313.8 | 136 | " | " | 0.318 | " | 0.814 | " | 0.314 | " | 0.482 | 943 | 89 | 88.0 | 16.8 | 148 |
| 38 | 56.1 | 541.6 | 370 | " | " | 0.508 | " | 0.590 | " | 0.377 | 5535 | 0.572 | 973 | 111.0 | 86.1 | 18.1 | 320 |

TABLE 22-continued

Polymerization Conditions for Examples 29-40

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc (ppm Zn) | DEZ Flow kg/hr | Cocat Conc. ppm | Cocat Flow kg/hr | $[C_2H_4]/[DEZ][4]$ | Poly Rate[5] kg/hr | Conv %[6] | Solids % | Eff.[7] |
|---|---|---|---|---|---|---|---|---|---|---|---|---|---|---|---|---|---|
| 39 | 5.21 | 9.52 | 0 | " | 56.2 | 0.196 | 15.9 | 0.094 | 2690 | 0.126 | 526 | 0.203 | 1706 | 1.6 | 80.2 | 9.9 | 131 |
| 40 | 4.76 | 9.89 | 0 | " | 92.9 | 0.181 | " | 0.332 | " | 0.147 | 952 | 0.214 | 1042 | 1.6 | 85.6 | 9.7 | 74 |

[1]standard cm³/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 23

Polymer Properties for Examples 29-40

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (° C.) | $T_c$ (° C.) | $T_{CRYSTAF}$ (° C.) | Tm − $T_{CRYSTAF}$ (° C.) | CRYSTAF Peak Area (percent) |
|---|---|---|---|---|---|---|---|---|---|---|---|---|---|
| 29 | 0.876 | 0.5 | 4.9 | 9.7 | 151500 | 70300 | 2.2 | 47 | 117 | 100 | 72 | 45 | 52 |
| 30 | 0.867 | 1.0 | 9.9 | 9.9 | 152000 | 56940 | 2.7 | 31 | 114 | 92 | 44 | 71 | 24 |
| 31 | 0.874 | 0.5 | 4.8 | 9.0 | 151200 | 68500 | 2.2 | 43 | 117 | 97 | 62 | 55 | 26 |
| 32 | 0.875 | 0.5 | 5.4 | 10.2 | 157400 | 69600 | 2.3 | 44 | 118 | 101 | 73 | 44 | 18 |
| 33 | 0.866 | 1.1 | 11.7 | 10.5 | 157900 | 61640 | 2.6 | 26 | 115 | 93 | 44 | 71 | 7 |
| 34 | 0.894 | 0.5 | 4.4 | 8.8 | 136000 | 66300 | 2.1 | 86 | 118 | 104 | 72 | 46 | 86 |
| 35 | 0.889 | 1.1 | 7.8 | 6.9 | 110000 | 57800 | 1.9 | 70 | 120 | 102 | 61 | 59 | 53 |
| 36 | 0.888 | 0.9 | 6.7 | 7.7 | 126900 | 55100 | 2.3 | 69 | 122 | 104 | 75 | 47 | 44 |
| 37 | 0.884 | 0.9 | 7.3 | 7.9 | 130700 | 58200 | 2.2 | 62 | 119 | 102 | 74 | 45 | 41 |
| 38 | 0.872 | 1.0 | 8.9 | 8.5 | 144000 | 72200 | 2.0 | 36 | 118 | 96 | 73 | 46 | 10 |
| 39 | 0.871 | 0.7 | 6.0 | 9.1 | 154800 | 72800 | 2.1 | 47 | 116 | 97 | 59 | 57 | 37 |
| 40 | 0.888 | 0.6 | 4.9 | 8.4 | 131000 | 63800 | 2.1 | 75 | 117 | 101 | 69 | 48 | 86 |

TABLE 24

Comonomer content for Examples 29-40

| Example | Overall Octene (mol %) | Octene in Soft Segment (mol %) | Octene in Hard Segment (mol %) | Δ Octene |
|---|---|---|---|---|
| 29 | 15.1 | 26 | 1.4 | 24.6 |
| 30 | 21.3 | 29.7 | 1.7 | 28.0 |
| 31 | 16.6 | 26.5 | 1.3 | 25.2 |
| 32 | 16.3 | 26.6 | 1.4 | 25.2 |
| 33 | 21.5 | 29.3 | 1.6 | 27.7 |
| 34 | 11.3 | 27.5 | 1.4 | 26.1 |
| 35 | 10.8 | 20.9 | 0.7 | 20.2 |
| 36 | 11.0 | 22.4 | 0.9 | 21.5 |
| 37 | 12.8 | 25.8 | 1.1 | 24.7 |
| 38 | 18.0 | 26.0 | 1.2 | 24.8 |
| 39 | 17.2 | 26.1 | 1.4 | 24.7 |
| 40 | 11.6 | 29.2 | 1.6 | 27.6 |

One additional feature of this inventive block interpolymer is that it displayed an unusual shear thinning characteristic in the melt. At a given melt index ($I_2$), some embodiments of the inventive block interpolymers with high α-olefin materials have higher molecular weights and $I_{10}/I_2$ values than block interpolymers with lower α-olefin content. Examples 24-28 have Δ Octene <18.5 mol % and $I_{10}/I_2$<7.3. As seen in Table 24, Examples 29-40 all have Δ Octene >18.5 mol %. Example 35 has Δ Octene=20.2 and $I_{10}/I_2$=6.9, but the rest of the examples (Examples 29-34, 36-40) have $I_{10}/I_2 \geq 7.7$. This higher $I_{10}/I_2$ may be used to distinguish these examples from examples with Δ Octene <18.5 mol %. Differences in $I_{10}/I_2$ and Δ Octene for the samples is shown graphically in FIG. 17. The higher $I_{10}/I_2$ values indicate that the polymer under high shear stresses flows more readily than a block interpolymer with low octene content. This enhanced flow may be useful for the coating of pressure sensitive adhesives, for example, which requires easy flow; it may also allow the use of higher molecular weight polymers in adhesive formulations which may result in improved creep resistance and holding power.

Microscopy Studies

Preparation of Compression Molded Samples

About 40 g of the polymer was compression molded into a 2 inch×2 inch×0.06 inch plaque between Mylar sheets sandwiched between metal platens in a Carver compression molding machine for 3 minutes at 190° C., 2 kpsi pressure for 3 minutes, 190° C., 20 kpsi pressure for 3 minutes, then cooling at 15° C., 20 kpsi for 3 minutes.

Preparation of Examples 32-34 for AFM Study

Examples 32-34 were studied using tapping mode Atomic Force Microscopy (AFM). Compression molded samples were first polished using an ultramicrotome (Reichert-Jung Ultracut E) at −120° C. perpendicular to the plaques near the center of the core area. A thin section was placed on a mica surface for AFM imaging using a DI NanoScope IV, Multi-Mode AFM operating in Tapping Mode with phase detection. The tip was tuned to a voltage of 3V and the tapping ratio was 0.76-0.83. Nano-sensor tips were used with tip parameters of: L=235 μm, tip ratio=5-10 nm, Spring constant=37-55 N/m, $F_0$=159-164 kHz.

Figure 18:
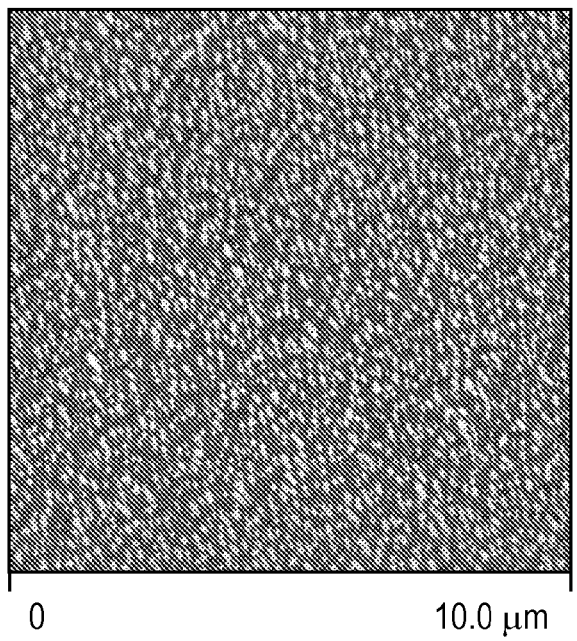
FIG. 18 is an AFM image of Ex. 32 at ~3,000× magnification.
Figure 19:
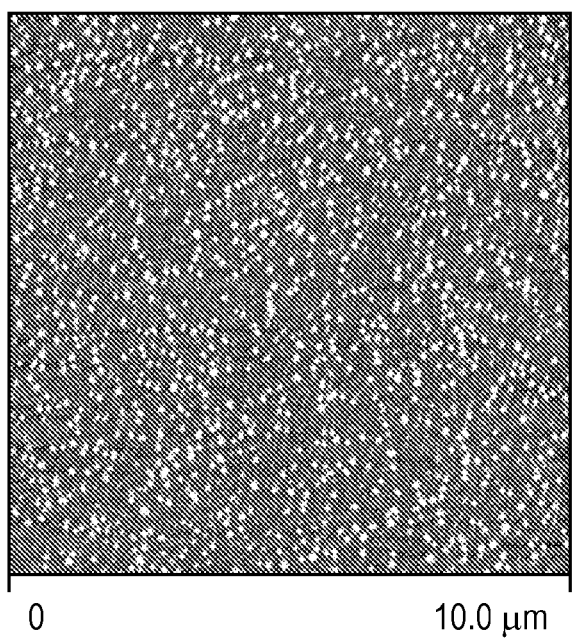
FIG. 19 is an AFM image of Ex. 33 at a ~3,000× magnification.
Figure 20:
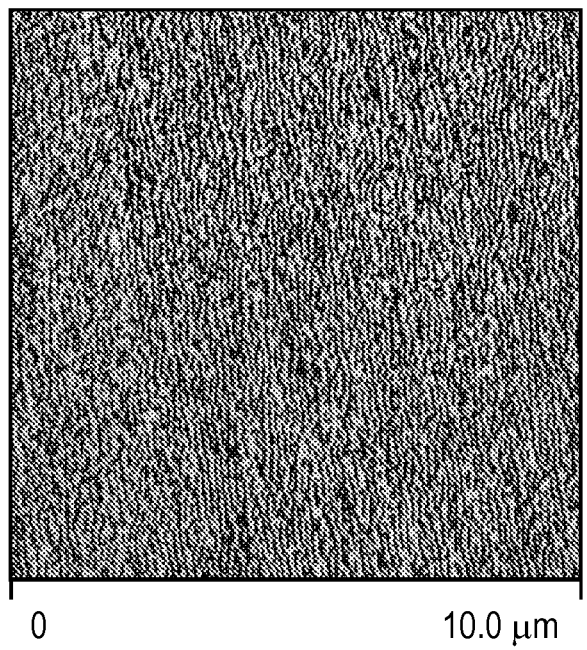
FIG. 20 shows an AFM image at ~3,000× magnification of Ex. 34.
Figure 21:
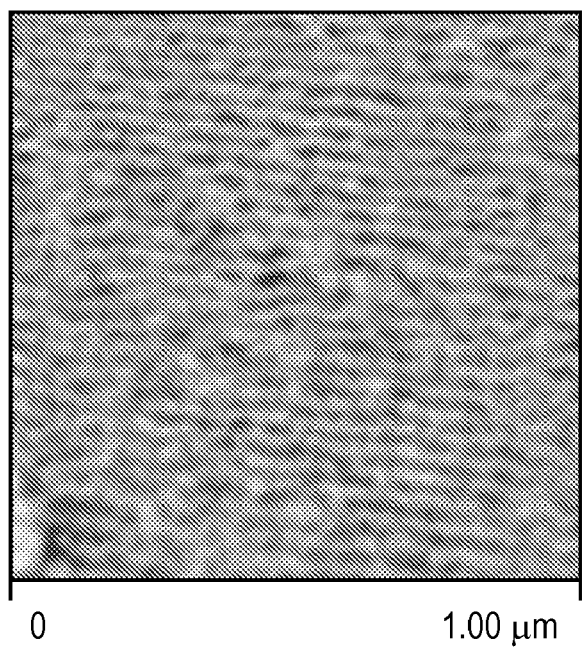
FIG. 21 is an AFM image of a styrenic block copolymer (SBC, 28 wt % styrene, 83 mol % "butane" in the B-block, $M_n$=64,000 g/mol) at 30,000× magnification.

FIGS. 18-20 show images of Examples 32-34 taken via AFM at approximately 3,000× magnification. These images show mesophase morphology similar to SBC morphology except for the size range of the observed domains; the domains are much larger than those of a monodisperse block copolymer with similar molecular weight. An example of an SBC polymer (28 wt % styrene, 83 mol % "butene" in the B-block, $M_n$=64,000 g/mol) at approximately 30,000× magnification is shown in FIG. 21.

Preparation of Example 34 for TEM Study

Example 34 was studied using transmission electron microscopy (TEM). The compression molded sheets were trimmed so that sections could be collected between the skin and core. The trimmed sheets were cryopolished prior to staining by removing sections from the blocks at −60° C. to prevent smearing of the elastomer phases. The cryo-polished blocks were stained with the vapor phase of a 2% aqueous ruthenium tetraoxide solution for 3 hrs at ambient temperature. The staining solution was prepared by weighing 0.2 gm of ruthenium (III) chloride hydrate ($RuCl_3 \times H_2O$) into a glass bottle with a screw lid and adding 10 mL of 5.25% aqueous sodium hypochlorite to the jar. The samples were placed in the glass jar using a glass slide having double sided tape. The slide was placed in the bottle in order to suspend the blocks about 1 inch above the staining solution. Sections of approximately 100 nanometers in thickness were collected at ambient temperature using a diamond knife on a Leica EM UC6 microtome and placed on 400 mesh virgin TEM grids for observation.

Figure 22:
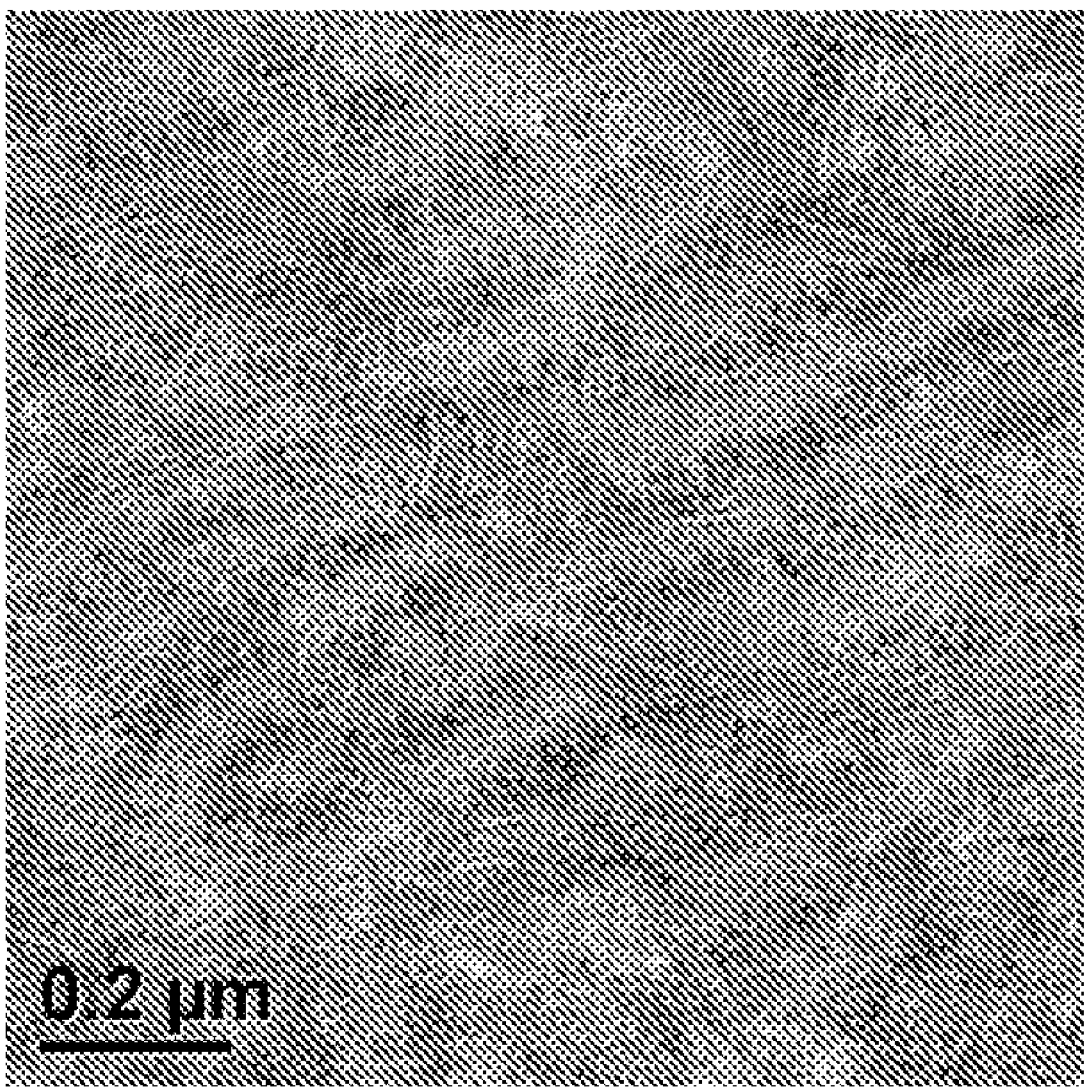
FIG. 22 shows a TEM image at ~30,000× magnification of Ex. 34.

Images were collected on a JEOL JEM-1230 operated at 100 kV accelerating voltage and collected on a Gatan-791 and 794 digital cameras. The images were post processed using Adobe Photoshop 7.0. FIG. 22 shows a TEM micrograph of Example 34 at approximately 30,000× magnification.

Preparation of Examples 29, 30, 32, and 33-40 for Reflectance Spectroscopy Study The reflectance spectra of Examples 29, 30, 32, and 33-40 were collected with a Labsphere™ (model 60MM RSA ASSY) integrating sphere. Spectralon™ diffuse reflectance standards were first mounted on both sample and reference ports of integrating sphere and the baseline correction was performed for the spectral range from 200-1200 nm. The slit width and spectral resolution were 2 nm and the spectrum was acquired with 1 nm/point. The Spectralon™ standard was then removed from the sample port and the film sample mounted in the sample port at a 90 degree incidence angle to the sample beam. No backing material was used and the film itself provided the only means of light reflectance.

Figure 23:
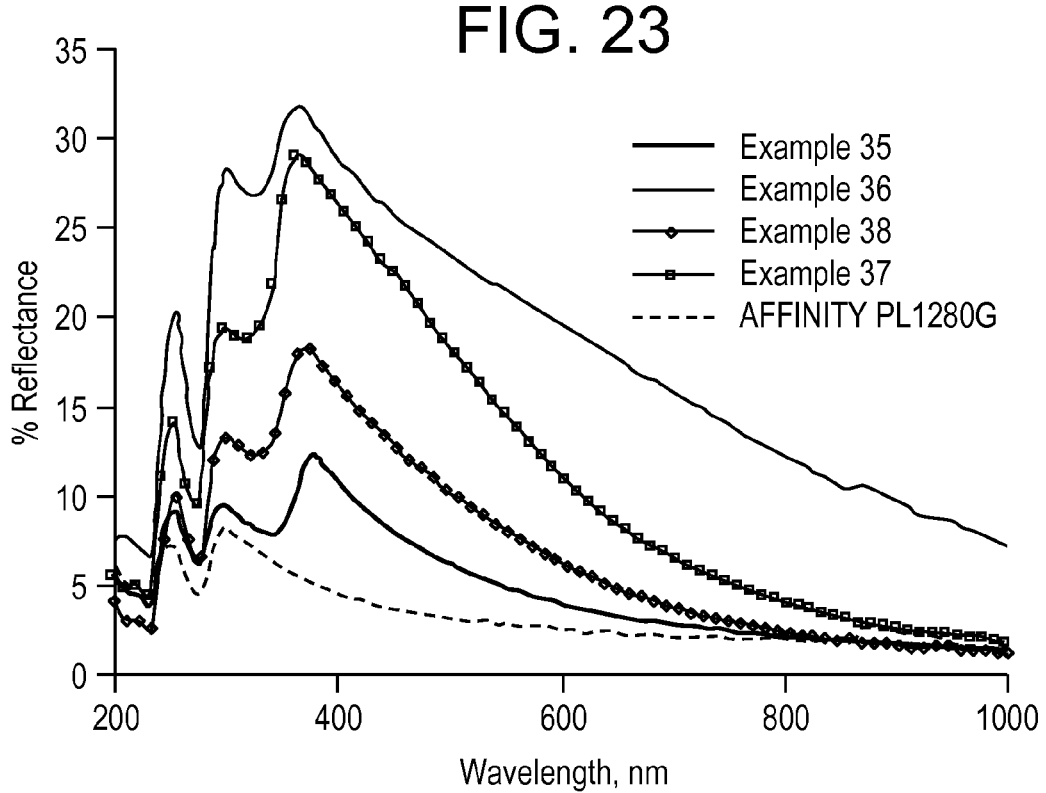
FIG. 23 shows reflectance spectra for Examples 35-38 and a comparative random copolymer AFFINITY® 1280G, available from The Dow Chemical Company. The random copolymer shows little reflectance (<10%) of the light in the explored range, while the inventive examples show higher reflectance across this range.
Figure 24:
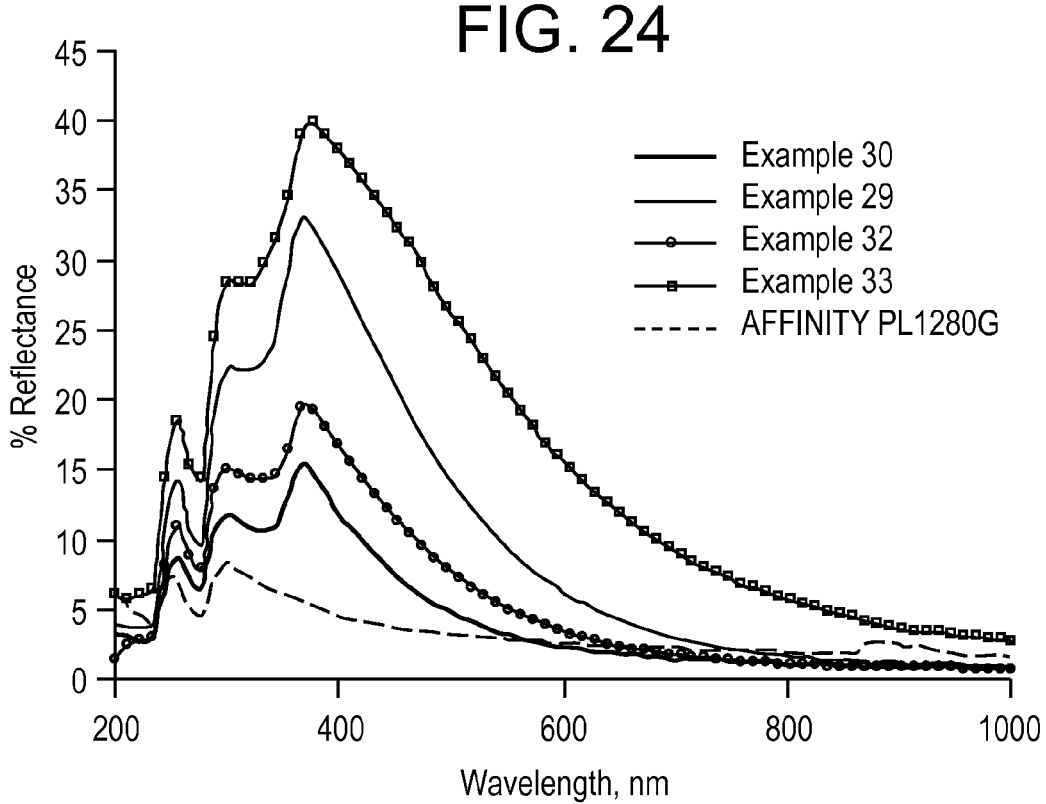
FIG. 24 shows reflectance spectra for Examples 29, 30, 32, and 33 and the comparative AFFINITY® 1280G, available from The Dow Chemical Company. The random copolymer shows little reflectance (<10%) of the light in the explored range, while the inventive examples show higher reflectance across this range.
Figure 25:
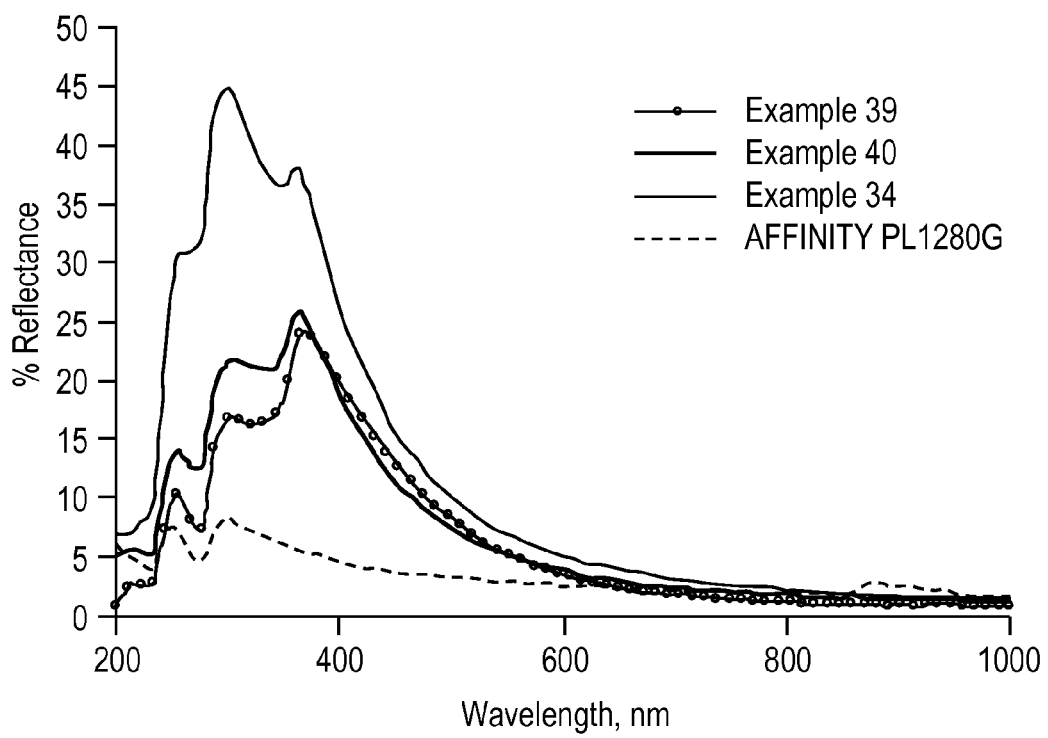
FIG. 25 shows reflectance spectra for Examples 34, 39, and 40 and the comparative AFFINITY® 1280G, available from The Dow Chemical Company. The random copolymer shows little reflectance (<10%) of the light in the explored range, while the inventive examples show higher reflectance across this range.
Figure 26:
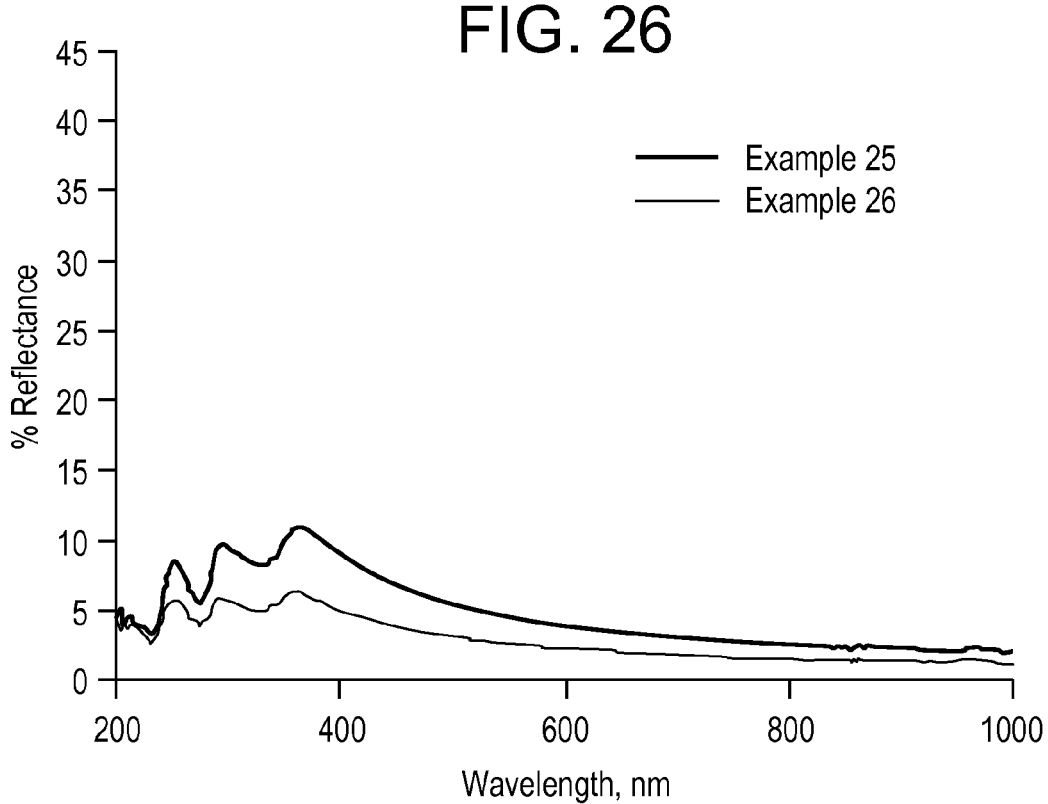
FIG. 26 shows reflectance spectra for Examples 25 and 26. These examples show little reflectance (<12%) of the light in the explored range.

FIGS. 23, 24 and 25 show the reflectance spectra of compression molded films of Examples 35 thru 38, Examples 29, 30, 32 and 33 and Examples 34, 39 and 40 respectively. A compression molded film of AFFINITY® PL1280G (available from The Dow Chemical Company)) is also provided in each Figure for comparison. In contrast to the reflectance spectra of the film of the AFFINITY® material, which exhibits little or no reflection across the measured range of wavelengths, each of the Example films exhibit a peak reflectance between 12 and 45% reflectivity. FIG. 26 shows the reflectance spectra for Examples 25 and 26 which are not mesophase separated, which exhibit peak reflectances of less than about 12%.

Physical Properties of Examples 26, 27, and 30-32.

Figure 27:
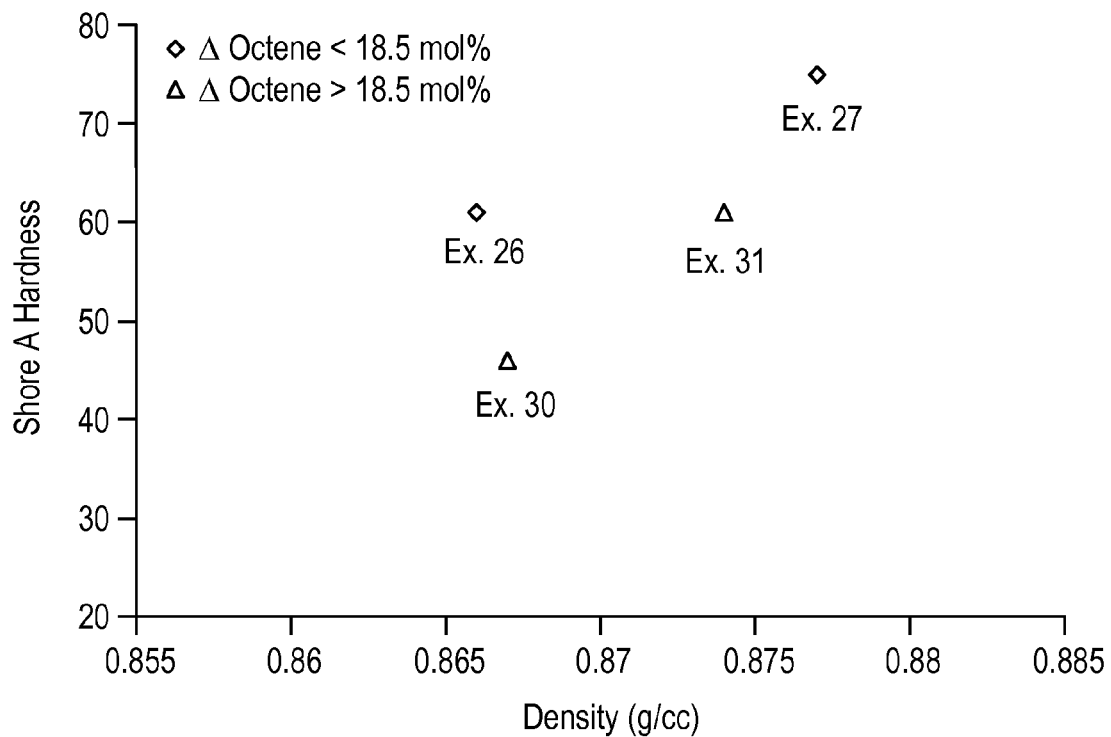
FIG. 27 is a plot of Shore A vs Density for Examples 26, 27, 30 and 31.
Figure 28:
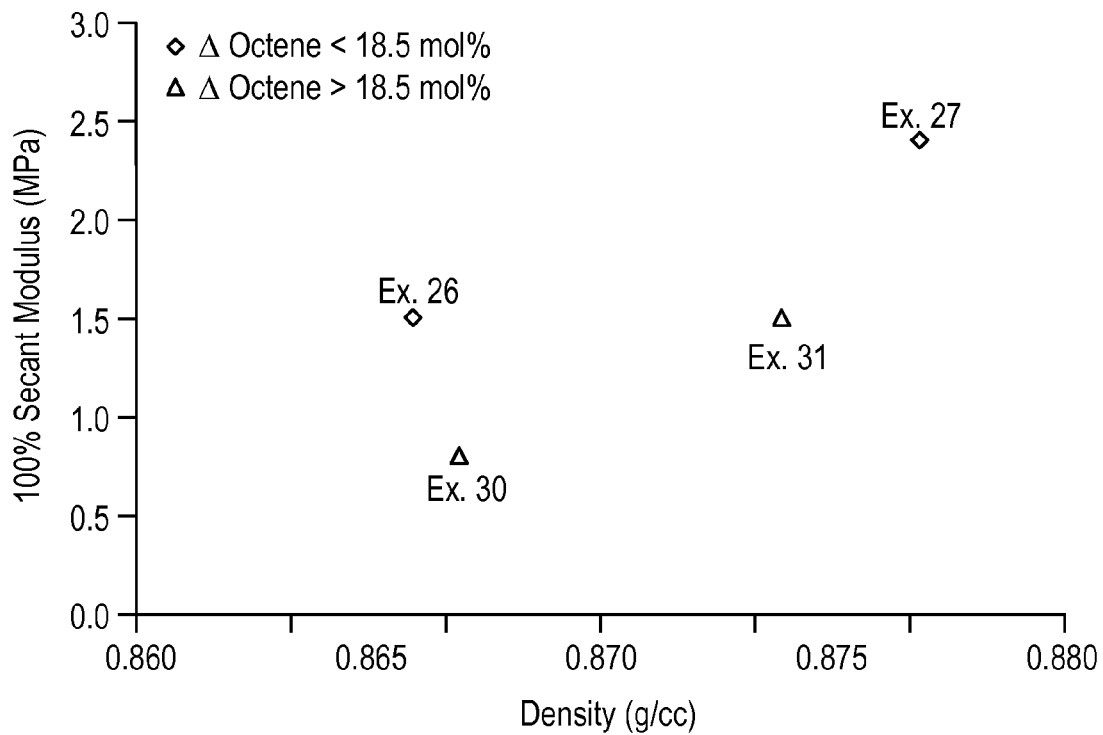
FIG. 28 is a plot of Modulus vs Density for Examples 26, 27, 30 and 31.
Figure 29:
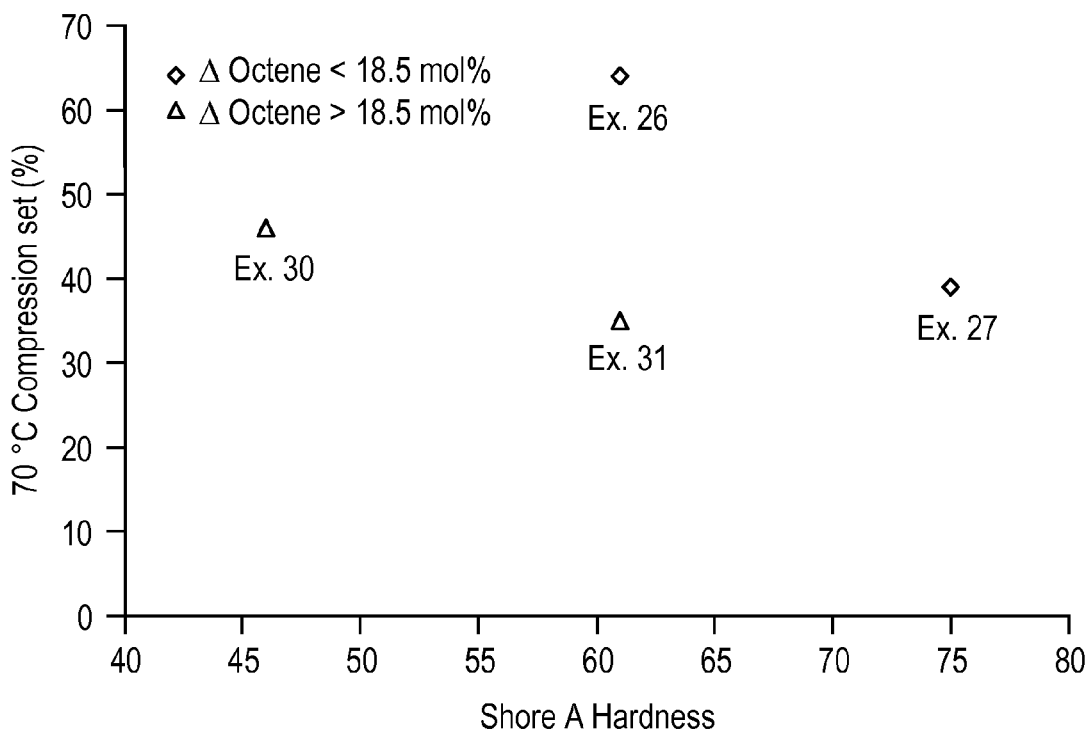
FIG. 29 is a plot of 70° C. Compression Set vs Shore A for Examples 26, 27, 30 and 31.

The data presented in Table 25 demonstrates that at the same density, the mesophase separated materials have a lower Shore A and 100% secant modulus than the samples with lower values of Δ octene. This same data is presented graphically in FIG. 27 which shows Shore A vs. density for Examples 26, 27, 30 and 31 and FIG. 28 which shows 100% Modulus vs. density for these same Examples. This shows that ethylene/α-olefin block copolymer-based materials may be made having a lower modulus or Shore A at a given density. When compared at the same Shore A (Ex 26 and Ex 31), the mesophase separated material has a significantly lower 70° C. ASTM compression set compared to the non-mesophase separated material (35% versus 64%). FIG. 29 shows 70° C. compression set vs. Shore A for these Examples as well as Ex 27 and 30. The mesophase separated examples show comparable permanent set as the non-phase separated materials at about the same density when stretched to 300% strain.

TABLE 25

| Example | Density (g/cm³) | Shore A Hardness (0.5 sc) | 100% Secant Modulus (MPa) | Compression set (70° C.) | 300% Permanent Set (%) |
|---|---|---|---|---|---|
| 26 | 0.866 | 61 | 1.5 | 64 | 36 |
| 27 | 0.877 | 75 | 2.4 | 39 | 44 |
| 30 | 0.867 | 46 | 0.8 | 46 | 41 |
| 31 | 0.874 | 61 | 1.5 | 35 | 43 |

Figure 30:
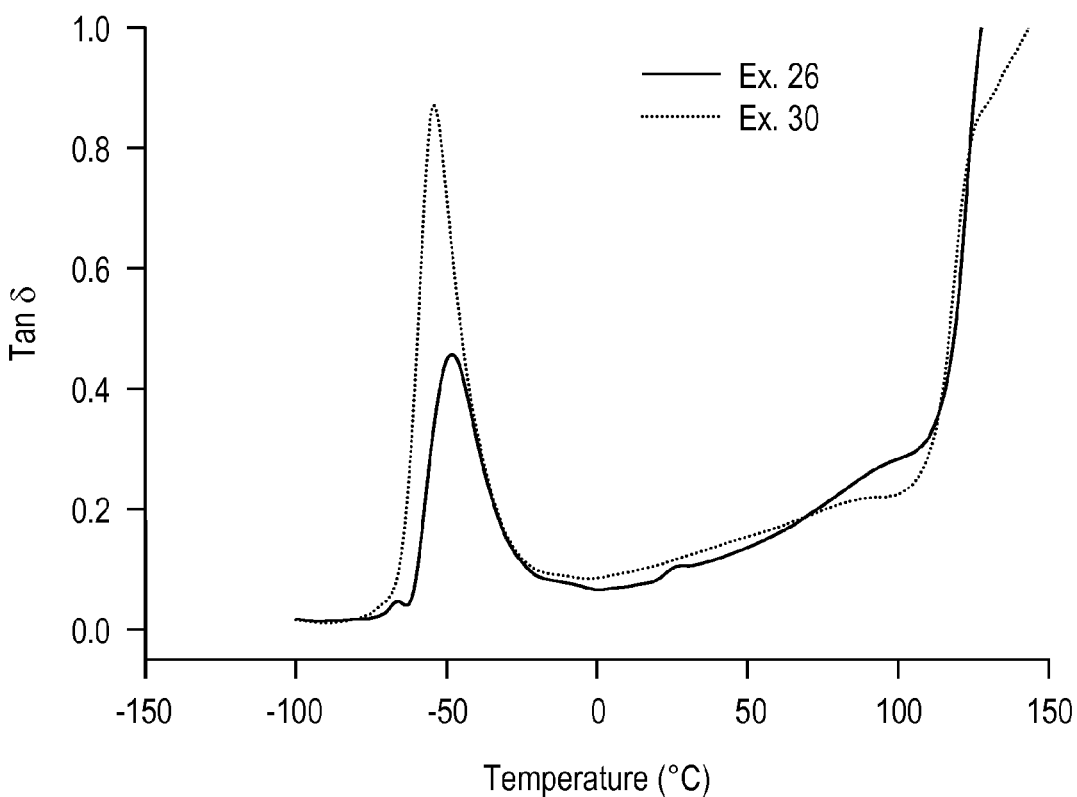
FIG. 30 is a plot of Tan δ as a function of temperature for Examples 26 and 30.
Figure 31:
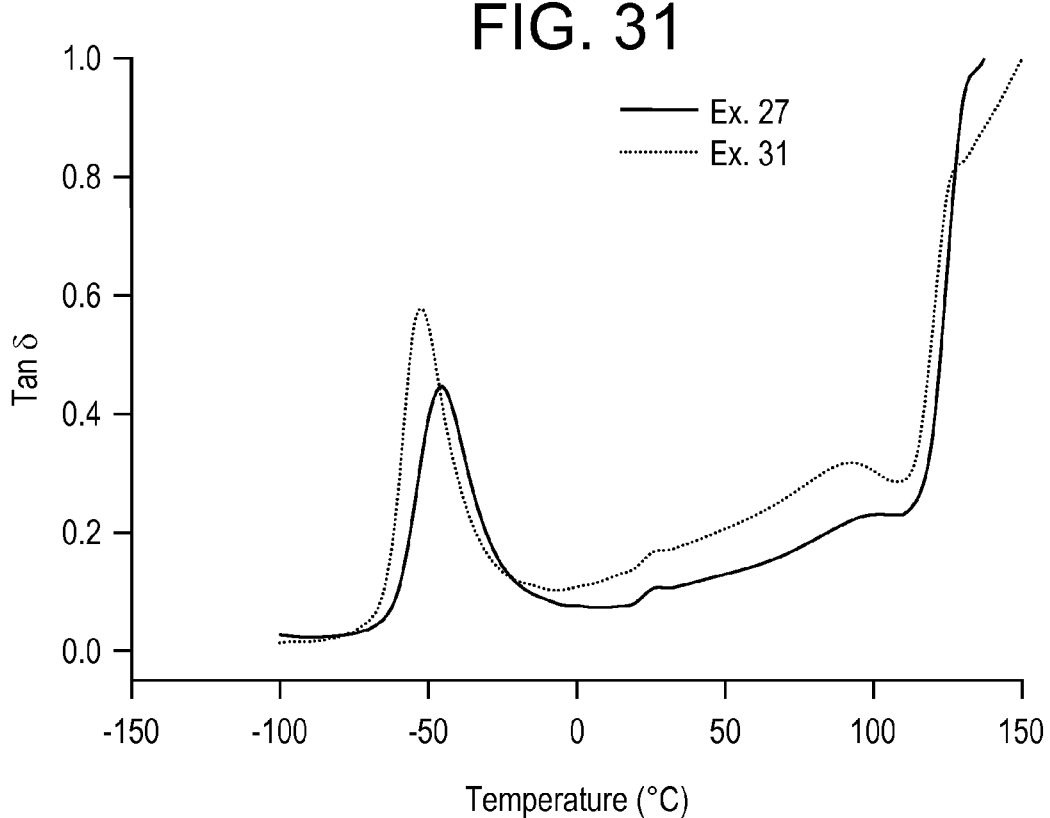
FIG. 31 is a plot of Tan δ as a function of temperature for Examples 27 and 31.

The dynamic mechanical relaxation responses as a function of temperature are presented as Tan δ curves in FIGS. 30 and 31 for Examples 26 and 30 and Examples 27 and 31, respectively. The glass transition, $T_g$, from the Tan δ curve and intensity of the peak are tabulated in Table 26. At similar density, the mesophase separated materials exhibit $T_g$'s that are approximately 7° C. lower than non-mesophase separated materials. A lower Tg offers the advantage of lower useful temperature range when used as an impact modifier.

TABLE 26

| Example | Density (g/cm³) | Tg (° C.) | Max tan δ |
|---|---|---|---|
| 26 | 0.866 | −48 | 0.44 |
| 27 | 0.877 | −45 | 0.45 |
| 30 | 0.867 | −55 | 0.86 |
| 31 | 0.874 | −52 | 0.55 |

Figure 32:
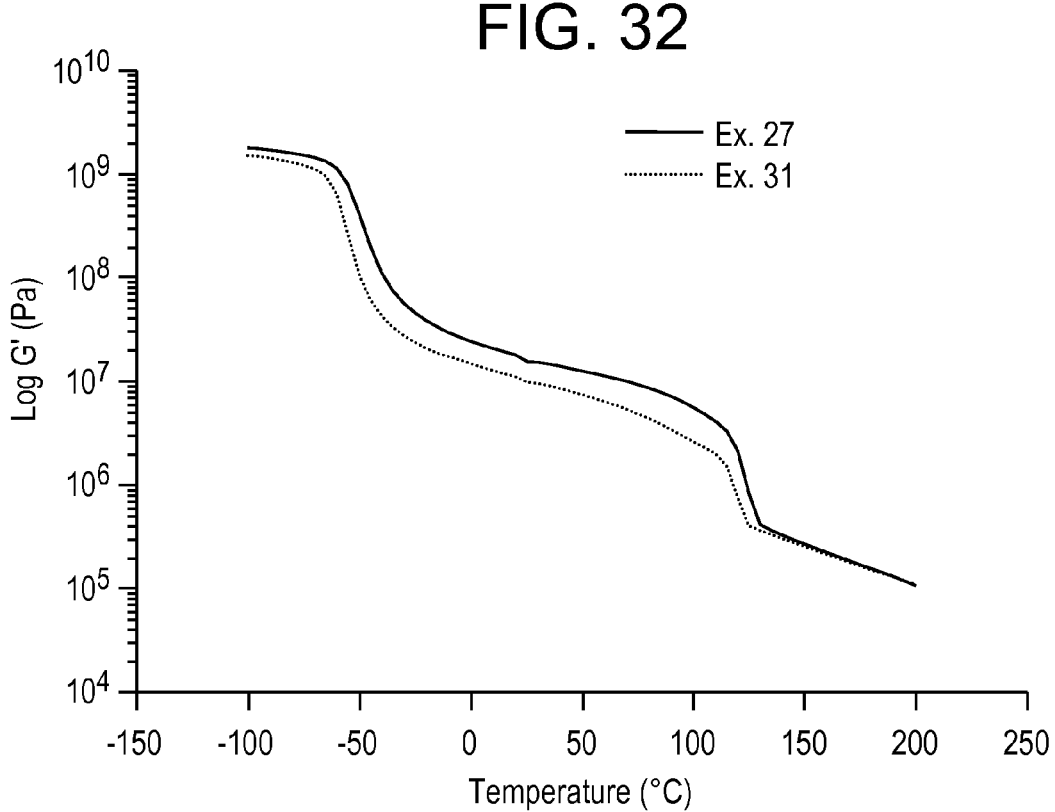
FIG. 32 is a plot of log storage modulus as a function of temperature for Examples 27 and 31.

FIG. 32 shows that the mesophase separated materials exhibit a similarly flat storage modulus as exhibited by the non-mesophase separated materials.

Blends with Oil and Polypropylene

Figure 33:
FIG. 33 is a plot of 70° C. Compression Set vs Shore A for Blends 1, 2, 3 and 4. Blends 1 and 2 comprise 35% OBC, 50% oil and 15% hPP and Blends 3 and 4 comprise 28% OBC, 60% oil and 12% hPP.

Blend formulations using inventive Ex. 29 and Comp. Ex. 25 with oil and polypropylene are listed in Table 27 together with Shore A and 70° C. compression set results. As also observed in Ex. 30 and Ex. 31, the inventive Ex 29 has lower Shore A than non-mesophase separated material at similar density. The lower Shore A is also observed in blends with the inventive example. This means that one can achieve softer blends using the mesophase separated material. FIG. 33 shows 70° C. Compression Set vs Shore A for Blends 3, 4, 7 and 8. It is observed that blends with mesophase separated material result in a lower 70° C. Compression Set at a similar Shore A. In formulated soft compounds, one can achieve softer materials with lower compression set when using the inventive polymer.

TABLE 27

| Example | wt. % Ex. 25 polymer | Wt. % Ex. 29 polymer | wt. % oil[1] | wt. % hPP[2] | Density (g/cc) | Shore A Hardness (5 sec) | Compression set (70° C.) |
|---|---|---|---|---|---|---|---|
| Ex. 25 | 100 | 0 | 0 | 0 | 0.875 | 75 | 45 |
| Ex. 29 | 0 | 100 | 0 | 0 | 0.876 | 61 | 35 |
| Blend 1 | 35 | 0 | 50 | 15 |  | 53 | 64 |
| Blend 2 | 28 | 0 | 60 | 12 |  | 31 | 60 |

TABLE 27-continued

| Example | wt. % Ex. 25 polymer | Wt. % Ex. 29 polymer | wt. % oil[1] | wt. % hPP[2] | Density (g/cc) | Shore A Hardness (5 sec) | Compression set (70° C.) |
|---|---|---|---|---|---|---|---|
| Blend 3 | 0 | 35 | 50 | 15 | | 31 | 54 |
| Blend 4 | 0 | 28 | 60 | 12 | | 19 | 53 |

[1]Chevron ParaLux 6001R Oil (Chevron U.S.A. Inc.)
[2]Polypropylene H314-02Z (The Dow Chemical Company)

Block Index for Example 34

The weighted average block index, ABI, for Example 34, is 0.75, and the square root of sum of weighted squared deviations about the weighted mean is 1.12 (Table 28).

TABLE 28

Inventive Example 34

| Fractionation Temperature | Wt Fraction Recovered | ATREF T (° C.) | Mol % Octene (NMR) | Tm (° C.) | DeltaH melt (J/g) | Fractional Block Index |
|---|---|---|---|---|---|---|
| 20 | 0.0387 | 20 | 25.4 | 115.1 | 5.4 | 0 |
| 20-60 | 0.0154 | 53.5 | 22.4 | 115.3 | 22.7 | 1.38 |
| 60-65 | 0.0126 | 63 | 20.8 | 105.2 | 32.4 | 1.39 |
| 65-70 | 0.0111 | 69.5 | 19.2 | 109.5 | 42.6 | 1.33 |
| 70-75 | 0.0199 | 75 | 18.3 | 112.3 | 48.5 | 1.33 |
| 75-80 | 0.0497 | 80.5 | 16.1 | 114.3 | 58.3 | 1.19 |
| 80-85 | 0.2059 | 87 | 12.4 | 114.7 | 72.4 | 0.93 |
| 85-90 | 0.4877 | 90 | 8.3 | 116.9 | 97.4 | 0.59 |
| 90-95 | 0.1585 | 93 | 4.4 | 120.0 | 127.2 | 0.28 |
| Weight Average Block Index | | | | | | 0.75 |
| Square root of sum of weighted squared deviations about the weighted mean | | | | | | 1.12 |

Figure 34:
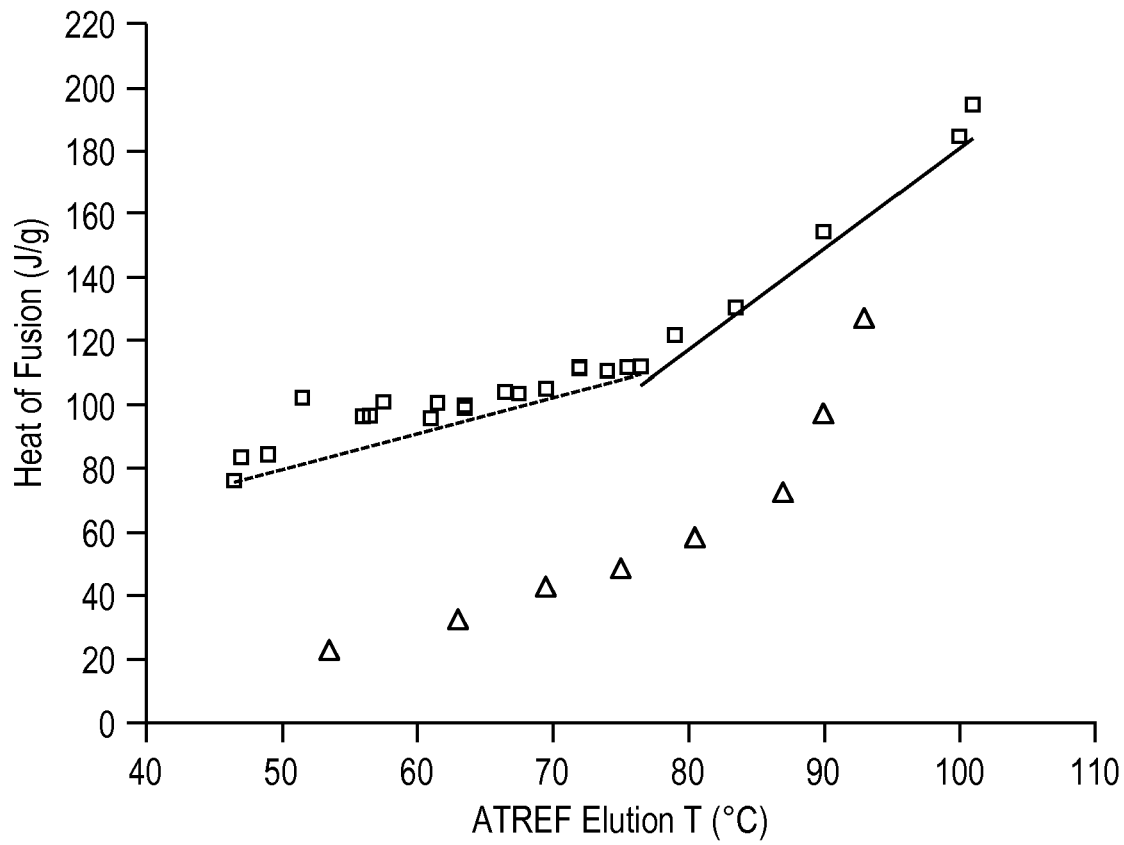
FIG. 34 shows a plot of Heat of Fusion vs. ATREF Elution Temperature for fractions of random ethylene-octene copolymers and for fractions of inventive Example 34.

FIG. 34 graphically shows that the heat of fusion (determined by DSC) of ATREF fractions of Example 34 are significantly lower than those of ATREF fractions of random ethylene octene copolymers (ATTANE® 4203, 0.90 g/cm$^3$, 0.8 $I_2$ and AFFINITY® PL1880, 0.90 g/cm$^3$, 1 $I_2$—each available from The Dow Chemical Company). Specifically, the block interpolymer has molecular fractions which elute between 40° C. and 130° C., when fractionated using TREF increments, that are characterized in that every fraction that has an ATREF elution temperature greater than or equal to about 76° C., has a melt enthalpy (heat of fusion) as measured by DSC, corresponding to the equation: Heat of fusion (J/gm)$\leq$(3.1718)(ATREF elution temperature in Celsius)−136.58, while every fraction that has an ATREF elution temperature between 40° C. and less than about 76° C., has a melt enthalpy (heat of fusion) as measured by DSC, corresponding to the equation: Heat of fusion (J/gm)$\leq$(1.1312)(ATREF elution temperature in Celsius)+22.97.

FIG. 35 graphically shows that the melting points of ATREF fractions of Example 34 are significantly higher than those from ATREF fractions of random ethylene octene copolymers (ATTANE® 4203, 0.90 g/cm$^3$, 0.8 $I_2$ and AFFINITY® PL1880, 0.90 g/cm$^3$, 1 $I_2$—each available from The Dow Chemical Company) that are fit to a line representing (−5.5926 (mol % comonomer of the ATREF fraction)+135.90 (solid line).

As demonstrated above, embodiments of the invention provide a new class of ethylene and α-olefin block interpolymers. The block interpolymers are characterized by an average block index of greater than zero, preferably greater than 0.2. Due to the block structures, the block interpolymers have a unique combination of properties or characteristics not seen for other ethylene/α-olefin copolymers. Moreover, the block interpolymers comprise various fractions with different block indices. The distribution of such block indices has an impact on the overall physical properties of the block interpolymers. It is possible to change the distribution of the block indices by adjusting the polymerization conditions, thereby affording the abilities to tailor the desired polymers. Such block interpolymers have many end-use applications. For example, the block interpolymers can be used to make polymer blends, fibers, films, molded articles, lubricants, base oils, etc. Other advantages and characteristics are apparent to those skilled in the art.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. An ethylene/α-olefin block interpolymer comprising one or more hard segments and one or more soft segments having a difference in mole percent α-olefin content, wherein the ethylene/α-olefin block interpolymer is characterized by a molecular weight distribution, $M_w/M_n$, in the range of from about 1.4 to about 2.8 and by an average block index greater than zero and up to about 1.0; a difference in mole percent α-olefin content between the soft segment and the hard segment of greater than about 18.5 mole percent and, wherein the ethylene/α-olefin block interpolymer is mesophase separated.

2. The ethylene/α-olefin block interpolymer of claim 1 wherein the interpolymer is characterized by an average molecular weight of greater than 40,000 g/mol.

3. The ethylene/α-olefin block interpolymer of claim 1, wherein the α-olefin is styrene, propylene, 1-butene, 1-hexene, 1-octene, 4-methyl-1-pentene, norbornene, 1-decene, 1,5-hexadiene, or a combination thereof.

4. The ethylene/α-olefin block interpolymer of claim 3 wherein the α-olefin is octene and the difference in mole percent α-olefin content between the hard segment and soft segment is greater than about 20.0 mole percent.

5. The ethylene/α-olefin block interpolymer of claim 3 wherein the α-olefin is propylene and the difference in mole percent α-olefin content between the hard segment and soft segment is greater than about 40.7 mole percent.

6. The ethylene/α-olefin block interpolymer of claim 1 wherein the ethylene/α-olefin block copolymer has been compression molded.

7. The ethylene/a-olefin block interpolymer of claim 1, wherein the block copolymer has a density of less than about 0.91 g/cc.

8. The ethylene/α-olefin block interpolymer of claim 7, wherein the interpolymer has a density in the range from about 0.86 g/cc to about 0.91 g/cc.

9. The ethylene/α-olefin block interpolymer of claim 1, wherein the ethylene/α-olefin interpolymer is characterized by at least one melting point, Tm, in degrees Celsius, and a density, d, in grams/cubic centimeter, wherein the numerical values of Tm and d correspond to the relationship:

$$T_m \geq -6880.9 + 14422(d) - 7404.3(d)^2.$$

10. The ethylene/α-olefin block copolymer of claim 1 characterized by having at least one fraction obtained by Temperature Rising Elution Fractionation ("TREF"), wherein the fraction has a block index greater than about 0.3 and up to about 1.0 and the ethylene/α-olefin block interpolymer has a molecular weight distribution, $M_w/M_n$, greater than about 1.4.

11. The ethylene/α-olefin block interpolymer of claim 1, wherein the ethylene content is greater than about 50 mole percent.

12. The ethylene/α-olefin block interpolymer of claim 1, wherein the soft segments comprise less than 90% of ethylene by weight.

13. The ethylene/α-olefin block interpolymer of claim 1, wherein the hard segments and soft segments are randomly distributed.

14. The ethylene/α-olefin block interpolymer of claim 1, wherein the block copolymer displays a reflection spectrum that reaches a value of at least 12 percent within the region of infrared, visible or ultraviolet light.

15. An ethylene/α-olefin block interpolymer comprising one or more hard segments and one or more soft segments having a difference in mole percent α-olefin content, wherein the ethylene/α-olefin block interpolymer is characterized by a molecular weight distribution, $M_w/M_n$, in the range of from about 1.4 to about 2.8 and by an average block index greater than zero and up to about 1.0, wherein $I_{10}/I_2 > 8$.

16. An article comprising the block ethylene/α-olefin interpolymer of claim 1.

17. The article of claim 16 wherein the article comprises a film, a molded article, jewelry, a toy, an optical article, a decorative article or a combination thereof.

18. The article of claim 17 wherein the optical article comprises a photonic band gap material wherein the ratio of the index of refraction of the segments having a difference in mole percent a-olefin content is 1.00 to 1.09 for a continuous set of wavelengths lying within a wavelength range of from about 100 nm to about 10 μm.

* * * * *